(12) United States Patent
Wu et al.

(10) Patent No.: US 11,877,175 B2
(45) Date of Patent: Jan. 16, 2024

(54) METHOD AND DEVICE IN NODE USED FOR WIRELESS COMMUNICATION

(71) Applicants: Lu Wu, Shanghai (CN); Xiaobo Zhang, Shanghai (CN); Lin Yang, Shanghai (CN)

(72) Inventors: Lu Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/979,775

(22) Filed: Nov. 3, 2022

(65) Prior Publication Data
US 2023/0055350 A1 Feb. 23, 2023

Related U.S. Application Data

(63) Continuation of application No. 17/082,036, filed on Oct. 28, 2020, now Pat. No. 11,553,366, which is a (Continued)

(30) Foreign Application Priority Data

Sep. 4, 2018 (CN) .......................... 201811023170.6

(51) Int. Cl.
*H04W 24/10* (2009.01)
*H04L 27/00* (2006.01)
(Continued)

(52) U.S. Cl.
CPC ......... *H04W 24/10* (2013.01); *H04L 27/0008* (2013.01); *H04L 27/2666* (2013.01); *H04W 72/0453* (2013.01)

(58) Field of Classification Search
None
See application file for complete search history.

(56) References Cited

U.S. PATENT DOCUMENTS 10,887,870 B2 * 1/2021 Tang ...................... H04W 72/20
10,945,236 B2 * 3/2021 Seo ........................ H04W 72/02
(Continued)

FOREIGN PATENT DOCUMENTS

CN 103404188 A * 11/2013 ............. H04W 16/14
CN 106559830 A * 4/2017 ............. H04W 24/10
(Continued)

OTHER PUBLICATIONS

LTE; Evolved Universal Terrestrial Radio Access (E-UTRA); Medium Access Control (MAC) protocol specification (3GPP TS 36.321 version 14.3.0 Release 14 (Year: 2017).*
(Continued)

*Primary Examiner* — Andrew C Oh

(57) ABSTRACT

The present disclosure provides a method and a device in node used for wireless communication. The communication node first performs X first-type measurement(s) in a target time-frequency resource pool, and the X first-type measurement(s) is (are respectively) used for acquiring X first-type measurement value(s); performs a target second-type measurement, the target second-type measurement being used for acquiring a second-type measurement value; and then transmits a first radio signal. Herein, the X first-type measurement value(s) is(are) used for the target second-type measurement, and the target time-frequency resource pool is one of Q alternative time-frequency resource pools related to a Subcarrier Spacing (SCS) of subcarriers occupied by the first radio signal; there exist two of the Q alternative time-frequency resource pools that comprise different time-frequency resources.

18 Claims, 18 Drawing Sheets

Related U.S. Application Data continuation of application No. PCT/CN2019/103344, filed on Aug. 29, 2019.

(51) Int. Cl.
*H04L 27/26* (2006.01)
*H04W 72/0453* (2023.01)

(56) References Cited

U.S. PATENT DOCUMENTS

| | | | |
|---|---|---|---|
| 11,082,953 B2* | 8/2021 | Wang | H04W 72/541 |
| 2016/0302230 A1* | 10/2016 | Novlan | H04J 11/0023 |
| 2018/0042006 A1 | 2/2018 | Zhang et al. | |
| 2018/0048577 A1 | 2/2018 | Gulati et al. | |
| 2019/0014565 A1* | 1/2019 | Fujishiro | H04W 72/23 |
| 2019/0044782 A1* | 2/2019 | Zeng | H04L 27/26025 |
| 2019/0132838 A1* | 5/2019 | Yi | H04L 5/0055 |
| 2019/0215816 A1* | 7/2019 | Tang | H04L 5/0007 |
| 2019/0238300 A1* | 8/2019 | Tang | H04L 27/26025 |
| 2019/0246249 A1* | 8/2019 | Lee | H04W 72/04 |
| 2019/0313279 A1 | 10/2019 | Li | |
| 2019/0356451 A1* | 11/2019 | Zhang | H04W 72/23 |
| 2019/0387530 A1* | 12/2019 | Tang | H04W 72/02 |
| 2020/0029285 A1 | 1/2020 | Atungsiri et al. | |
| 2020/0137536 A1* | 4/2020 | Nguyen | H04L 27/2607 |
| 2020/0178221 A1* | 6/2020 | Byun | H04W 76/14 |
| 2021/0352623 A1* | 11/2021 | Wang | H04W 72/0453 |
| 2021/0367723 A1* | 11/2021 | Zhang | H04L 5/0094 |
| 2022/0039080 A1 | 2/2022 | Khoryaev et al. | |

FOREIGN PATENT DOCUMENTS

| | | | | |
|---|---|---|---|---|
| CN | 107801247 A | | 3/2018 | |
| CN | 107889158 A | * | 4/2018 | ........... H04L 47/762 |
| CN | 109803400 A | * | 5/2019 | |
| CN | 110831193 A | | 1/2020 | |
| CN | 107819714 B | * | 4/2020 | ......... H04L 27/2613 |
| WO | WO-2017211228 A1 | * | 12/2017 | ............... H04L 5/00 |
| WO | WO-2018026182 A1 | * | 2/2018 | ........... H04B 7/0617 |
| WO | 2018128087 A1 | | 7/2018 | |
| WO | WO-2018146834 A1 | * | 8/2018 | |
| WO | WO-2018199728 A1 | * | 11/2018 | ............ H04W 24/08 |
| WO | WO-2018208217 A1 | * | 11/2018 | ............ H04W 28/18 |
| WO | WO-2019031808 A1 | * | 2/2019 | .............. H04W 4/40 |
| WO | WO-2019163142 A1 | * | 8/2019 | |
| WO | WO-2020034214 A1 | * | 2/2020 | ........... H04B 17/318 |

OTHER PUBLICATIONS

ISR in application PCT/CN2019/103344 dated Oct. 11, 2019.
Huawei."Summary of[102#74]LTE/V2X]-Sensing and reporting for Mode 3"R2-1811255, Aug. 24, 2018(Aug. 24, 2018).
CN201811023170.6 1st Office Action dated Jan. 24, 2022.
CN201811023170.6 First Search Report dated Jan. 14, 2022.

* cited by examiner

| Indexes (P=4) | P alternative intervals | P alternative MCS sets | P alternative resource numerical values |
|---|---|---|---|
| 1 | [0, 0.25) | {0, 1, 2 ..., 9} | {$a_1$, $a_2$, $a_3$, $a_4$} |
| 2 | [0.25, 0.5) | {7, 8, 9 ..., 16} | {$b_1$, $b_2$, $b_3$, $b_4$} |
| 3 | [0.5, 0.75) | {14, 15, 18 ..., 23} | {$c_1$, $c_2$, $c_3$, $c_4$} |
| 4 | [0.75, 1] | {21, 25, 26 ..., 31} | {$d_1$, $d_2$, $d_3$, $d_4$} |

METHOD AND DEVICE IN NODE USED FOR WIRELESS COMMUNICATION

CROSS REFERENCE TO RELATED APPLICATIONS

This application is a continuation of the U.S. patent application Ser. No. 17/082,036, filed on Oct. 28, 2020, which is a continuation of International Application No. PCT/CN2019/103344, filed Aug. 29, 2019, claims the priority benefit of Chinese Patent Application No. 201811023170.6, filed on Sep. 4, 2018, the full disclosure of which is incorporated herein by reference.

BACKGROUND

Technical Field

The present disclosure relates to transmission methods and devices in wireless communication systems, and in particular to a scheme and a device for measurement in wireless communication.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR. Compared with the existing LTE systems, 5G NR has an outstanding feature of supporting more flexible Numerologies, which includes Subcarrier Spacing (SCS) and Cyclic Prefix (CP), and more flexible frame structures, such as of mini-slot, sub-slot and slot aggregation. With such flexible numerologies and frame structures, various new business requirements will be better satisfied, especially in highly diversified vertical industries.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was approved.

SUMMARY

A stricter payload balance control is a significant characteristic that differentiates V2X from traditional cellular network, since effective payload control can reduce the probability of business conflicts and improve transmission reliability, which are critical factors for successful V2X. In LTE V2X system, however, a measurement mechanism for payload control is designed based on a single Numerology, namely, 15 kHz SCS, normal length of CP and 1 ms of subframe length, making it impossible to meet the requirement of more flexible Numerology of 5G NR V2X.

In view of the above problem, the present disclosure provides a solution. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a first-type communication node for wireless communications, comprising:

performing X first-type measurement(s) in a target time-frequency resource pool, the X first-type measurement(s) respectively being used for acquiring X first-type measurement value(s), X being a positive integer;

performing a target second-type measurement, the target second-type measurement being used for acquiring a second-type measurement value; and transmitting a first radio signal;

herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of a Modulation Coding Scheme (MCS) employed by the first radio signal or time-frequency resources occupied by the first radio signal.

In one embodiment, a problem needed to be solved in the present disclosure is: how to design a measurement mechanism of payload control in 5G NR V2X to meet a more flexible numerology demand compared with LTE V2X system.

In one embodiment, the method in the present disclosure associates the target time-frequency resource pool in the Q alternative time-frequency resource pools with the SCS of subcarriers occupied by the first radio signal, therefore, a determination of the target time-frequency resource pool may vary according to an SCS employed in a transmission, thus improving measurement accuracy and enabling the outcome of the measurement to better reflect requests of actual transmission and scheduling.

In one embodiment, the method in the present disclosure associates the target time-frequency resource pool in the Q alternative time-frequency resource pools with the SCS of subcarriers occupied by the first radio signal, the SCS of subcarriers occupied by the first radio signal is determined according to a determination of the target time-frequency resource pool out of the Q alternative time-frequency resource pools, which helps select a suitable numerology under payload control.

According to one aspect of the present disclosure, the above method is characterized in that the Q alternative time-frequency resource pools respectively correspond to Q alternative SCSs, one of the Q alternative SCSs corresponding to the target time-frequency resource pool is the same as the SCS of subcarriers occupied by the first radio signal.

According to one aspect of the present disclosure, the above method is characterized in that any of the Q alternative time-frequency resource pools consists of a group of time-frequency resource subpools that periodically appear in time domain; a number of multicarrier symbols occupied by each time-frequency resource subpool of the Q alternative time-frequency resource pools is the same, or, a number of multicarrier symbols occupied by any time-frequency resource subpool of the Q alternative time-frequency resource pools is related to its corresponding SCS.

According to one aspect of the present disclosure, the above method is characterized in comprising:

performing Q0 group(s) of first-type measurements respectively in Q0 alternative time-frequency resource pool(s) of the Q alternative time-frequency resource pools, and the Q0 group(s) of first-type measurements is (are respectively) used for acquiring Q0 group(s) of first-type measurement values;

herein, the each of Q0 alternative time-frequency resource pool(s) is different from the target time-frequency resource pool, the Q0 being a positive integer less than the Q.

In one embodiment, the above method is advantageous in that the first-type communication node performs the Q0 group(s) of first-type measurements, which helps loosen the time limit for the scheduling of transmission, so that emergent businesses employing different Numerologies can perform payload control as well.

According to one aspect of the present disclosure, the above method is characterized in comprising:

performing Q1 second-type measurement(s), each of the Q1 second-type measurement(s) respectively used for acquiring Q1 second-type measurement value(s);

herein, Q1 group(s) of first-type measurement values in the Q0 group(s) of first-type measurement values is (are respectively) used for the Q1 second-type measurement(s), Q1 being a positive integer no greater than the Q0; and each of the Q1 second-type measurement value(s) is no less than the second-type measurement value acquired after performing the target second-type measurement.

In one embodiment, the above method is essential in that the first-type communication node performs multiple second-type measurements comprising the Q1 second-type measurement(s) and the target second-type measurement, and one of the Q alternative time-frequency resource pools corresponding to a minimum value of a second-type measurement value respectively corresponding to the multiple second-type measurements is the target time-frequency resource pool. The above method is advantageous in that a numerology with a lightest payload or time-frequency resources can be selected for an actual transmission.

According to one aspect of the present disclosure, the above method is characterized in that the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, and the characteristic measurement value is an average value of a sum of received power in each of the X2 multicarrier symbol(s) within frequency-domain resources occupied by the characteristic time-frequency unit.

According to one aspect of the present disclosure, the above method is characterized in comprising:

receiving first information;

herein, each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; and the first information is used for determining the target threshold.

According to one aspect of the present disclosure, the above method is characterized in comprising:

transmitting a first signaling;

herein, the first signaling is used for indicating at least one of an MCS employed by the first radio signal or time-frequency resources occupied by the first radio signal, and the first signaling is transmitted via an air interface; each of the Q alternative time-frequency resource pools belongs to a first time window in time domain, and the target second-type measurement is performed in a second time window; an end time of the first time window is no later than a start time of the second time window, and an end time of the second time window is no later than a start time for transmission of the first radio signal.

According to one aspect of the present disclosure, the above method is characterized in comprising:

receiving second information;

herein, the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set.

According to one aspect of the present disclosure, the above method is characterized in comprising:

receiving third information;

herein, the third information is used for determining the SCS of subcarriers occupied by the first radio signal.

According to one aspect of the present disclosure, the above method is characterized in comprising:

performing Y third-type measurement(s) in a third time window, the Y third-type measurement(s) is (are respectively) used for acquiring Y third-type measurement value(s), Y being a positive integer;

herein, a second-type measurement value acquired after performing the target second-type measurement is used for determining a first upper bound, a sum of the Y third-type measurement value(s) is no greater than the first upper bound, a time-domain position of the third time window is related to time-frequency resources occupied by the first radio signal, and the Y third-type measurement value(s) is(are) related to a number of time-frequency resources occupied by a radio signal transmitted by a transmitter of the first radio signal in the third time window.

The present disclosure provides a method in a second-type communication node for wireless communications, comprising:

transmitting first information;

herein, X first-type measurement(s) performed in a target time-frequency resource pool is(are) used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, and the target second-type measurement is used for acquiring a second-type measurement value; the second-type measurement value acquired after performing the target second-type measurement is used for determining at least one of an MCS employed by the first radio signal or time-frequency resources occupied by the first radio signal; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold.

According to one aspect of the present disclosure, the above method is characterized in that the Q alternative time-frequency resource pools respectively correspond to Q alternative SCSs, one of the Q alternative SCSs corresponding to the target time-frequency resource pool is the same as an SCS of subcarriers occupied by the first radio signal.

According to one aspect of the present disclosure, the above method is characterized in that any of the Q alternative time-frequency resource pools consists of a group of time-frequency resource subpools that occur periodically in time domain; all time-frequency resource subpools of the Q alternative time-frequency resource pools occupy equal numbers of multicarrier symbols, or, a number of multicarrier symbols occupied by any time-frequency resource subpool of the Q alternative time-frequency resource pools is related to its corresponding SCS.

According to one aspect of the present disclosure, the above method is characterized in that the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, and the characteristic measurement value is an average value of a sum of received power in each of the X2 multicarrier symbol(s) within frequency-domain resources occupied by the characteristic time-frequency unit.

According to one aspect of the present disclosure, the above method is characterized in that each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal.

According to one aspect of the present disclosure, the above method is characterized in comprising:

transmitting second information;

herein, the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set.

According to one aspect of the present disclosure, the above method is characterized in comprising:

transmitting third information;

herein, the third information is used for determining the SCS of subcarriers occupied by the first radio signal.

The present disclosure provides a first-type communication node for wireless communications, comprising:

a first measurer, performing X first-type measurement(s) in a target time-frequency resource pool, the X first-type measurement(s) respectively being used for acquiring X first-type measurement value(s), X being a positive integer;

a second measurer, performing a target second-type measurement, the target second-type measurement being used for acquiring a second-type measurement value; and a first transceiver, transmitting a first radio signal;

herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal.

The present disclosure provides a second-type communication node for wireless communications, comprising:

a second transmitter, transmitting first information;

herein, X first-type measurement(s) performed in a target time-frequency resource pool is(are) used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, and the target second-type measurement is used for acquiring a second-type measurement value; the second-type measurement value acquired after performing the target second-type measurement is used for determining at least one of an MCS employed by the first radio signal or time-frequency resources occupied by the first radio signal; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold.

In one embodiment, the present disclosure has the following advantages over the prior art in LTE V2X:

Methods in the present disclosure enable a time-frequency resource pool for measurement on payload status to vary according to the SCS employed in a transmission, thus improving the accuracy of the measurement, and guaranteeing that the outcome of the measurement will better reflect requests of actual transmission and scheduling.

Methods in the present disclosure help loosen time limit for the scheduling of transmission, so that emergent businesses employing different Numerologies can perform payload control as well.

Methods in the present disclosure will effectively support payload control in transmissions employing multiple Numerologies so as to support a more diverse business transmission.

Methods in the present disclosure can determine a suitable numerology for actual transmissions according to measurements performed on payload status of multiple time-frequency resource pools.

Methods in the present disclosure can determine a suitable time-frequency resource for actual transmissions according to measurements performed on payload status of multiple time-frequency resource pools.

BRIEF DESCRIPTION OF THE DRAWINGS

Other features, objects and advantages of the present disclosure will become more apparent from the detailed description of non-restrictive embodiments taken in conjunction with the following drawings:

FIG. 15 illustrates a schematic diagram of relations among P alternative intervals, P alternative MCS sets and P alternative resource numerical value sets according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
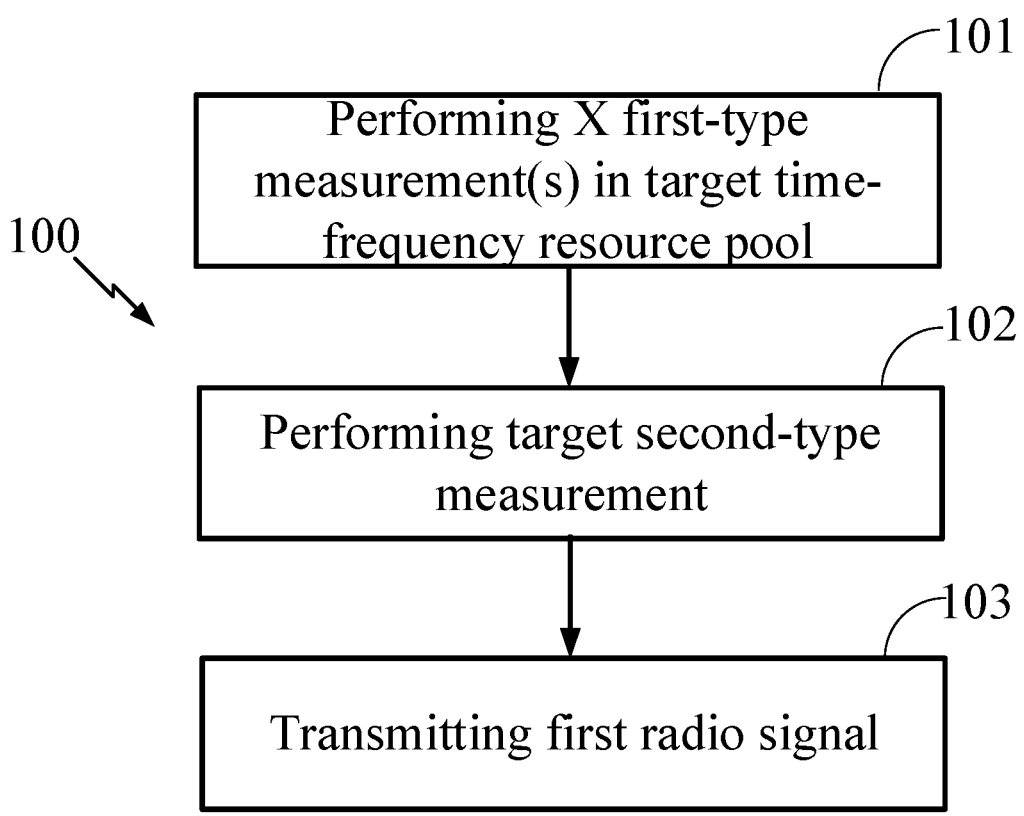
FIG. 1 illustrates a flowchart of X first-type measurement(s), a target second-type measurement and transmitting a first radio signal according to one embodiment of the present disclosure.

Embodiment 1 illustrates a flowchart of X first-type measurement(s), a target second-type measurement and transmitting a first radio signal according to one embodiment of the present disclosure, as shown in FIG. 1. In FIG. 1, each box represents a step.

In Embodiment 1, the first-type communication node in the present disclosure performs X first-type measurement(s) in a target time-frequency resource pool, and the X first-type measurement(s) is(are respectively) used for acquiring X first-type measurement value(s), X being a positive integer; performs a target second-type measurement, the target second-type measurement being used for acquiring a second-type measurement value; and transmits a first radio signal; herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal.

In one embodiment, one first-type measurement is a measurement on power values.

In one embodiment, one first-type measurement is a measurement on an average power in a given time-frequency resource.

In one embodiment, one first-type measurement is a measurement on energies.

In one embodiment, one first-type measurement is a measurement on a Received Signal Strength Indicator (RSSI).

In one embodiment, one first-type measurement is a measurement on a Sidelink Received Signal Strength Indicator (S-RSSI).

In one embodiment, one first-type measurement is a measurement on power values, including power values of signals in a channel(s) measured, signals leaked from neighboring channel(s) to the channel(s) measured, interference in the channel(s) measured and thermal noise.

In one embodiment, one first-type measurement is a measurement on energies, including energies of signals in a channel(s) measured, signals leaked from neighboring channel(s) to the channel(s) measured, interference in the channel(s) measured and thermal noise.

In one embodiment, one first-type measurement is a measurement on power values, including the power value of CP.

In one embodiment, one first-type measurement is a measurement on energies, including the energy of CP.

In one embodiment, one first-type measurement is a measurement on power values, not including the power value of CP.

In one embodiment, one first-type measurement is a measurement on energies, not including the energy of CP.

In one embodiment, one first-type measurement comprises frequency domain filtering.

In one embodiment, one first-type measurement comprises filtering from a higher layer filter.

In one embodiment, one first-type measurement comprises filtering from a higher layer a Filter.

In one embodiment, any of the X first-type measurement value(s) is an RSSI value.

In one embodiment, any of the X first-type measurement value(s) is an S-RSSI value.

In one embodiment, any of the X first-type measurement value(s) is a power value.

In one embodiment, any of the X first-type measurement value(s) is an energy value.

In one embodiment, any of the X first-type measurement value(s) is measured by W.

In one embodiment, any of the X first-type measurement value(s) is measured by mW.

In one embodiment, any of the X first-type measurement value(s) is measured by dBm.

In one embodiment, any of the X first-type measurement value(s) is measured by Joule.

In one embodiment, for a given SCS and CP length, any of the X first-type measurement value(s) is an average of a sum of received power values of all multicarrier symbols comprised within the frequency range of time-frequency resources where the corresponding measurement is performed.

In one embodiment, for a given SCS and CP length, any of the X first-type measurement value(s) is an average of a sum of received energies of all multicarrier symbols comprised within the frequency range of time-frequency resources where the corresponding measurement is performed.

In one embodiment, for a given SCS and CP length, any of the X first-type measurement value(s) is an average of a sum of received power values of partial multicarrier symbols comprised within the frequency range of time-frequency resources where the corresponding measurement is performed.

In one embodiment, for a given SCS and CP length, any of the X first-type measurement value(s) is an average of a sum of received energies of partial multicarrier symbols comprised within the frequency range of time-frequency resources where the corresponding measurement is performed.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the target second-type measurement and any of the X first-type measurement(s) belong to two different types of measurements.

In one embodiment, the target second-type measurement is a measurement on Channel Busy Ratio (CBR).

In one embodiment, the target second-type measurement is a measurement on Channel Busy Quantity (CBQ).

In one embodiment, the target second-type measurement is used for determining a channel occupancy status of the channel(s) measured.

In one embodiment, the target second-type measurement is used for determining a channel occupancy status within the frequency range measured.

In one embodiment, a second-type measurement value is a Channel Busy Ratio (CBR) value.

In one embodiment, a second-type measurement value is a Channel Busy Quantity (CBQ) value.

In one embodiment, each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; for a given SCS, the target threshold is configured, or the target threshold is fixed.

In one subembodiment of the above embodiment, the target thresholds respectively corresponding to two different given SCSs are different or the same.

In one subembodiment of the above embodiment, the target thresholds respectively corresponding to two different given SCSs are different.

In one subembodiment of the above embodiment, the target thresholds respectively corresponding to two different given SCSs are the same.

In one embodiment, each of X1 first-type measurement value(s) of the X first-type measurement value(s) is greater than a target threshold, the second-type measurement value acquired after performing the target second-type measurement is equal to the X1, X1 being a non-negative integer no greater than X, for a given SCS, the target threshold is configured, or the target threshold is fixed.

In one subembodiment of the above embodiment, the target thresholds respectively corresponding to two different given SCSs are different or the same.

In one subembodiment of the above embodiment, the target thresholds respectively corresponding to two different given SCSs are different.

In one subembodiment of the above embodiment, the target thresholds respectively corresponding to two different given SCSs are the same.

In one embodiment, the first radio signal is transmitted via Sidelink.

In one embodiment, the first radio signal is transmitted via a PC5 interface.

In one embodiment, the first radio signal is Unicast.

In one embodiment, the first radio signal is Groupcast.

In one embodiment, the first radio signal is Broadcast.

In one embodiment, the first radio signal carries a Transport Block (TB).

In one embodiment, the first radio signal carries Hybrid Automatic Repeat reQuest ACKnowledgement (HARQ-ACK) feedback.

In one embodiment, the first radio signal carries Channel-State Information (CSI).

In one embodiment, the first radio signal carries Sidelink Control Information (SCI).

In one subembodiment of the above embodiment, the SCI comprises at least one of Scheduling Assignment information, HARQ-ACK feedback or CSI.

In one subembodiment of the above embodiment, the SCI comprises SA information.

In one subembodiment of the above embodiment, the SCI comprises HARQ-ACK feedback.

In one subembodiment of the above embodiment, the SCI comprises CSI.

In one embodiment, the first radio signal carries SA information.

In one embodiment, the first radio signal carries SCI and TB.

In one embodiment, the first radio signal carries at least one of SCI, SA, TB, HARQ-ACK or CSI.

In one embodiment, the first radio signal is transmitted through a data channel.

In one embodiment, the first radio signal is transmitted through a control channel.

In one embodiment, the first radio signal is transmitted through a data channel and a control channel.

In one embodiment, the first radio signal comprises both a data signal and a control channel.

In one embodiment, the first radio signal comprises both a data signal and control information.

In one subembodiment of the above embodiment, the control information comprised in the first radio signal comprises at least one of SCI, SA, TB, HARQ-ACK, or CSI.

In one subembodiment of the above embodiment, the control information comprised in the first radio signal comprises SCI.

In one subembodiment of the above embodiment, the control information comprised in the first radio signal comprises SA.

In one subembodiment of the above embodiment, the control information comprised in the first radio signal comprises HARQ-ACK.

In one subembodiment of the above embodiment, the control information comprised in the first radio signal comprises CSI.

In one embodiment, the first radio signal is transmitted through a Sidelink Shared Channel (SL-SCH).

In one embodiment, the first radio signal is transmitted through a Physical Sidelink Shared Channel (PSSCH).

In one embodiment, the first radio signal is transmitted through a Physical Sidelink Control Channel (PSCCH).

In one embodiment, the first radio signal is transmitted through a PSSCH and a PSCCH.

In one embodiment, the first radio signal comprises an initial transmission of a TB.

In one embodiment, the first radio signal comprises a retransmission of a TB.

In one embodiment, the first radio signal is generated after a TB is sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, the first radio signal is generated after a TB is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks (PRB), OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Virtual Resource Blocks, Mapping from Virtual to PRBs, OFDM Baseband Signal Generation, and Modulation and Upconversion.

In one embodiment, the first radio signal is generated after a TB is sequentially subjected to CRC Insertion, Channel Coding, Rate Matching, Scrambling, Modulation, Layer Mapping, Transform Precoding, Precoding, Mapping to Resource Element, OFDM Baseband Signal Generation, and Modulation and Upconversion.

In one embodiment, the first radio signal is generated after a TB is sequentially subjected to CRC Insertion, Channel Coding, Rate Matching, Scrambling, Modulation, Layer Mapping, Transform Precoding, Precoding, Mapping to Virtual Resource Blocks, Mapping from Virtual to PRBs, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Transform Precoding, Precoding, Mapping to Resource Element, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the first radio signal is generated after a piece of control information is sequentially subjected to CRC Insertion, Channel Coding, Rate Matching, Scrambling, Modulation, Mapping to Physical Resources, OFDM Baseband Signal Generation, and Modulation and Upconversion.

In one embodiment, the first radio signal is generated after a piece of SCI is sequentially subjected to CRC Insertion, Channel Coding, Rate Matching, Scrambling, Modulation, Transform Precoding, Mapping to Physical Resources, OFDM Baseband Signal Generation, and Modulation and Upconversion.

In one embodiment, the first radio signal is generated after a piece of control information is sequentially subjected to CRC Insertion, Channel Coding, Rate Matching, Scrambling, Modulation, Mapping to Physical Resources, OFDM Baseband Signal Generation, and Modulation and Upconversion.

In one embodiment, the first radio signal is generated after a piece of SCI is sequentially subjected to CRC Insertion, Channel Coding, Rate Matching, Scrambling, Modulation, Transform Precoding, Mapping to Physical Resources, OFDM Baseband Signal Generation, and Modulation and Upconversion.

In one embodiment, the X first-type measurement value(s) being used for the target second-type measurement means that the X first-type measurement value(s) is(are) used in the process of performing the target second-type measurement.

In one embodiment, the X first-type measurement value(s) being used for the target second-type measurement means that the X first-type measurement value(s) is(are) used as an input to the target second-type measurement.

In one embodiment, the X first-type measurement value(s) being used for the target second-type measurement means that the target second-type measurement is related to the X first-type measurement value(s).

In one embodiment, the X first-type measurement value(s) being used for the target second-type measurement means that the target second-type measurement is used for acquiring a second-type measurement value, and the second-type measurement value is related to the X first-type measurement value(s).

In one embodiment, the X first-type measurement value(s) being used for the target second-type measurement means that the target second-type measurement is used for acquiring a second-type measurement value, and the X first-type measurement value(s) is(are) used for acquiring the second-type measurement value.

In one embodiment, a second-type measurement value acquired after performing the target second-type measurement being used for determining at least one of an MCS employed by the first radio signal or time-frequency resources occupied by the first radio signal comprises that the second-type measurement value acquired after performing the target second-type measurement is used for determining an MCS employed by the first radio signal and time-frequency resources occupied by the first radio signal.

In one embodiment, a second-type measurement value acquired after performing the target second-type measurement being used for determining at least one of an MCS employed by the first radio signal or time-frequency resources occupied by the first radio signal comprises that the second-type measurement value acquired after performing the target second-type measurement is used for determining an MCS employed by the first radio signal.

In one embodiment, a second-type measurement value acquired after performing the target second-type measurement being used for determining at least one of an MCS employed by the first radio signal or time-frequency resources occupied by the first radio signal comprises that the second-type measurement value acquired after performing the target second-type measurement is used for determining time-frequency resources occupied by the first radio signal.

In one embodiment, a second-type measurement value acquired after performing the target second-type measurement being used for determining at least one of an MCS employed by the first radio signal or time-frequency resources occupied by the first radio signal means that a second-type measurement value acquired after performing the target second-type measurement is used for determining at least one of an MCS employed by the first radio signal or time-frequency resources occupied by the first radio signal based on a given mapping relation.

In one embodiment, a second-type measurement value acquired after performing the target second-type measurement being used for determining at least one of an MCS employed by the first radio signal or time-frequency resources occupied by the first radio signal means that a second-type measurement value acquired after performing the target second-type measurement is used for determining at least one of an MCS employed by the first radio signal or time-frequency resources occupied by the first radio signal based on a given functional relation.

In one embodiment, a second-type measurement value acquired after performing the target second-type measurement being used for determining at least one of an MCS employed by the first radio signal or time-frequency resources occupied by the first radio signal means that a second-type measurement value acquired after performing the target second-type measurement is used for determining at least one of an MCS employed by the first radio signal or time-frequency resources occupied by the first radio signal based on a given table relation.

In one embodiment, a second-type measurement value acquired after performing the target second-type measurement being used for determining at least one of an MCS employed by the first radio signal or time-frequency resources occupied by the first radio signal means that a second-type measurement value acquired after performing the target second-type measurement is used for determining at least one of an MCS employed by the first radio signal or time-frequency resources occupied by the first radio signal based on a given corresponding relation.

In one embodiment, the MCS employed by the first radio signal is one of BPSK, Pi/2 BPSK, QPSK, 16QAM, 64QAM, 256QAM, or 1024QAM.

In one embodiment, time-frequency resources occupied by the first radio signal comprises time-domain resources occupied by the first radio signal.

In one embodiment, time-frequency resources occupied by the first radio signal comprises frequency-domain resources occupied by the first radio signal.

In one embodiment, time-frequency resources occupied by the first radio signal comprises time-domain resources and frequency-domain resources occupied by the first radio signal.

In one embodiment, time-frequency resources occupied by the first radio signal comprises an absolute number of time-frequency resources occupied by the first radio signal.

In one embodiment, time-frequency resources occupied by the first radio signal comprises an absolute number of time-domain resources occupied by the first radio signal.

In one embodiment, time-frequency resources occupied by the first radio signal comprises an absolute number of frequency-domain resources occupied by the first radio signal.

In one embodiment, for a given SCS and CP length, time-frequency resources occupied by the first radio signal comprises REs occupied by the first radio signal.

In one embodiment, for a given SCS and CP length, time-frequency resources occupied by the first radio signal comprises a number of multicarrier symbols occupied by the first radio signal.

In one embodiment, for a given SCS and CP length, time-frequency resources occupied by the first radio signal comprises a number of subcarriers occupied by the first radio signal.

In one embodiment, for a given SCS and CP length, time-frequency resources occupied by the first radio signal comprises a number of REs occupied by the first radio signal.

In one embodiment, for a given SCS and CP length, time-frequency resources occupied by the first radio signal comprises a number of sub-channels occupied by the first radio signal.

In one embodiment, for a given SCS and CP length, time-frequency resources occupied by the first radio signal comprises a number of PRBs occupied by the first radio signal.

In one embodiment, an SCS of subcarriers occupied by the first radio signal is one of 15 kHz, 30 kHz, 60 kHz, 120 kHz, 240 kHz, 480 kHz, or 960 kHz.

In one embodiment, an SCS of subcarriers occupied by the first radio signal is equal to 15 kHz multiplied by a non-negative integral power of 2.

In one embodiment, the target time-frequency resource pool is an only one of Q alternative time-frequency resource pools related to an SCS of subcarriers occupied by the first radio signal.

In one embodiment, each of q alternative time-frequency resource pools in the Q alternative time-frequency resource pools is related to an SCS of subcarriers occupied by the first radio signal, the target time-frequency resource pool is one of the q alternative time-frequency resource pools, q being a positive integer greater than 1 and no greater than the Q.

In one subembodiment of the above embodiment, the q is less than the Q.

In one subembodiment of the above embodiment, the q is equal to the Q.

In one embodiment, a position of the target time-frequency resource pool in the Q alternative time-frequency resource pool is related to an SCS of subcarriers occupied by the first radio signal.

In one subembodiment of the above embodiment, the Q alternative time-frequency resource pools are sequentially indexed, and a position of the target time-frequency resource pool in the Q alternative time-frequency resource pool in the Q alternative time-frequency resource pools refers to an index of the target time-frequency resource pool in the Q candidate time-frequency resource pools.

In one subembodiment of the above embodiment, the Q alternative time-frequency resource pools are sequentially arranged, and a position of the target time-frequency resource pool in the Q alternative time-frequency resource pools refers to an arrangement sequence of the target time-frequency resource pool in the Q candidate time-frequency resource pools.

In one embodiment, an SCS of subcarriers occupied by the first radio signal is used for determining the target time-frequency resource pool out of the Q alternative time-frequency resource pools.

In one subembodiment of the above embodiment, only one of the Q alternative time-frequency resource pools is related to an SCS of subcarriers occupied by the first radio signal, and the target time-frequency resource pool is one of the Q alternative time-frequency resource pools related to an SCS of subcarriers occupied by the first radio signal.

In one subembodiment of the above embodiment, each of q alternative time-frequency resource pools in the Q alternative time-frequency resource pools is related to an SCS of subcarriers occupied by the first radio signal, the target time-frequency resource pool is one of the q alternative time-frequency resource pools, q being a positive integer greater than 1 and no greater than the Q.

In one embodiment, the Q alternative time-frequency resource pools are pre-configured.

In one embodiment, the Q alternative time-frequency resource pools are pre-defined.

In one embodiment, the Q alternative time-frequency resource pools are fixed.

In one embodiment, the Q alternative time-frequency resource pools are configured.

In one embodiment, time-frequency resources comprised in any two of the Q alternative time-frequency resource pools are different.

In one embodiment, there exist two of the Q alternative time-frequency resource pools that comprise same time-frequency resources.

In one embodiment, any two of the Q alternative time-frequency resource pools are orthogonal in frequency domain (non-overlapping).

In one embodiment, there exist two of the Q alternative time-frequency resource pools being orthogonal in frequency domain (non-overlapping).

In one embodiment, at least two of the Q alternative time-frequency resource pools are orthogonal in frequency domain (non-overlapping).

In one embodiment, any two of the Q alternative time-frequency resource pools are overlapping in frequency domain (non-orthogonal).

In one embodiment, there exist two of the Q alternative time-frequency resource pools being overlapping in frequency domain (non-orthogonal).

In one embodiment, at least two of the Q alternative time-frequency resource pools are overlapping in frequency domain (non-orthogonal).

In one embodiment, frequency-domain resources of each of the Q alternative time-frequency resource pools belong to a first subband.

In one subembodiment of the above embodiment, the first subband comprises a positive integer number of sub-carrier(s).

In one subembodiment of the above embodiment, the first subband comprises a positive integer number of subband(s).

In one subembodiment of the above embodiment, the first subband comprises a Bandwidth Part (BWP).

In one subembodiment of the above embodiment, the first subband comprises a Carrier.

In one embodiment, there exist frequency-domain resources respectively comprised in two of the Q alternative time-frequency resource pools belonging to a first subband.

In one subembodiment of the above embodiment, the first subband comprises a positive integer number of sub-carrier(s).

In one subembodiment of the above embodiment, the first subband comprises a positive integer number of subband(s).

In one subembodiment of the above embodiment, the first subband comprises a BWP.

In one subembodiment of the above embodiment, the first subband comprises a carrier.

In one embodiment, frequency resources respectively comprised in at least two of the Q alternative time-frequency resource pools belong to a first subband.

In one subembodiment of the above embodiment, the first subband comprises a positive integer number of sub-carrier(s).

In one subembodiment of the above embodiment, the first subband comprises a positive integer number of subband(s).

In one subembodiment of the above embodiment, the first subband comprises a BWP.

In one subembodiment of the above embodiment, the first subband comprises a carrier.

In one embodiment, any two of the Q alternative time-frequency resource pools respectively belong to different BWPs.

In one embodiment, there exist two of the Q alternative time-frequency resource pools respectively belonging to different BWPs.

In one embodiment, at least two of the Q alternative time-frequency resource pools respectively belong to different BWPs.

In one embodiment, any two of the Q alternative time-frequency resource pools respectively belong to different carriers.

In one embodiment, there exist two of the Q alternative time-frequency resource pools respectively belonging to different carriers.

In one embodiment, at least two of the Q alternative time-frequency resource pools respectively belong to different carriers.

In one embodiment, any two of the Q alternative time-frequency resource pools respectively belong to different subbands.

In one embodiment, there exist two of the Q alternative time-frequency resource pools respectively belonging to different subbands.

In one embodiment, at least two of the Q alternative time-frequency resource pools respectively belong to different subbands.

Embodiment 2

Figure 2:
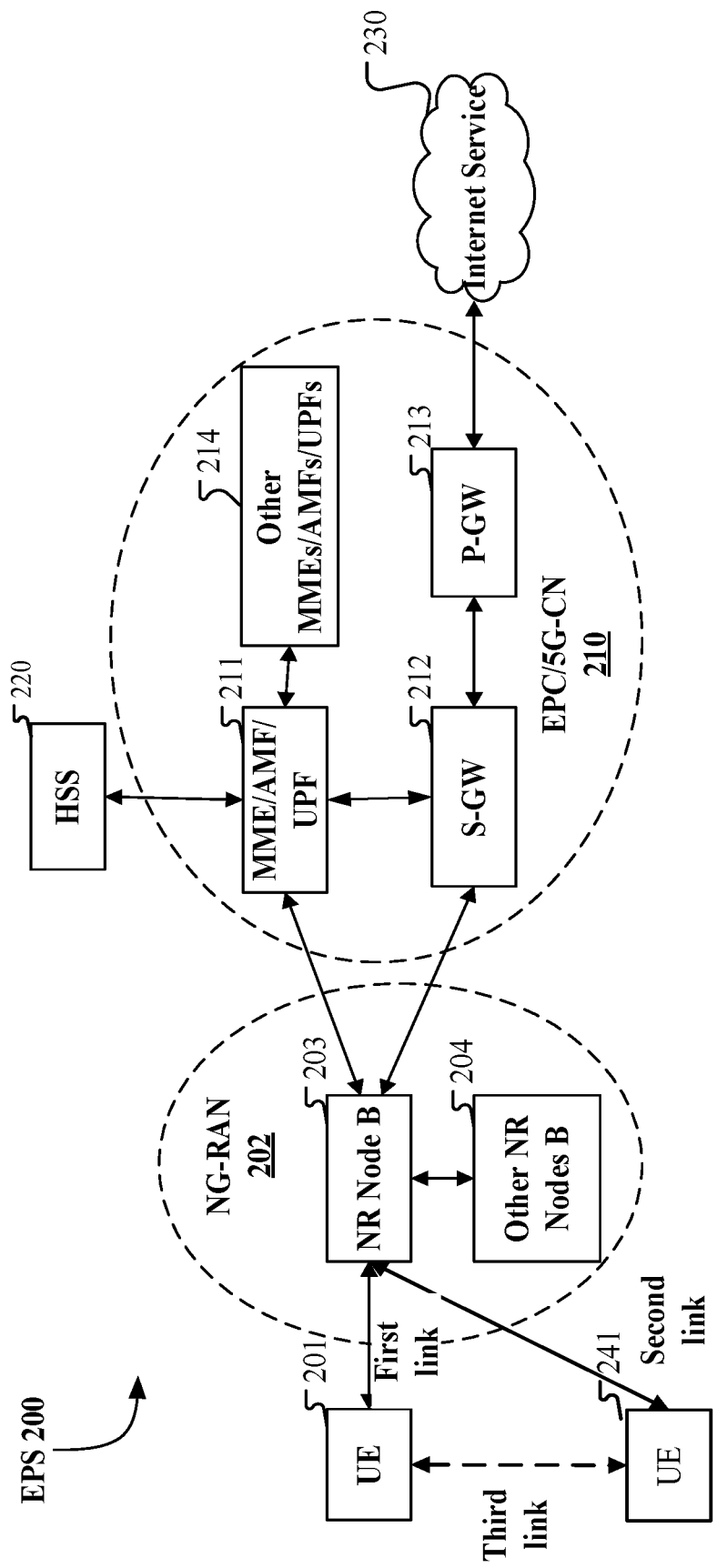
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellites or a Road Side Unit (RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first-type communication node device in the present disclosure.

In one embodiment, the UE 201 supports Sidelink transmission.

In one embodiment, the UE 201 supports a PC5 interface.

In one embodiment, the UE201 supports Vehicle-to-Everything.

In one embodiment, the UE201 supports V2X traffic.

In one embodiment, the gNB 203 corresponds to the second-type communication node in the present disclosure.

In one embodiment, the gNB203 supports Vehicle-to-Everything.

In one embodiment, the gNB203 supports V2X traffic.

Embodiment 3

Figure 3:
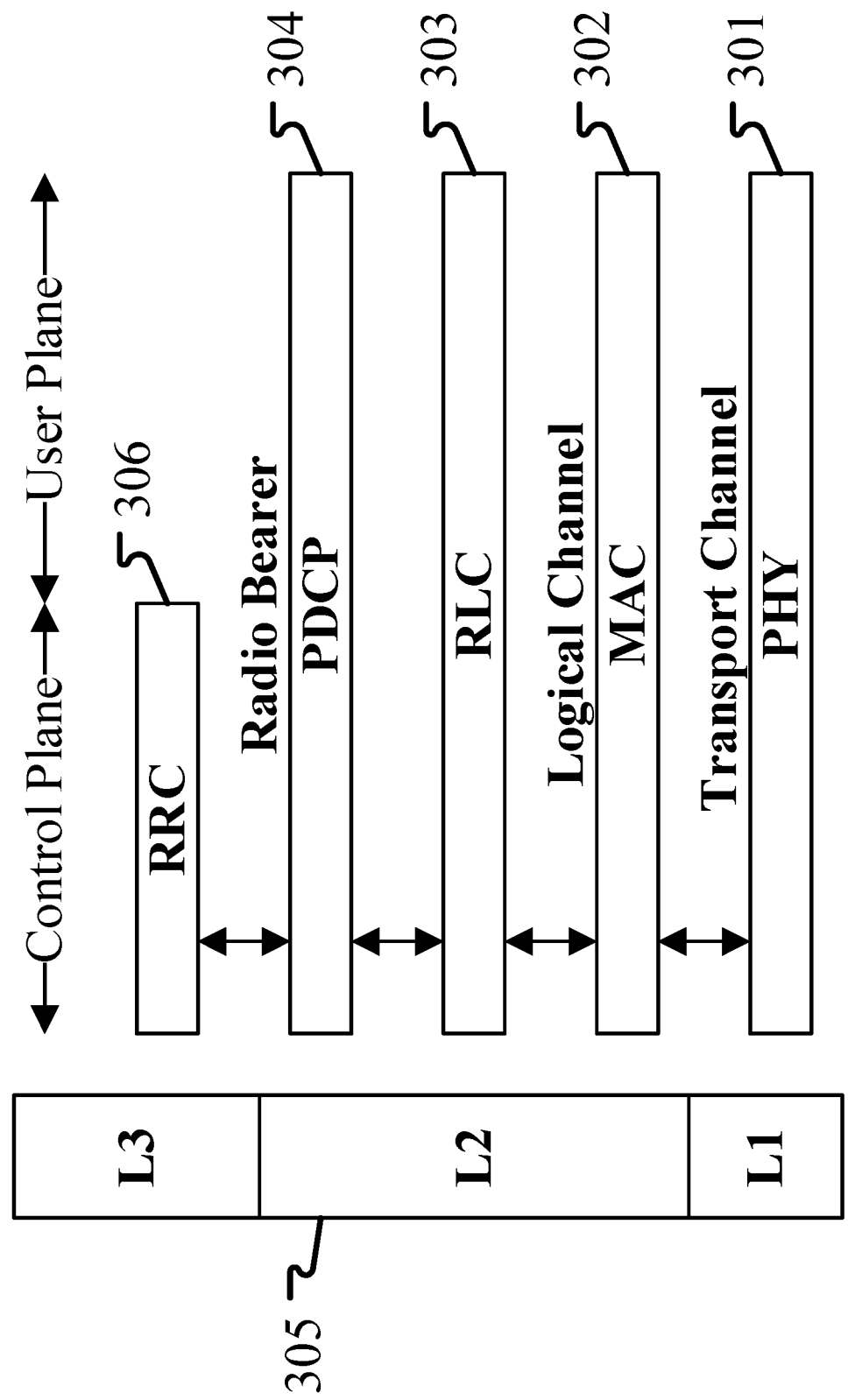
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane. In FIG. 3, the radio protocol architecture between a first-type communication node (UE) and a second-type communication node (gNB, eNB or RSU in V2X), or between two first-type communication nodes (UE) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node, and a link between two first-type communication nodes (UEs) via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication node of the network side. Although not described in FIG. 3, the first-type communication node may comprise several higher layers above the L2 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for first-type communication node handover between second-type communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first-type communication nodes various radio resources (e.g., resource block) in a cell. The MAC sublayer 302 is also in charge of HARQ operation. In the control plane, the radio protocol architecture of the first-type communication node and the second-type communication node is almost the same as the radio protocol architecture on the PHY 301 and the L2 305, but there is no header compression for the control plane. The control plane also comprises a Radio Resource Control (RRC) sublayer 306 in the layer 3 (L3). The RRC sublayer 306 is responsible for obtaining radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the X first-type measurement value(s) in the present disclosure is(are) acquired on the RRC sublayer 306.

In one embodiment, the X first-type measurement value(s) in the present disclosure is(are) acquired on the MAC sublayer 302.

In one embodiment, the X first-type measurement value(s) in the present disclosure is(are) acquired on the PHY 301.

In one embodiment, the second-type measurement value in the present disclosure is acquired on the RRC sublayer 306.

In one embodiment, the second-type measurement value in the present disclosure is acquired on the MAC sublayer 302.

In one embodiment, the second-type measurement value in the present disclosure is acquired on the PHY 301.

In one embodiment, the first radio signal in the present disclosure is generated by the RRC sublayer 306.

In one embodiment, the first radio signal in the present disclosure is generated by the MAC sublayer 302.

In one embodiment, the first radio signal in the present disclosure is generated by the PHY 301.

In one embodiment, the Y third-type measurement value(s) in the present disclosure is(are) acquired on the RRC sublayer 306.

In one embodiment, the Y third-type measurement value(s) in the present disclosure is(are) acquired on the MAC sublayer 302.

In one embodiment, the Y third-type measurement value(s) in the present disclosure is(are) acquired on the PHY 301.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

In one embodiment, the third information in the present disclosure is generated by the RRC sublayer 306.

In one embodiment, the third information in the present disclosure is generated by the MAC sublayer 302.

In one embodiment, the third information in the present disclosure is generated by the PHY 301.

In one embodiment, the first signaling in the present disclosure is generated by the RRC sublayer 306.

In one embodiment, the first signaling in the present disclosure is generated by the PHY Embodiment 4

Figure 4:
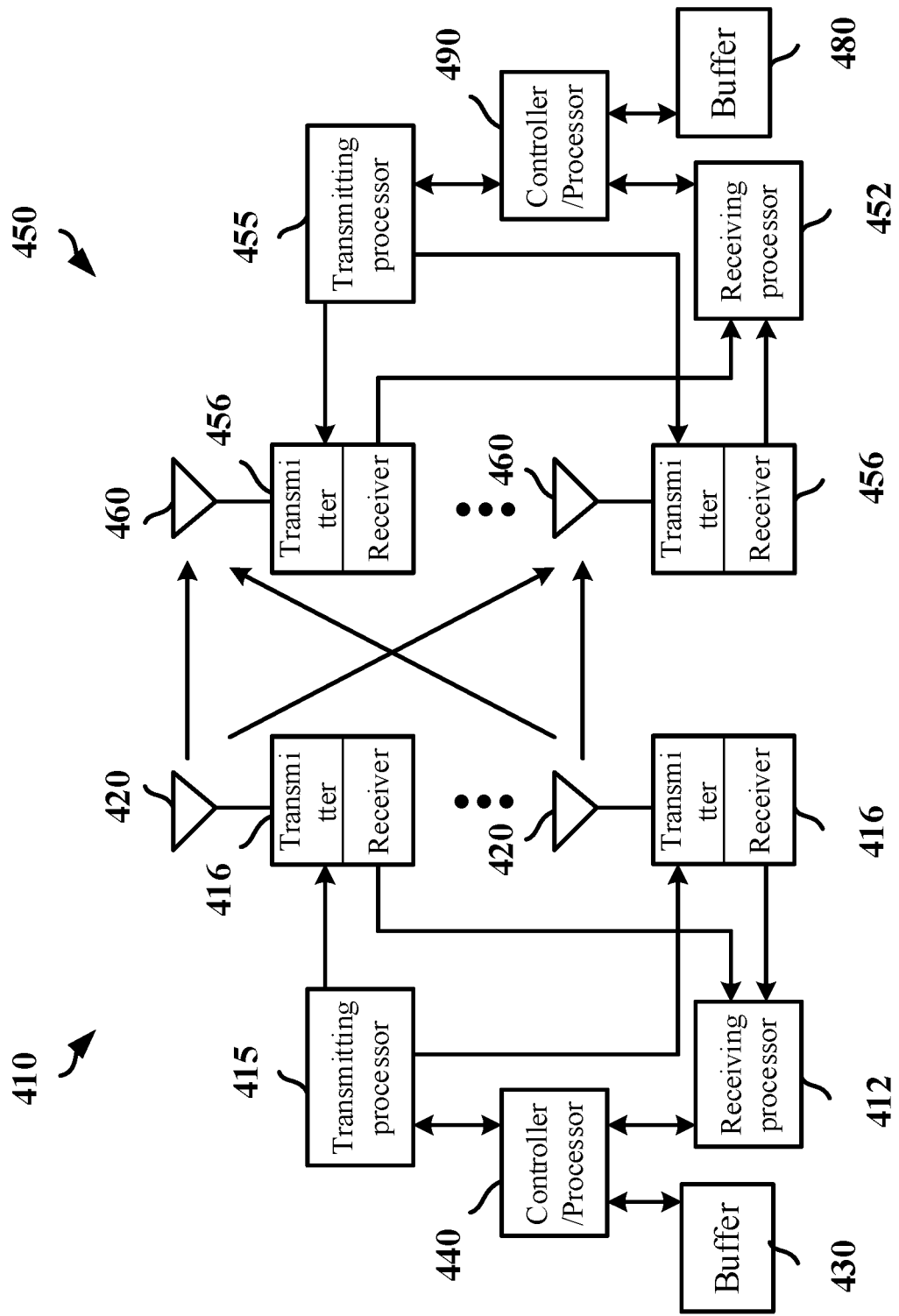
FIG. 4 illustrates a schematic diagram of a first-type communication node and a second-type communication node according to one embodiment of the present disclosure.

Embodiment 4 illustrates a schematic diagram of a first-type communication node and a second-type communication node in the present disclosure, as shown in FIG. 4.

The first-type communication node (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer protocols used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling. the receiving processor 452 performs various signal receiving processing functions used for the L1 layer (that is, PHY), including decoding, deinterleaving, descrambling, demodulation, de-precoding and extraction of physical layer control signaling. The transmitter 456 is configured to convert a baseband signal provided by the transmitting processor 455 into a radio frequency (RF) signal to be transmitted via the antenna 460, and the receiver 456 is used to convert the RF signal received via the antenna 460 into a baseband signal to be provided to the receiving processor 452.

The second-type communication node (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH. The transmitting processor 415 performs various signal transmitting processing functions used for the L1 layer (that is, PHY), including coding, interleaving, scrambling, modulation, power control/allocation, precoding and generation of physical layer signalings (including a synchronization signal, a reference signal and etc.). The receiving processor 412 performs various signal receiving processing functions used for the L1 layer (that is, PHY), including decoding, deinterleaving, descrambling, demodulation, de-precoding and extraction of physical layer signaling. The transmitter 416 is configured to convert a baseband signal provided by the transmitting processor 415 into an RF signal to be transmitted via the antenna 420, and the receiver 416 is configured to convert a radio-frequency signal received through the antenna 420 into a baseband signal to be provided to the receiving processor 412.

In Downlink (DL) transmission, a higher layer packet (for example, first information, second information and third information in the present disclosure) is provided to the controller/processor 440. The controller/processor 440 implements functions of L2 layer. In DL transmission, the controller/processor 440 provides header compression, encryption, packet segmentation and reordering and multiplexing between a logical channel and a transport channel, as well as radio resource allocation for the first-type communication node 450 based on varied priorities. The controller/processor 440 is also in charge of HARQ operation, retransmission of a lost packet, and a signaling to the first-type communication node 450, for instance, the first information, the second information and the third information in the present disclosure are all generated in the controller/processor 440. The transmitting processor 415 performs signal processing functions of the L1 layer (that is, PHY), including coding, interleaving, scrambling, modulation, power control/allocation, precoding and physical layer control signaling generation. Generation of physical layer signals carrying the first information, the second information and the third information of the present disclosure is performed in the transmitting processor 415. Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals. Corresponding channels of the first information, the second information and the third information of the present disclosure on physical layer are mapped from the transmitting processor 415 to target radio resources and then mapped from the transmitter 416 to the antenna 420 to be transmitted in the form of RF signals. At the receiving side, each receiver 456 receives an RF signal via a corresponding antenna 460, each receiver 456 recovers baseband information modulated to the RF carrier and provides the baseband information to the receiving processor 452. The receiving processor 452 performs signal receiving processing functions of the L1 layer. The signal receiving processing functions include reception of physical layer signals carrying the first information, the second information and the third information of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second-type communication node 410 on a physical channel, and the data or control signals are later provided to the controller/processor 490. The controller/processor 490 implements the functionality of the L2 layer, the controller/processor 490 interprets the first information, the second information and the third information of the present disclosure. The controller/processor can be connected to a memory 480 that stores program code and data. The memory 480 may be called a computer readable medium.

In one embodiment, the first-type communication node 450 comprises at least one processor and at least one memory. The at least one memory comprises computer program codes; the at least one memory and the computer program codes are configured to be used in collaboration with the at least one processor, the first-type communication node 450 at least performs X first-type measurement(s) in a target time-frequency-resource-pool, and the X first-type measurement(s) is(are respectively) used for acquiring X first-type measurement value(s), X being a positive integer; performs a target second-type measurement, the target second-type measurement is used for acquiring a second-type measurement value; and transmits a first radio signal; herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal.

In one embodiment, the first-type communication node 450 comprises a memory that stores a computer readable instruction program. The computer readable instruction program generates an action when executed by at least one processor. The action includes: performing X first-type measurement(s) in a target time-frequency-resource-pool, the X first-type measurement(s) being respectively used for acquiring X first-type measurement value(s), X being a positive integer; performing a target second-type measurement, the target second-type measurement being used for acquiring a second-type measurement value; and transmitting a first radio signal; herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal.

In one embodiment, the second-type communication node 410 comprises at least one processor and at least one memory. The at least one memory comprises computer program codes; the at least one memory and the computer program codes are configured to be used in collaboration with the at least one processor. The second-type communication node 410 at least: transmits first information; herein, X first-type measurement(s) performed in a target time-frequency resource pool is(are) respectively used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, and the target second-type measurement is used for acquiring a second-type measurement value; the second-type measurement value acquired after performing the target second-type measurement is used for determining at least one of an MCS employed by the first radio signal or time-frequency resources occupied by the first radio signal; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold.

In one embodiment, the second-type communication node 410 comprises a memory that stores a computer readable instruction program. The computer readable instruction program generates an action when executed by at least one processor. The action includes: transmitting first information; herein, X first-type measurement(s) performed in a target time-frequency resource pool is(are) used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, and the target second-type measurement is used for acquiring a second-type measurement value; the second-type measurement value acquired after performing the target second-type measurement is used for determining at least one of an MCS employed by the first radio signal or time-frequency resources occupied by the first radio signal; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold.

In one embodiment, the receiver 456 (including the antenna 460), the receiving processor 452 and the controller/processor 490 are used for receiving the first information in the present disclosure.

In one embodiment, the transmitter 416 (including the antenna 420), the transmitting processor 415 and the controller/processor 440 are used for transmitting the first information in the present disclosure.

In one embodiment, the receiver 456 (including the antenna 460), the receiving processor 452 and the controller/processor 490 are used for receiving the second information in the present disclosure.

In one embodiment, the transmitter 416 (including the antenna 420), the transmitting processor 415 and the controller/processor 440 are used for transmitting the second information in the present disclosure.

In one embodiment, the receiver 456 (including the antenna 460), the receiving processor 452 and the controller/processor 490 are used for receiving the third information in the present disclosure.

In one embodiment, the transmitter 416 (including the antenna 420), the transmitting processor 415 and the controller/processor 440 are used for transmitting the third information in the present disclosure.

Embodiment 5

Figure 5:
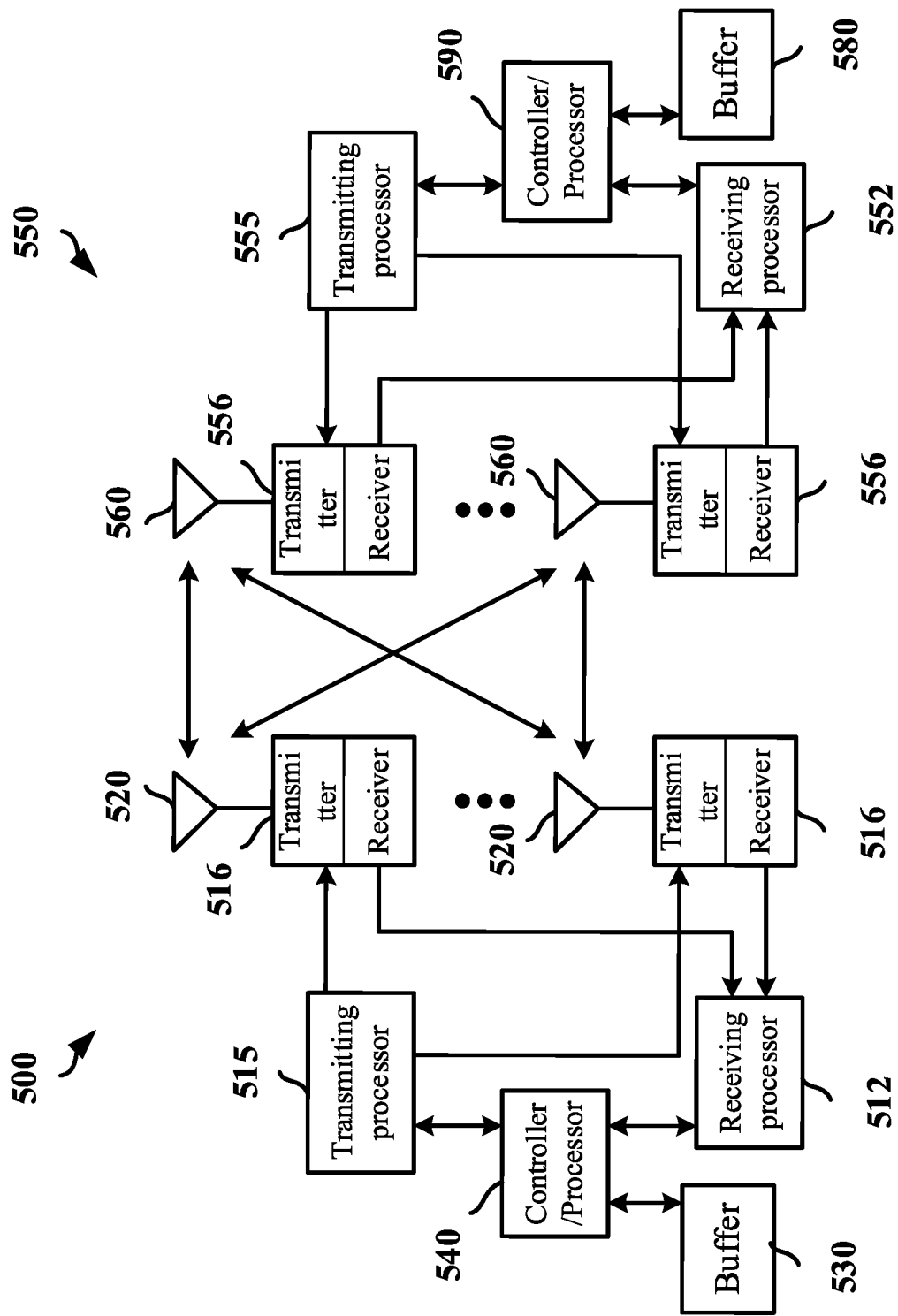
FIG. 5 illustrates a schematic diagram of two first-type communication nodes according to one embodiment of the present disclosure.

Embodiment 5 illustrates a schematic diagram of two first-type communication nodes according to one embodiment of the present disclosure, as shown in FIG. 5.

A first-type communication node (550) comprises a controller/processor 590, a memory 580, a receiving processor 552, a transmitter/receiver 556, a transmitting processor 555 and a data source 567, wherein the transmitter/receiver 556 comprises an antenna 560. The data source 567 provides a higher layer packet to the controller/processor 590, the controller/processor 590 provides header compression and decompression, encryption and decryption, packet segmentation and reordering and multiplexing and demultiplexing between a logical channel and a transport channel so as to implement protocols of the L2 layer. The higher layer packet may comprise data or control information, such as SL-SCH. The transmitting processor 555 performs various signal transmitting processing functions of the L1 layer (i.e., PHY), including coding, interleaving, scrambling, modulation, power control/allocation, precoding and physical layer control signaling generation. The receiving processor 552 performs various signal receiving processing functions of the L1 layer (i.e., PHY), including decoding, de-interleaving, descrambling, demodulation, de-precoding and physical layer control signaling extraction. The transmitter 556 is configured to convert a baseband signal provided by the transmitting processor 555 into an RF signal to be transmitted via the antenna 560, the receiver 556 is configured to convert the RF signal received via the antenna 560 into a baseband signal to be provided to the receiving processor 552. The composition of another first-type communication node (500) is the same as that of the first-type communication node 550.

In sidelink transmission, a higher layer packet (e.g., the first radio signal in the present disclosure) is provided to the controller/processor 540, the controller/processor 540 implements the functionality of the L2 layer. In sidelink transmission, the controller/processor 540 provides header compression, encryption, packet segmentation and reordering, and multiplexing between a logical channel and a transport channel. The controller/processor 540 is also responsible for HARQ operation (if supportive), repeated transmission, and a signaling to the first-type communication node 550. The transmitting processor 515 performs various signal processing functions of the L1 layer (that is, PHY), including coding, interleaving, scrambling, modulation, power control/allocation, precoding and physical layer control signaling generation. Generation of a physical layer signal carrying the first signaling of the present disclosure is performed in the transmitting processor 515. Modulated symbols are divided into parallel streams and each stream is mapped onto corresponding multicarrier subcarriers and/or multicarrier symbols, which are then mapped from the transmitting processor 515 to the antenna 520 via the transmitter 516 to be transmitted in the form of RF signals. At the receiving side, each receiver 556 receives an RF signal via a corresponding antenna 560, each receiver 556 recovers baseband information modulated to the RF carrier and provides the baseband information to the receiving processor 552. The receiving processor 552 performs signal receiving processing functions of the L1 layer. The signal receiving processing functions include reception of physical layer signals carrying the first signaling and the first radio signal of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first-type communication node 500 on a physical channel, and the data or control signals are later provided to the controller/processor 590. The controller/processor 590 implements the functionality of the L2 layer, the controller/processor 590 interprets the first radio signal of the present disclosure. The controller/processor can be connected to a memory 580 that stores program code and data. The memory 580 may be called a computer readable medium. Particularly, in the first-type communication node 500, RF signals measured by the X first-type measurement(s) in the present disclosure are received by the receiver 516, and are then subjected to processing and measurement by the receiving processor 512, after that these signals are provided to the controller/processor 540 for filtering. The controller/processor 540 performs the target second-type measurement in the present disclosure according to result of X first-type measurement(s). The Y measurement(s) of the present disclosure is(are) performed in the controller/processor 540.

In one embodiment, the first-type communication node (500) comprises at least one processor and at least one memory. The at least one memory comprises computer program codes; the at least one memory and the computer program codes are configured to be used in collaboration with the at least one processor. The first-type communication node (500) at least performs X first-type measurement(s) in a target time-frequency-resource-pool, and the X first-type measurement(s) is(are respectively) used for acquiring X first-type measurement value(s), X being a positive integer; performs a target second-type measurement, the target second-type measurement being used for acquiring a second-type measurement value; and transmitting a first radio signal; herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal.

In one embodiment, the first-type communication node (500) comprises a memory that stores a computer readable instruction program. The computer readable instruction program generates an action when executed by at least one processor. The action includes: performing X first-type measurement(s) in a target time-frequency-resource-pool, the X first-type measurement(s) being respectively used for acquiring X first-type measurement value(s), X being a positive integer; performing a target second-type measurement, the target second-type measurement being used for acquiring a second-type measurement value; and transmitting a first radio signal; herein, the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; and the second-type measurement value acquired after performing the target second-type measurement is used for determining at least one of an MCS employed by the first radio signal or time-frequency resources occupied by the first radio signal.

In one embodiment, the transmitter 516 (including the antenna 520), the transmitting processor 515 and the controller/processor 540 are used for transmitting the first radio signal in the present disclosure.

In one embodiment, the receiver 556 (including the antenna 560), the receiving processor 552 and the controller/processor 590 are used for receiving the first radio signal in the present disclosure.

In one embodiment, the transmitter 516 (including the antenna 520), the transmitting processor 515 and the controller/processor 540 are used for transmitting the first signaling in the present disclosure.

In one embodiment, the receiver 556 (including the antenna 560), the receiving processor 552 and the controller/processor 590 are used for receiving the first signaling in the present disclosure.

In one embodiment, the receiver 516 (including the antenna 520), the receiving processor 512 and the controller/processor 540 are used for performing the X first-type measurement(s) in the present disclosure.

In one embodiment, the receiver 516 (including the antenna 520), the receiving processor 512 and the controller/processor 540 are used for performing the Q0 group(s) of first-type measurements in the present disclosure.

In one embodiment, the controller/processor 540 is used for performing the target second-type measurement in the present disclosure.

In one embodiment, the controller/processor 540 is used for performing the Q1 second-type measurement(s) in the present disclosure.

In one embodiment, the controller/processor 540 is used for performing the Y third-type measurement(s) in the present disclosure.

In one embodiment, the controller/processor 540 is used for determining a target time-frequency resource pool out of Q alternative time-frequency resource pools.

Embodiment 6

Figure 6:
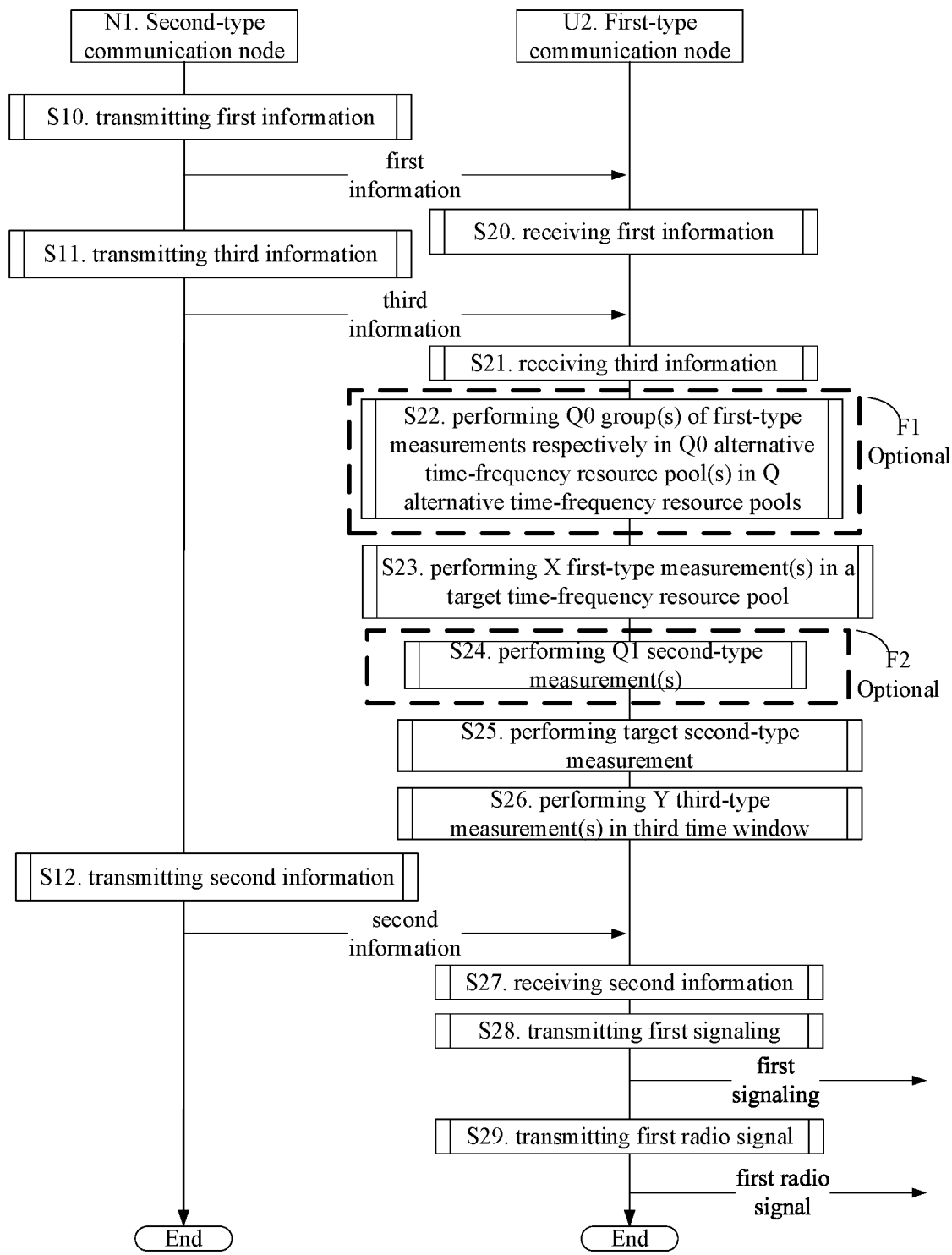
FIG. 6 illustrates a flowchart of a radio signal transmission according to one embodiment of the present disclosure.

Embodiment 6 illustrates a flowchart of radio signal transmission according to one embodiment of the present disclosure, as shown in FIG. 6. In FIG. 6, a second-type communication node N1 is a maintenance base station of a serving cell of a first-type communication node U2. In FIG. 6, boxes F1 and F2 are optional.

The second-type communication node N1 transmits first information in step S10;
  transmits third information in step S11; and transmits second information in step S12.

The first-type communication node U2 receives first information in step S20; receives third information in step S21; and performs Q0 group(s) of first-type measurements respectively in Q0 alternative time-frequency resource pool(s) of Q alternative time-frequency resource pools in step S22; performs X first-type measurement(s) in a target time-frequency resource pool in step S23; performs Q1 second-type measurement(s) in step S24; performs a target second-type measurement in step S25; performs Y third-type measurement(s) in a third time window in step S26; receives second information in step S27; transmits a first signaling in step S28; and transmits a first radio signal in step S29.

In Embodiment 6, the X first-type measurement(s) is(are) respectively used for acquiring X first-type measurement value(s), X being a positive integer; the target second-type measurement is used for acquiring a second-type measurement value; the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal. Each of the Q0 group(s) of first-type measurements is respectively used for acquiring Q0 group(s) of first-type measurement values; each of the Q0 alternative time-frequency resource pool(s) is different from the target time-frequency resource pool, Q0 being a positive integer less than the Q. The Q1 second-type measurement(s) is (are respectively) used for acquiring Q1 second-type measurement value(s); Q1 group(s) of first-type measurement value(s) in the Q0 group(s) of first-type measurement values is (are respectively) used for the Q1 second-type measurement(s), Q1 being a positive integer no greater than the Q0; each of the Q1 second-type measurement value(s) is no less than the second-type measurement value acquired after performing the target second-type measurement. Each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; the first information is used for determining the target threshold. The first signaling is used for indicating at least one of an MCS employed by the first radio signal or time-frequency resources occupied by the first radio signal, and the first signaling is transmitted via an air interface; each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal. The second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set. The third information is used for determining an SCS between subcarriers occupied by the first radio signal. The Y third-type measurement(s) is(are respectively) used for acquiring Y third-type measurement value(s), Y being a positive integer; the second-type measurement value acquired after performing the target second-type measurement is used for determining a first upper bound, a sum of the Y third-type measurement value(s) is no greater than the first upper bound, a time-domain position of the third time window is related to time-frequency resources occupied by the first radio signal, and the Y third-type measurement value(s) is related to a number of time-frequency resources occupied by a radio signal transmitted by a transmitter of the first radio signal in the third time window.

In one embodiment, the Q0 is equal to Q−1.

In one embodiment, the Q0 is less than Q−1.

In one subembodiment of the above embodiment, an SCS respectively corresponds to each of the Q0 alternative time-frequency resource pool(s) is equal to the SCS of subcarriers occupied by the first radio signal, and an SCS corresponding to any of the Q alternative time-frequency resource pools other than the Q0 alternative time-frequency resource pool(s) and the target time-frequency resource pool is not equal to the SCS of subcarriers occupied by the first radio signal.

In one embodiment, the Q alternative time-frequency resource pools respectively correspond to Q alternative SCSs, one of the Q alternative SCSs corresponding to the target time-frequency resource pool is the same as the SCS of subcarriers occupied by the first radio signal.

In one embodiment, any of the Q alternative time-frequency resource pools consists of a group of time-frequency resource subpools that occur periodically in time domain; all time-frequency resource subpools of the Q alternative time-frequency resource pools occupy equal numbers of multicarrier symbols, or, a number of multicarrier symbols occupied by any time-frequency resource subpool of the Q alternative time-frequency resource pools is related to its corresponding SCS.

In one embodiment, the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, and the characteristic measurement value is an average value of a sum of received power in each of the X2 multicarrier symbol(s) within frequency-domain resources occupied by the characteristic time-frequency unit.

In one embodiment, the Q0 is equal to Q−1.

In one embodiment, the Q0 is less than Q−1.

In one embodiment, an SCS respectively corresponds to each of the Q0 alternative time-frequency resource pool(s) is equal to an SCS of subcarriers occupied by the first radio signal.

In one embodiment, the Q0 is less than Q−1, an SCS respectively corresponds to each of the Q0 alternative time-frequency resource pool(s) is equal to an SCS of subcarriers occupied by the first radio signal, an SCS corresponding to any of the Q alternative time-frequency resource pools other than the Q0 alternative time-frequency resource pool(s) and the target time-frequency resource pool is not equal to an SCS of subcarriers occupied by the first radio signal.

In one embodiment, an SCS respectively corresponds to each of the Q0 alternative time-frequency resource pool(s) is not equal to an SCS of subcarriers occupied by the first radio signal.

In one embodiment, there exist SCSs respectively corresponding to two of the Q0 alternative time-frequency resource pools being equal to an SCS of subcarriers occupied by the first radio signal.

In one embodiment, there exist SCSs respectively corresponding to two of the Q0 alternative time-frequency resource pools not being equal to an SCS of subcarriers occupied by the first radio signal.

In one embodiment, any group of the Q0 group(s) of first-type measurements comprises a positive integer number of first-type measurements.

In one embodiment, there exist numbers of first-type measurements respectively comprised in two groups of the Q0 groups of first-type measurements being the same.

In one embodiment, numbers of first-type measurements respectively comprised in at least two groups of the Q0 groups of first-type measurements are the same.

In one embodiment, numbers of first-type measurements respectively comprised in any two groups of the Q0 groups of first-type measurements are the same.

In one embodiment, there exist numbers of first-type measurements respectively comprised in two groups of the Q0 groups of first-type measurements being different.

In one embodiment, numbers of first-type measurements respectively comprised in at least two groups of the Q0 groups of first-type measurements are different.

In one embodiment, numbers of first-type measurements respectively comprised in any two groups of the Q0 groups of first-type measurements are different.

In one embodiment, there exists a number of first-type measurements comprised in one group of the Q0 group(s) of first-type measurements being equal to the X.

In one embodiment, a number of first-type measurements comprised in at least one group of the Q0 group(s) of first-type measurements is equal to the X.

In one embodiment, a number of first-type measurements comprised in any one group of the Q0 group(s) of first-type measurements is equal to the X.

In one embodiment, there exists a number of first-type measurements comprised in one group of the Q0 group(s) of first-type measurements not being equal to the X.

In one embodiment, a number of first-type measurements comprised in at least one group of the Q0 group(s) of first-type measurements is not equal to the X.

In one embodiment, Q0+1 groups of first-type measurements comprise Q0 group(s) of first-type measurements and the X first-type measurement(s), the X first-type measurement(s) belongs(belong) to one group of the Q0+1 groups of first-type measurements other than any group of the Q0 group(s) of first-type measurements, Q0 being a positive integer less than Q; Q0+1 groups of first-type measurement values comprises the Q0 group(s) of first-type measurement values and the X first-type measurement value(s), the X first-type measurement value(s) belongs(belong) to one group of the Q0+1 groups of first-type measurement values other than any group of the Q0 group(s) of first-type measurement values.

In one subembodiment of the above embodiment, the first-type communication node performs all measurements in each group of the Q0+1 groups of first-type measurements.

In one subembodiment of the above embodiment, there exist each first-type measurement value of the Q0+1 groups of first-type measurement values in the first-type communication node.

In one subembodiment of the above embodiment, the first-type communication node performs and completes all measurements in each group of the Q0+1 groups of first-type measurements before transmitting the first radio signal.

In one subembodiment of the above embodiment, the first-type communication node is requested to perform and complete all measurements in each group of the Q0+1 groups of first-type measurements before transmitting the first radio signal.

In one subembodiment of the above embodiment, the first-type communication node stores the Q0+1 groups of first-type measurement values before transmitting the first radio signal.

In one subembodiment of the above embodiment, the first-type communication node is requested to store the Q0+1 groups of first-type measurement values before transmitting the first radio signal.

In one subembodiment of the above embodiment, the SCS of subcarriers occupied by the first radio signal is used for determining a group of first-type measurement values to which the X first-type measurement value(s) belongs(belong) in the Q0+1 groups of first-type measurement values.

In one subembodiment of the above embodiment, the SCS of subcarriers occupied by the first radio signal is used for determining a group of first-type measurement values to which the X first-type measurement value(s) belongs(belong) in the Q0+1 groups of first-type measurement values based on a corresponding relation.

In one subembodiment of the above embodiment, an arrangement sequence of the SCS of subcarriers occupied by the first radio signal in the Q alternative SCSs is used for determining a group of first-type measurement values to which the X first-type measurement value(s) belongs(belong) in the Q0+1 groups of first-type measurement values.

In one subembodiment of the above embodiment, a size order of the SCS of subcarriers occupied by the first radio signal in the Q alternative SCSs is used for determining a group of first-type measurement values to which the X first-type measurement value(s) belongs(belong) in the Q0+1 groups of first-type measurement values.

In one subembodiment of the above embodiment, an index of the SCS of subcarriers occupied by the first radio signal in the Q alternative SCSs is used for determining a group of first-type measurement values to which the X first-type measurement value(s) belongs(belong) in the Q0+1 groups of first-type measurement values.

In one subembodiment of the above embodiment, a group of first-type measurement values corresponding to the SCS of subcarriers occupied by the first radio signal in the Q0+1 groups of first-type measurement values are a group of first-type measurement values to which the X first-type measurement value(s) belongs(belong).

In one subembodiment of the above embodiment, one group of the Q0+1 groups of first-type measurement values acquired for the target time-frequency resource pool in the Q0+1 groups of first-type measurements are the one group of first-type measurement values of to which the X first-type measurement value(s) belongs(belong).

In one embodiment, the Q1 is equal to the Q0.

In one embodiment, the Q1 is less than the Q0.

In one embodiment, the target second-type measurement and any of the Q1 second-type measurement(s) belong to a same type of measurement.

In one embodiment, a second-type measurement is a measurement on Channel Busy Ratio (CBR).

In one embodiment, a second-type measurement is a measurement on Channel Busy Quantity (CBQ).

In one embodiment, a second-type measurement is used for determining a channel occupancy status of the channel(s) measured.

In one embodiment, a second-type measurement is used for determining a channel occupancy status within the frequency range measured.

In one embodiment, a first given group is any group of the Q1 group(s) of first-type measurement values, a given second-type measurement value is one of the Q1 second-type measurement value(s) acquired by the first given group, the first given group comprises Z first-type measurement value(s), Z being a positive integer; each of Z1 first-type measurement value(s) in the Z first-type measurement value(s) is greater than a given threshold, and the given second-type measurement value is equal to a ratio of the Z1 to the Z, Z1 being a non-negative integer no greater than Z; for a given SCS, the given threshold is configured or the given threshold is fixed.

In one subembodiment of the above embodiment, the given thresholds respectively corresponding to two different given SCSs are different or the same.

In one subembodiment of the above embodiment, the given thresholds respectively corresponding to two different given SCSs are different.

In one subembodiment of the above embodiment, the given thresholds respectively corresponding to two different given SCSs are the same.

In one subembodiment of the above embodiment, the given threshold and the target threshold are the same.

In one subembodiment of the above embodiment, the given threshold and the target threshold are different.

In one embodiment, a first given group is any group of the Q1 group(s) of first-type measurement values, a given second-type measurement value is one of the Q1 second-type measurement value(s) acquired by the first given group, the first given group comprises Z first-type measurement value(s), Z being a positive integer; each of Z1 first-type measurement value(s) in the Z first-type measurement value(s) is greater than a given threshold, and the second-type measurement value is equal to the Z1, Z1 being a non-negative integer no greater than Z; for a given SCS, the given threshold is configured or the given threshold is fixed.

In one subembodiment of the above embodiment, the given thresholds respectively corresponding to two different given SCSs are different or the same.

In one subembodiment of the above embodiment, the given thresholds respectively corresponding to two different given SCSs are different.

In one subembodiment of the above embodiment, the given thresholds respectively corresponding to two different given SCSs are the same.

In one subembodiment of the above embodiment, the given threshold and the target threshold are the same.

In one subembodiment of the above embodiment, the given threshold and the target threshold are different.

In one embodiment, the first information is a piece of higher layer information.

In one embodiment, the first information is a piece of physical layer information.

In one embodiment, the first information is transmitted via a physical layer signaling.

In one embodiment, the first information is transmitted via a higher layer signaling.

In one embodiment, the first information comprises all or part of a piece of higher layer information.

In one embodiment, the first information comprises all or part of a piece of physical layer information.

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more Fields in a System Information Block (SIB).

In one embodiment, the first information comprises one or more Fields in Remaining System Information (RMSI).

In one embodiment, the first information comprises all or part of a Radio Resource Control (RRC) signaling.

In one embodiment, the first information comprises all or part of a piece of RRC layer information.

In one embodiment, the first information comprises all or part of fields in an Information Element (IE) of a piece of RRC layer information.

In one embodiment, the first information is broadcast.

In one embodiment, the first information is unicast.

In one embodiment, the first information is Cell-Specific.

In one embodiment, the first information is UE-specific.

In one embodiment, the first information is transmitted through a Physical Downlink Control Channel (PDCCH).

In one embodiment, the first information comprises all or part of fields of a Downlink Control Information (DCI) signaling.

In one embodiment, the first information being used for determining the target threshold means that the first information is used by the first-type communication node for determining the target threshold.

In one embodiment, the first information being used for determining the target threshold means that the first information directly indicates the target threshold.

In one embodiment, the first information being used for determining the target threshold means that the first information indirectly indicates the target threshold.

In one embodiment, the first information being used for determining the target threshold means that the first information explicitly indicates the target threshold.

In one embodiment, the first information being used for determining the target threshold means that the first information implicitly indicates the target threshold.

In one embodiment, the first information employs a design as the same as "threshS-RSSI-CBR-r14" in an IE "SL-CommResourcePool" in 3GPP TS36.331 (v15.2.0).

In one embodiment, the first information is transmitted via an air interface.

In one embodiment, the first information is transmitted via a Uu interface.

In one embodiment, the first information is transmitted by a radio signal.

In one embodiment, the first information is transmitted from the second-type communication node to the first-type communication node in the present disclosure.

In one embodiment, the first information is transmitted from a higher layer of the first-type communication node to a physical layer of the first-type communication node.

In one embodiment, the first information is transferred internally within the first-type communication node.

In one embodiment, the first information being used for determining the target threshold means that the target threshold is equal to a threshold in a first threshold set, the first threshold set comprises a positive integer number of threshold(s), wherein threshold(s) in the first threshold set is(are) pre-defined or configured, the first information is used for determining the target threshold out of the first threshold set.

In one subembodiment of the above embodiment, threshold(s) in the first threshold set is(are) pre-defined.

In one subembodiment of the above embodiment, threshold(s) in the first threshold set is(are) configured.

In one embodiment, the first information being used for determining the target threshold means that the target threshold is equal to a threshold in a first threshold set, the first threshold set comprises a positive integer number of threshold(s), wherein threshold(s) in the first threshold set is(are) related to an SCS of subcarriers occupied by the first radio signal, the first information is used for determining the target threshold out of the first threshold set.

In one subembodiment of the above embodiment, threshold(s) in the first threshold set is(are) pre-defined.

In one subembodiment of the above embodiment, threshold(s) in the first threshold set is(are) configured.

In one embodiment, the target threshold is a non-negative real number no greater than 1.

In one embodiment, the target threshold is a non-negative rational number no greater than 1.

In one embodiment, any of the P alternative intervals is an interval of positive rational numbers.

In one embodiment, any of the P alternative intervals is an interval of positive real numbers.

In one embodiment, the second information is transmitted via an air interface.

In one embodiment, the second information is transmitted via a Uu interface.

In one embodiment, the second information is transmitted by a radio signal.

In one embodiment, the second information is transmitted from the second-type communication node to the first-type communication node in the present disclosure.

In one embodiment, the second information is transmitted from a higher layer of the first-type communication node to a physical layer of the first-type communication node.

In one embodiment, the second information is transferred internally within the first-type communication node.

In one embodiment, the second information is a piece of higher layer information.

In one embodiment, the second information is a piece of physical layer information.

In one embodiment, the second information is transmitted via a physical layer signaling.

In one embodiment, the second information is transmitted via a higher layer signaling.

In one embodiment, the second information comprises all or part of a piece of higher layer information.

In one embodiment, the second information comprises all or part of a piece of physical layer information.

In one embodiment, the second information is transmitted through a DL-SCH.

In one embodiment, the second information is transmitted through a PDSCH.

In one embodiment, the second information comprises one or more fields in a SIB.

In one embodiment, the second information comprises one or more fields in a piece of RMSI.

In one embodiment, the second information comprises all or part of an RRC signaling.

In one embodiment, the second information comprises all or part of a piece of RRC layer information.

In one embodiment, the second information comprises all or part of fields in an IE of a piece of RRC layer information.

In one embodiment, the second information is Broadcast.

In one embodiment, the second information is Unicast.

In one embodiment, the second information is Cell-Specific.

In one embodiment, the second information is UE-specific.

In one embodiment, the second information is transmitted through a PDCCH.

In one embodiment, the second information comprises all or part of fields of a DCI signaling.

In one embodiment, the second information being used for determining at least one of the MCS employed by the first radio signal or the time-frequency resources occupied by the first radio signal means that the second information is used by the first-type communication node for determining at least one of the MCS employed by the first radio signal or the time-frequency resources occupied by the first radio signal.

In one embodiment, the second information being used for determining at least one of the MCS employed by the first radio signal or the time-frequency resources occupied by the first radio signal means that the second information is used for directly indicating at least one of the MCS employed by the first radio signal or the time-frequency resources occupied by the first radio signal.

In one embodiment, the second information being used for determining at least one of the MCS employed by the first radio signal or the time-frequency resources occupied by the first radio signal means that the second information is used for indirectly indicating at least one of the MCS employed by the first radio signal or the time-frequency resources occupied by the first radio signal.

In one embodiment, the second information being used for determining at least one of the MCS employed by the first radio signal or the time-frequency resources occupied by the first radio signal means that the second information is used for explicitly indicating at least one of the MCS employed by the first radio signal or the time-frequency resources occupied by the first radio signal.

In one embodiment, the second information being used for determining at least one of the MCS employed by the first radio signal or the time-frequency resources occupied by the first radio signal means that the second information is used for implicitly indicating at least one of the MCS employed by the first radio signal or the time-frequency resources occupied by the first radio signal.

In one embodiment, the second information being used for determining at least one of the MCS employed by the first radio signal or the time-frequency resources occupied by the first radio signal means that the second information is used for indicating that the P alternative intervals, a second-type measurement value acquired by performing the target second-type measurement and the P alternative intervals are used for determining at least one of the MCS employed by the first radio signal or the time-frequency resources occupied by the first radio signal.

In one subembodiment of the above embodiment, the second information directly indicates the P alternative intervals.

In one subembodiment of the above embodiment, the second information indirectly indicates the P alternative intervals.

In one subembodiment of the above embodiment, the second information explicitly indicates the P alternative intervals.

In one subembodiment of the above embodiment, the second information implicitly indicates the P alternative intervals.

In one embodiment, the second information being used for determining at least one of the MCS employed by the first radio signal or the time-frequency resources occupied by the first radio signal means that the second information is used for indicating the P alternative intervals and the P alternative MCS sets, a second-type measurement value acquired after performing the target second-type measurement and correspondence relations between the P alternative intervals and the P alternative MCS sets are used for determining at least one of the MCS employed by the first radio signal or the time-frequency resources occupied by the first radio signal.

In one embodiment, the second information being used for determining at least one of the MCS employed by the first radio signal or the time-frequency resources occupied by the first radio signal comprises that the second information is used for determining the MCS employed by the first radio signal or the time-frequency resources occupied by the first radio signal.

In one embodiment, the second information being used for determining at least one of the MCS employed by the first radio signal or the time-frequency resources occupied by the first radio signal comprises that the second information is used for determining the MCS employed by the first radio signal.

In one embodiment, the second information being used for determining at least one of the MCS employed by the first radio signal or the time-frequency resources occupied by the first radio signal comprises that the second information is used for determining the time-frequency resources occupied by the first radio signal.

In one embodiment, the third information is transmitted via an air interface.

In one embodiment, the third information is transmitted via a Uu interface.

In one embodiment, the third information is transmitted by a radio signal.

In one embodiment, the third information is transmitted from the second-type communication node to the first-type communication node in the present disclosure.

In one embodiment, the third information is transmitted from a higher layer of the first-type communication node to a physical layer of the first-type communication node.

In one embodiment, the third information is transferred internally in the first-type communication node.

In one embodiment, the third information is a piece of higher layer information.

In one embodiment, the third information is a piece of physical layer information.

In one embodiment, the third information is transmitted via a physical layer signaling.

In one embodiment, the third information is transmitted via a higher layer signaling.

In one embodiment, the third information comprises all or part of a piece of higher layer information.

In one embodiment, the third information comprises all or part of a piece of higher layer information.

In one embodiment, the third information is transmitted through a DL-SCH.

In one embodiment, the third information is transmitted through a PDSCH.

In one embodiment, the third information comprises one or more fields in a SIB.

In one embodiment, the third information comprises one or more fields in a piece of RMSI.

In one embodiment, the third information comprises all or part of an RRC signaling.

In one embodiment, the third information comprises all or part of a piece of RRC layer information.

In one embodiment, the third information comprises all or part of fields in an IE of a piece of RRC layer information.

In one embodiment, the third information is broadcast.

In one embodiment, the third information is unicast.

In one embodiment, the third information is Cell-Specific.

In one embodiment, the third information is UE-specific.

In one embodiment, the third information is transmitted through a PDCCH.

In one embodiment, the third information comprises all or part of fields of a DCI signaling.

In one embodiment, the third information being used for determining an SCS of subcarriers occupied by the first radio signal means that the third information is used by the first-type communication node for determining the SCS of subcarriers occupied by the first radio signal.

In one embodiment, the third information being used for determining an SCS of subcarriers occupied by the first radio signal means that the third information is used for directly determining the SCS of subcarriers occupied by the first radio signal.

In one embodiment, the third information being used for determining an SCS of subcarriers occupied by the first radio signal means that the third information is used for indirectly determining the SCS of subcarriers occupied by the first radio signal.

In one embodiment, the third information being used for determining an SCS of subcarriers occupied by the first radio signal means that the third information is used for explicitly determining the SCS of subcarriers occupied by the first radio signal.

In one embodiment, the third information being used for determining an SCS of subcarriers occupied by the first radio signal means that the third information is used for implicitly determining the SCS of subcarriers occupied by the first radio signal.

In one embodiment, the third information and the second information in the present disclosure are different IEs in a same piece of RRC information.

In one embodiment, the third information and the second information in the present disclosure are two different fields of a same IE in a same piece of RRC information.

In one embodiment, the third information and the second information in the present disclosure are different IEs of two pieces of RRC information.

In one embodiment, the third information and the second information in the present disclosure are different fields in a same piece of DCI.

In one embodiment, the third information and the second information in the present disclosure are two fields in two different pieces of DCI.

Embodiment 7

Figure 7:
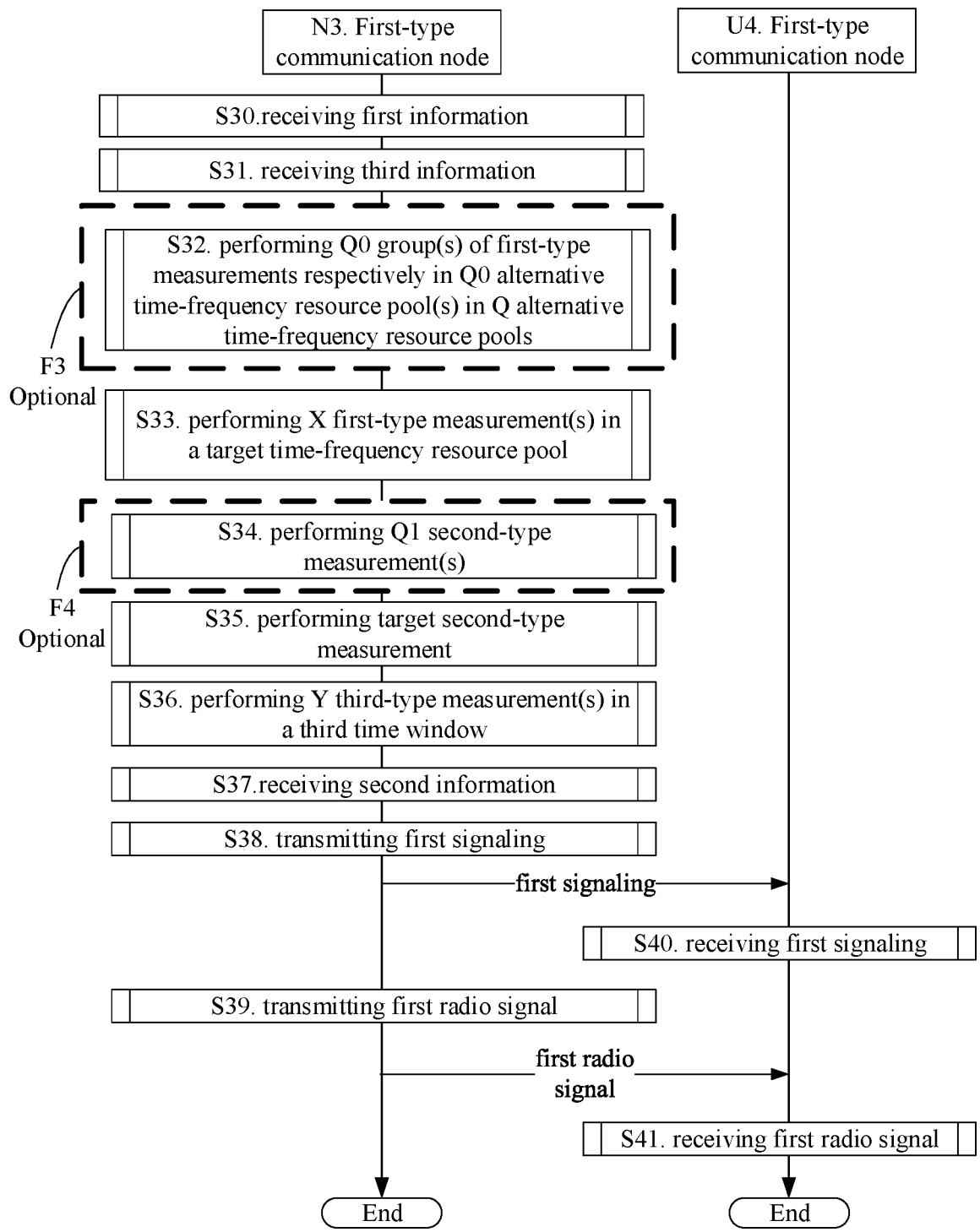
FIG. 7 illustrates a flowchart of radio signal transmission according to another embodiment of the present disclosure.
Figure 8A:
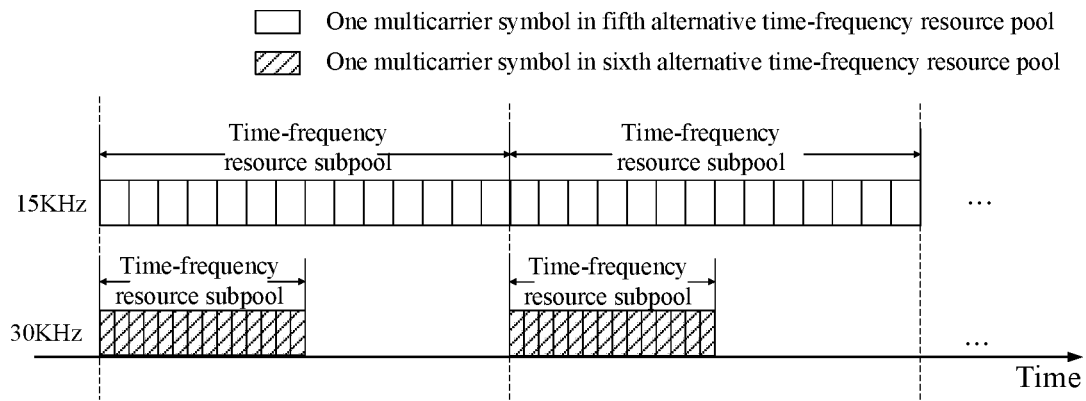
FIG. 8A-8D respectively illustrate schematic diagrams of relations of time-domain positions of Q alternative time-frequency resource pools.
Figure 8B:
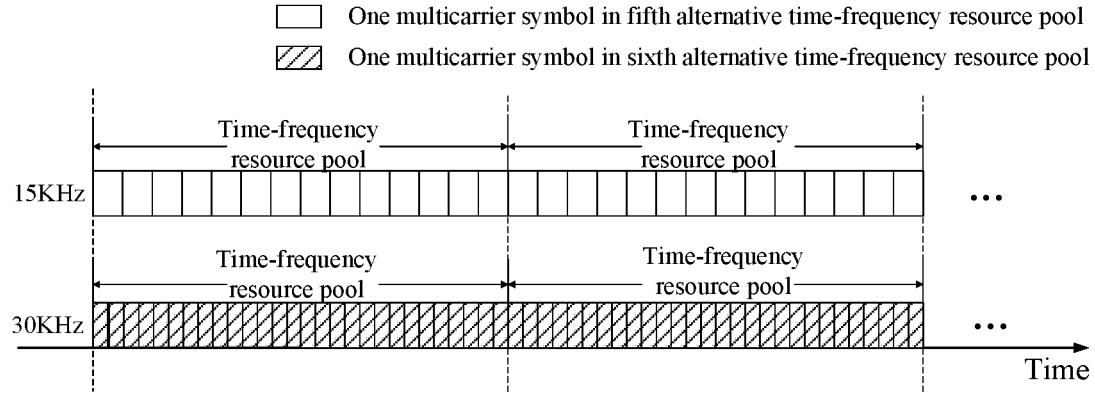
Figure 8C:
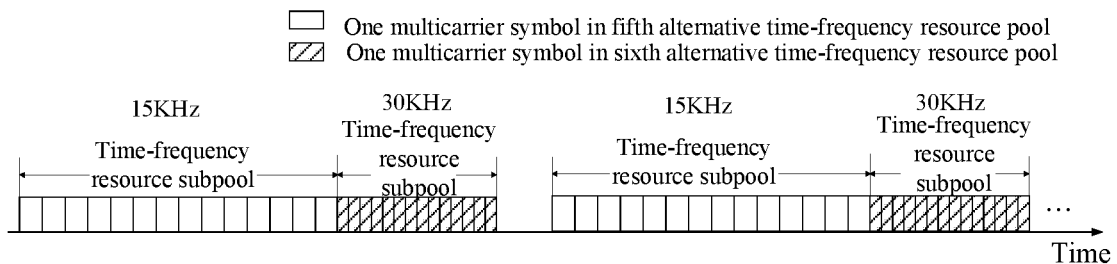
Figure 8D:
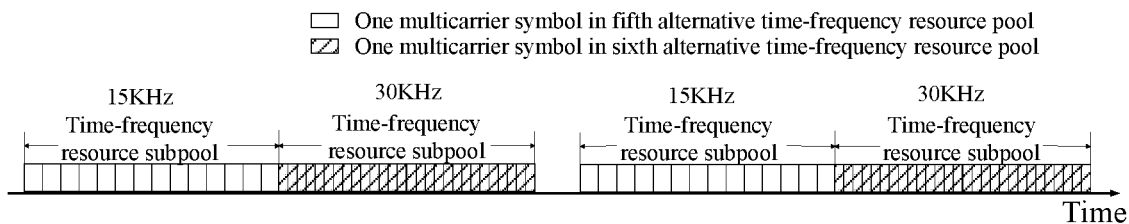

Embodiment 7 illustrates a radio signal transmission flow chart according to another embodiment in the present disclosure, as shown in FIG. 7. In FIG. 7, a first-type communication N3 is in communication with another first-type communication node U4, wherein the first-type communication node N3 is out of coverage of a cellular cell. In FIG. 7, boxes F3 and F4 are optional.

The first-type communication node N3 receives first information in step S30; receives third information in step S31; and performs Q0 group(s) of first-type measurements respectively in Q0 alternative time-frequency resource pool(s) of Q alternative time-frequency resource pools in step S32; performs X first-type measurement(s) in a target time-frequency resource pool in step S33; performs Q1 second-type measurement(s) in step S34; performs a target second-type measurement in step S35; performs Y third-type measurement(s) in a third time window in step S36; receives second information in step S37; transmits a first signaling in step S38; and transmits a first radio signal in step S39.

The other first-type communication node U4 receives a first signaling in step S40; and receives a first radio signal in step S41.

In Embodiment 7, the X first-type measurement(s) is(are) respectively used for acquiring X first-type measurement value(s), X being a positive integer; the target second-type measurement is used for acquiring a second-type measurement value; the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal. Each of the Q0 group(s) of first-type measurements is respectively used for acquiring Q0 group(s) of first-type measurement values; each of the Q0 alternative time-frequency resource pool(s) is different from the target time-frequency resource pool, the Q0 being a positive integer less than the Q. The Q1 second-type measurement(s) is (are respectively) used for acquiring Q1 second-type measurement value(s); Q1 group(s) of first-type measurement values in the Q0 group(s) of first-type measurement values is (are respectively) used for the Q1 second-type measurement(s), Q1 being a positive integer no greater than the Q0; each of the Q1 second-type measurement value(s) is no less than the second-type measurement value acquired after performing the target second-type measurement. Each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; the first information is used for determining the target threshold. The first signaling is used for indicating at least one of an MCS employed by the first radio signal or time-frequency resources occupied by the first radio signal, and the first signaling is transmitted via an air interface; each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal. The second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set. The third information is used for determining the SCS of subcarriers occupied by the first radio signal. The Y third-type measurement(s) is(are respectively) used for acquiring Y third-type measurement value(s), Y being a positive integer; the second-type measurement value acquired after performing the target second-type measurement is used for determining a first upper bound, a sum of the Y third-type measurement value(s) is no greater than the first upper bound, a time-domain position of the third time window is related to time-frequency resources occupied by the first radio signal, and the Y third-type measurement value(s) is related to a number of time-frequency resources occupied by a radio signal transmitted by a transmitter of the first radio signal in the third time window.

In one embodiment, the Q alternative time-frequency resource pools respectively correspond to Q alternative SCSs, and one of the Q alternative SCSs corresponding to the target time-frequency resource pool is the same as the SCS of subcarriers occupied by the first radio signal.

In one embodiment, any of the Q alternative time-frequency resource pools consists of a group of time-frequency resource subpools that occur periodically in time domain; all time-frequency resource subpools of the Q alternative time-frequency resource pools occupy equal numbers of multi-carrier symbols, or, a number of multicarrier symbols occupied by any time-frequency resource subpool of the Q alternative time-frequency resource pools is related to its corresponding SCS.

In one embodiment, the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, and the characteristic measurement value is an average value of a sum of received power in each of the X2 multicarrier symbol(s) within frequency-domain resources occupied by the characteristic time-frequency unit.

In one embodiment, the air interface is wireless.

In one embodiment, the air interface comprises a wireless channel.

In one embodiment, the air interface comprises sidelink.

In one embodiment, the air interface is a PC5 interface.

In one embodiment, the first signaling comprises physical layer information.

In one embodiment, the first signaling is a physical layer signaling transmission.

In one embodiment, the first signaling comprises all or part of a piece of physical layer information.

In one embodiment, the first signaling is broadcast.

In one embodiment, the first signaling is groupcast.

In one embodiment, the first signaling is unicast.

In one embodiment, the first signaling is cell-specific.

In one embodiment, the first signaling is UE-specific.

In one embodiment, the first signaling is transmitted through a Physical Sidelink Control Channel (PSCCH).

In one embodiment, the first signaling comprises all or part of fields of a SCI signaling.

In one embodiment, the first signaling comprises a Scheduling Assignment (SA) of the first radio signal.

In one embodiment, the phrase that "the first signaling is used for indicating at least one of the MCS employed by the first radio signal, the time-frequency resources occupied by the first radio signal, or the SCS of subcarriers occupied by the first radio signal means that the first signaling is used for directly indicating at least one of the MCS employed by the first radio signal, the time-frequency resources occupied by the first radio signal, or the SCS of subcarriers occupied by the first radio signal.

In one embodiment, the phrase that "the first signaling is used for indicating at least one of the MCS employed by the first radio signal, the time-frequency resources occupied by the first radio signal, or the SCS of subcarriers occupied by the first radio signal means that the first signaling is used for indirectly indicating at least one of the MCS employed by the first radio signal, the time-frequency resources occupied by the first radio signal, or the SCS of subcarriers occupied by the first radio signal.

In one embodiment, the phrase that "the first signaling is used for indicating at least one of the MCS employed by the first radio signal, the time-frequency resources occupied by the first radio signal, or the SCS of subcarriers occupied by the first radio signal means that the first signaling is used for explicitly indicating at least one of the MCS employed by the first radio signal, the time-frequency resources occupied by the first radio signal, or the SCS of subcarriers occupied by the first radio signal.

In one embodiment, the phrase that "the first signaling is used for indicating at least one of the MCS employed by the first radio signal, the time-frequency resources occupied by the first radio signal, or the SCS of subcarriers occupied by the first radio signal means that the first signaling is used for implicitly indicating at least one of the MCS employed by the first radio signal, the time-frequency resources occupied by the first radio signal, or the SCS of subcarriers occupied by the first radio signal.

Embodiment 8

Embodiment 8A to Embodiment 8D respectively illustrate schematic diagrams of relations of time domain positions of Q alternative time-frequency resource pools.

In Embodiment 8, any of the Q alternative time-frequency resource pools consists of a group of time-frequency resource subpools that occur periodically in time domain; all time-frequency resource subpools of the Q alternative time-frequency resource pools occupy equal numbers of multicarrier symbols, or, a number of multicarrier symbols occupied by any time-frequency resource subpool of the Q alternative time-frequency resource pools is related to its corresponding SCS.

In one embodiment, each time-frequency resource subpool of the Q alternative time-frequency resource pool comprises a positive integer number of consecutive multicarrier symbol(s).

In one embodiment, numbers of multicarrier symbols respectively occupied by any two time-frequency resource subpools in a same alternative time-frequency resource pool in the Q alternative time-frequency resource pools are the same.

In one embodiment, periods of time-frequency resource subpools respectively comprised in any two alternative time-frequency resource pools in the Q alternative time-frequency resource pools are the same.

In one embodiment, there exist periods of time-frequency resource subpools respectively comprised in two alternative time-frequency resource pools in the Q alternative time-frequency resource pools being the same.

In one embodiment, periods of time-frequency resource subpools respectively comprised in at least two alternative time-frequency resource pools in the Q alternative time-frequency resource pools are the same.

In one embodiment, periods of time-frequency resource subpools respectively comprised in any two alternative time-frequency resource pools in the Q alternative time-frequency resource pools are different.

In one embodiment, there exist periods of time-frequency resource subpools respectively comprised in two alternative time-frequency resource pools in the Q alternative time-frequency resource pools being different.

In one embodiment, periods of time-frequency resource subpools respectively comprised in at least two alternative time-frequency resource pools in the Q alternative time-frequency resource pools are different.

In one embodiment, a period of time-frequency resource subpool comprised in any of the Q alternative time-frequency resource pools is configured.

In one embodiment, a period of time-frequency resource subpool comprised in any of the Q alternative time-frequency resource pools is pre-defined.

In one embodiment, a number of multicarrier symbols comprised in each time-frequency resource subpool of the Q alternative time-frequency resource pools is the same.

In one embodiment, a number of multicarrier symbols occupied by each time-frequency resource subpool of the Q alternative time-frequency resource pools is the same, and a time interval length of time-domain resources comprised in each time-frequency resource subpool of the Q alternative time-frequency resource subpool is related to its corresponding SCS.

In one subembodiment of the above embodiment, each of time-frequency subpool of the Q alternative time-frequency resource pools comprises a slot, and a number of multicarrier symbols occupied by each of time-frequency subpool of the Q alternative time-frequency resource pools is equal to a number of multicarrier symbols comprised in a slot.

In one subembodiment of the above embodiment, each of time-frequency subpool of the Q alternative time-frequency resource pools comprises a mini-slot, and a number of multicarrier symbols occupied by each of time-frequency subpool of the Q alternative time-frequency resource pools is equal to a number of multicarrier symbols comprised in a mini-slot.

In one subembodiment of the above embodiment, each time-frequency resource subpool comprised in the Q alternative time-frequency resource pools comprises a subframe, and a number of multicarrier symbols occupied by each time-frequency resource subpool of the Q alternative time-frequency resource pools is equal to a number of multicarrier symbols comprised in a subframe.

In one subembodiment of the above embodiment, a time interval length of time-domain resources comprised in each time-frequency resource subpool of the Q alternative time-frequency resource pools is inversely proportional to its corresponding SCS.

In one subembodiment of the above embodiment, a time-frequency resource subpool in the Q alternative time-frequency resource pools corresponding to a larger SCS comprises a smaller time interval length of time-domain resources.

In one subembodiment of the above embodiment, a first alternative time-frequency resource pool and a second alternative time-frequency resource pool are respectively any two of the Q alternative time-frequency resource pools, the first alternative time-frequency resource pool and the second alternative time-frequency resource pool respectively correspond to a first SCS and a second SCS, a ratio of a time interval length of time-domain resources comprised in each time-frequency resource subpool of the second alternative time-frequency resource pool to a time interval length of time-domain resources comprised in each time-frequency resource subpool of the first alternative time-frequency resource pool is equal to a ratio of the first SCS to the second SCS.

In one embodiment, a number of multicarrier symbols occupied by any time-frequency resource subpool in the Q alternative time-frequency resource pools is related to its corresponding SCS.

In one embodiment, a number of multicarrier symbols occupied by any time-frequency resource subpool in the Q alternative time-frequency resource pools is related to its corresponding SCS, and a time interval length of time-domain resources comprised in each time-frequency resource subpool in the Q alternative time-frequency resource pools is the same.

In one subembodiment of the above embodiment, any time-frequency resource subpool of the Q alternative time-frequency resource pools comprises a positive integer number of consecutive slots, a number of slots comprised in any time-frequency resource subpool of the Q alternative time-frequency resource pools is related to its corresponding SCS, and a number of multicarrier symbols occupied by any time-frequency resource subpool in the Q alternative time-frequency resource pools is equal to a number of multicarrier symbols comprised in the positive integer number of slots.

In one subembodiment of the above embodiment, any time-frequency resource subpool of the Q alternative time-frequency resource pools comprises a positive integer number of consecutive mini-slots, a number of mini-slots comprised in any time-frequency resource subpool of the Q alternative time-frequency resource pools is related to its corresponding SCS, and a number of multicarrier symbols occupied by any time-frequency resource subpool in the Q alternative time-frequency resource pools is equal to a number of multicarrier symbols comprised in the positive integer number of mini-slots.

In one subembodiment of the above embodiment, any time-frequency resource subpool of the Q alternative time-frequency resource pools comprises a positive integer number of consecutive subframes, a number of subframes comprised in any time-frequency resource subpool of the Q alternative time-frequency resource pools is related to its corresponding SCS, and a number of multicarrier symbols occupied by any time-frequency resource subpool in the Q alternative time-frequency resource pools is equal to a number of multicarrier symbols comprised in the positive integer number of subframes.

In one subembodiment of the above embodiment, a time-frequency resource subpool with an SCS of 15 kHz corresponding to the Q alternative time-frequency resource pools comprises a slot, and a time-frequency resource subpool with an SCS of 15d kHz corresponding to the Q alternative time-frequency resource pools comprises d consecutive slots, d being a positive integer.

In one subembodiment of the above embodiment, a time-frequency resource subpool with an SCS of 15 kHz corresponding to the Q alternative time-frequency resource pools comprises a mini-slot, and a time-frequency resource subpool with an SCS of 15d kHz corresponding to the Q alternative time-frequency resource pools comprises d consecutive mini-slots, d being a positive integer.

In one subembodiment of the above embodiment, a time-frequency resource subpool with an SCS of 15 kHz corresponding to the Q alternative time-frequency resource pools comprises a subframe, and a time-frequency resource subpool with an SCS of 15d kHz corresponding to the Q alternative time-frequency resource pools comprises d consecutive subframes, d being a positive integer.

In one subembodiment of the above embodiment, a number of multicarrier symbols occupied by any time-frequency resource subpool in the Q alternative time-frequency resource pools is directly proportional to its corresponding SCS.

In one subembodiment of the above embodiment, a time-frequency resource subpool in the Q alternative time-frequency resource pools corresponding to a larger SCS occupies a larger number of multicarrier symbols.

In one subembodiment of the above embodiment, a third alternative time-frequency resource pool and a fourth candidate time-frequency resource pool are respectively any two of the Q alternative time-frequency resource pools, the third alternative time-frequency resource pool and the fourth alternative time-frequency resource pool respectively correspond to a third SCS and a fourth SCS, a ratio of a number of slots comprised in each time-frequency resource subpool in the fourth alternative time-frequency resource pool to a number of slots comprised in each time-frequency resource subpool in the third alternative time-frequency resource pool is equal to a ratio of the fourth SCS to the third SCS.

In one subembodiment of the above embodiment, a third alternative time-frequency resource pool and a fourth candidate time-frequency resource pool are respectively any two of the Q alternative time-frequency resource pools, the third alternative time-frequency resource pool and the fourth alternative time-frequency resource pool respectively correspond to a third SCS and a fourth SCS, a ratio of a number of mini-slots comprised in each time-frequency resource subpool in the fourth alternative time-frequency resource pool to a number of mini-slots comprised in each time-frequency resource subpool in the third alternative time-frequency resource pool is equal to a ratio of the fourth SCS to the third SCS.

In one subembodiment of the above embodiment, a third alternative time-frequency resource pool and a fourth candidate time-frequency resource pool are respectively any two of the Q alternative time-frequency resource pools, the third alternative time-frequency resource pool and the fourth alternative time-frequency resource pool respectively correspond to a third SCS and a fourth SCS, a ratio of a number of subframes comprised in each time-frequency resource subpool in the fourth alternative time-frequency resource pool to a number of subframes comprised in each time-frequency resource subpool in the third alternative time-frequency resource pool is equal to a ratio of the fourth SCS to the third SCS.

In one embodiment, any two of the Q alternative time-frequency resource pools are overlapped in time domain (non-orthogonal).

In one embodiment, there exist two of the Q alternative time-frequency resource pools being overlapping in time domain (non-orthogonal).

In one embodiment, at least two of the Q alternative time-frequency resource pools are overlapping in time domain (non-orthogonal).

In one embodiment, a fifth alternative time-frequency resource pool and a sixth alternative time-frequency resource pool are two of the Q alternative time-frequency resource pools, time-domain resources occupied by the fifth alternative time-frequency resource pool comprises time-domain resources occupied by the sixth time-frequency resource pool, and a number of multicarrier symbols occupied by each time-frequency resource subpool of the fifth alternative time-frequency resource pool is the same with a number of multicarrier symbols occupied by each time-frequency resource subpool of the sixth alternative time-frequency resource pool.

In one subembodiment of the above embodiment, an SCS corresponding to the fifth alternative time-frequency resource pool is shorter than an SCS corresponding to the sixth alternative time-frequency resource pool, time-domain resources occupied by the fifth alternative time-frequency resource pool also comprise time-domain resources other than time-domain resources occupied by the sixth alternative time-frequency resource pool.

In one subembodiment of the above embodiment, an SCS corresponding to the fifth alternative time-frequency resource pool is equal to an SCS corresponding to the sixth alternative time-frequency resource pool, and time-domain resources occupied by the fifth alternative time-frequency resource pool is the same with time-domain resources occupied by the sixth candidate time-frequency resource pool.

In one embodiment, an SCS corresponding to the fifth alternative time-frequency resource pool is shorter than an SCS corresponding to the sixth alternative time-frequency resource pool, a period of time-frequency resource subpool comprised in the fifth alternative time-frequency resource pool is less than a period of time-frequency resource subpool comprised in the sixth alternative time-frequency resource pool.

In one embodiment, an SCS corresponding to the fifth alternative time-frequency resource pool is equal to an SCS corresponding to the sixth alternative time-frequency resource pool, a period of time-frequency resource subpool comprised in the fifth alternative time-frequency resource pool is the same with a period of time-frequency resource subpool comprised in the sixth alternative time-frequency resource pool.

In one embodiment, a fifth alternative time-frequency resource pool and a sixth alternative time-frequency resource pool are two of the Q alternative time-frequency resource pools, time-domain resources occupied by the fifth alternative time-frequency resource pool comprises time-domain resources occupied by the sixth time-frequency resource pool, and each time-frequency resource subpool in the fifth alternative time-frequency resource pool and a number of multicarrier symbols respectively occupied by each time-frequency resource subpool in the sixth alternative time-frequency resource pool are related to their corresponding SCSs.

In one subembodiment of the above embodiment, time-domain resources occupied by the fifth alternative time-frequency resource pool do not comprise time-domain resources other than time-domain resources occupied by the sixth alternative time-frequency resource pool.

In one subembodiment of the above embodiment, an SCS corresponding to the fifth alternative time-frequency resource pool is less than an SCS corresponding to the sixth alternative time-frequency resource pool.

In one subembodiment of the above embodiment, an SCS corresponding to the fifth alternative time-frequency resource pool is equal to an SCS corresponding to the sixth alternative time-frequency resource pool.

In one subembodiment of the above embodiment, periods of time-frequency resource subpools respectively comprised in the fifth alternative time-frequency resource pool and the sixth alternative time-frequency resource pool are the same.

In one embodiment, any two of the Q alternative time-frequency resource pools are orthogonal in time domain (non-overlapping).

In one embodiment, there exist two of the Q alternative time-frequency resource pools being orthogonal in time domain (non-overlapping).

In one embodiment, at least two of the Q alternative time-frequency resource pools are orthogonal in time domain (non-overlapping).

In one embodiment, a fifth alternative time-frequency resource pool and a sixth alternative time-frequency resource pool are two of the Q alternative time-frequency resource pools, time-domain resources occupied by the fifth alternative time-frequency resource pool and time-domain resources occupied by the sixth time-frequency resource pool are orthogonal (non-overlapping), and a number of multicarrier symbols occupied by each time-frequency resource subpool of the fifth alternative time-frequency resource pool is the same with a number of multicarrier symbols occupied by each time-frequency resource subpool of the sixth alternative time-frequency resource pool.

In one subembodiment of the above embodiment, time-frequency resource subpools in the fifth alternative time-frequency resource pool and time-frequency resource subpools in the sixth alternative time-frequency resource pool appear alternately in time domain.

In one subembodiment of the above embodiment, there exist two time-frequency resource subpools adjacent in time domain in the fifth alternative time-frequency resource pool being inconsecutive in time domain, and there exist two time-frequency resource subpools adjacent in time domain in the sixth alternative time-frequency resource pool being inconsecutive in time domain.

In one subembodiment of the above embodiment, any two time-frequency resource subpools adjacent in time domain in the fifth alternative time-frequency resource pool are inconsecutive in time domain, and any two time-frequency resource subpools in the sixth alternative time-frequency resource pool are inconsecutive in time domain.

In one subembodiment of the above embodiment, there exist one time-frequency resource subpool in the sixth alternative time-frequency resource pool being located between two time-frequency resource subpools adjacent in time domain in the fifth alternative time-frequency resource pool.

In one subembodiment of the above embodiment, any one time-frequency resource subpool in the sixth alternative time-frequency resource pool is located between two time-frequency resource subpools adjacent in time domain in the fifth alternative time-frequency resource pool.

In one subembodiment of the above embodiment, periods of time-frequency resource subpools respectively comprised in the fifth alternative time-frequency resource pool and the sixth alternative time-frequency resource pool are the same.

In one subembodiment of the above embodiment, periods of time-frequency resource subpools respectively comprised in the fifth alternative time-frequency resource pool and the sixth alternative time-frequency resource pool are different.

In one embodiment, a fifth alternative time-frequency resource pool and a sixth alternative time-frequency resource pool are two of the Q alternative time-frequency resource pools, time-domain resources occupied by the fifth alternative time-frequency resource pool and time-domain resources occupied by the sixth time-frequency resource pool are orthogonal (non-overlapping), and each time-frequency resource subpool in the fifth alternative time-frequency resource pool and a number of multicarrier symbols occupied by each time-frequency resource subpool of the sixth alternative time-frequency resource pool are respectively related to their corresponding SCSs.

In one subembodiment of the above embodiment, time-frequency resource subpools in the fifth alternative time-frequency resource pool and time-frequency resource subpools in the sixth alternative time-frequency resource pool appear alternately in time domain.

In one subembodiment of the above embodiment, there exist two time-frequency resource subpools adjacent in time domain in the fifth alternative time-frequency resource pool being inconsecutive in time domain, and there exist two time-frequency resource subpools adjacent in time domain in the sixth alternative time-frequency resource pool being inconsecutive in time domain.

In one subembodiment of the above embodiment, any two time-frequency resource subpools adjacent in time domain in the fifth alternative time-frequency resource pool are inconsecutive in time domain, and any two time-frequency resource subpools adjacent in time domain in the sixth alternative time-frequency resource pool are inconsecutive in time domain.

In one subembodiment of the above embodiment, there exist one time-frequency resource subpool in the sixth alternative time-frequency resource pool being located between two time-frequency resource subpools adjacent in time domain in the fifth alternative time-frequency resource pool.

In one subembodiment of the above embodiment, any one time-frequency resource subpool in the sixth alternative time-frequency resource pool is located between two time-frequency resource subpools adjacent in time domain in the fifth alternative time-frequency resource pool.

In one subembodiment of the above embodiment, periods of time-frequency resource subpools respectively comprised in the fifth alternative time-frequency resource pool and the sixth alternative time-frequency resource pool are the same.

In one subembodiment of the above embodiment, periods of time-frequency resource subpools respectively comprised in the fifth alternative time-frequency resource pool and the sixth alternative time-frequency resource pool are different.

In one embodiment, the Embodiment 8A illustrates a schematic diagram that time-domain resources occupied by the fifth alternative time-frequency resource pool comprises time-domain resources occupied by the sixth time-frequency resource pool, and a number of multicarrier symbols occupied by each time-frequency resource subpool of the fifth alternative time-frequency resource pool is the same with a number of multicarrier symbols occupied by each time-frequency resource subpool of the sixth alternative time-frequency resource pool.

In one embodiment, the Embodiment 8B illustrates a schematic diagram that time-domain resources occupied by the fifth alternative time-frequency resource pool comprise time-domain resources occupied by the sixth alternative time-frequency resource pool, and numbers of multicarrier symbols respectively occupied by the fifth alternative time-frequency resource pool and the sixth alternative time-frequency resource pool are related to their corresponding SCSs.

In one embodiment, the Embodiment 8C illustrates a schematic diagram that time-domain resources occupied by the fifth alternative time-frequency resource pool and time-domain resources occupied by the sixth time-frequency resource pool are orthogonal, and a number of multicarrier symbols occupied by each time-frequency resource subpool of the fifth alternative time-frequency resource pool is the same with a number of multicarrier symbols occupied by each time-frequency resource subpool of the sixth alternative time-frequency resource pool.

In one embodiment, the Embodiment 8D illustrates a schematic diagram that time-domain resources occupied by the fifth alternative time-frequency resource pool and time-domain resources occupied by the sixth alternative time-frequency resource pool are orthogonal, numbers of multicarrier symbols respectively occupied by the fifth alternative time-frequency resource pool and the sixth alternative time-frequency resource pool are related to their corresponding SCSs.

Embodiment 9

Figure 9:
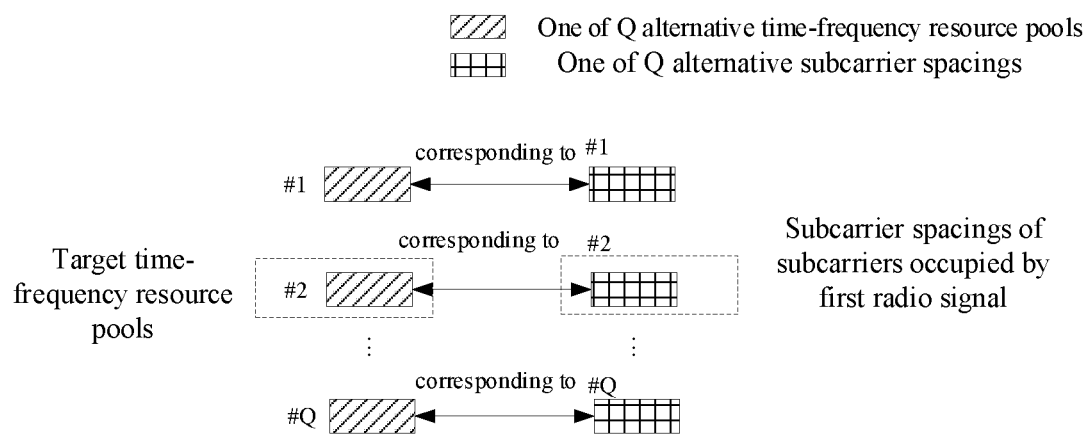
FIG. 9 illustrates a schematic diagram of determining a target time-frequency resource pool according to one embodiment of the present disclosure.

Embodiment 9 illustrates a schematic diagram of determining a target time-frequency resource pool according to one embodiment of the present disclosure, as shown in FIG. 9.

In Embodiment 9, the target time-frequency resource pool is one of the Q alternative time-frequency resource pool, the Q alternative time-frequency resource pools respectively correspond to Q alternative SCSs, and one of the Q alternative SCSs corresponding to the target time-frequency resource pool is the same as an SCS of subcarriers occupied by the first radio signal.

In one embodiment, correspondence relations between the Q alternative SCSs and the Q alternative time-frequency resource pools are pre-configured.

In one embodiment, correspondence relations between the Q alternative SCSs and the Q alternative time-frequency resource pools are fixed.

In one embodiment, correspondence relations between the Q alternative SCSs and the Q alternative time-frequency resource pools are pre-defined.

In one embodiment, correspondence relations between the Q alternative SCSs and the Q alternative time-frequency resource pools are configured.

In one embodiment, any two alternative SCSs in the Q alternative SCSs are unequal.

In one embodiment, there exist two alternative SCSs in the Q alternative SCSs being equal.

In one embodiment, there at least exist two alternative SCSs in the Q alternative SCSs being equal.

In one embodiment, any two alternative SCSs in the Q alternative SCSs are equal.

In one embodiment, there at least exist two alternative SCSs in the Q alternative SCSs being unequal.

In one embodiment, the Q alternative SCSs are related to a frequency-domain position of frequency-domain resources occupied by the first radio signal.

In one embodiment, the Q alternative SCSs are related to carrier frequency range of a carrier to which frequency-domain resources occupied by the first radio signal belong.

In one embodiment, when a carrier frequency of a carrier to which frequency domain resources occupied by the first radio signal belong is no greater than 6 GHz (Frequency Range 1), the Q alternative SCSs include 15 kHz, 30 kHz and 60 kHz, Q being no less than 3; when a carrier frequency of a carrier to which frequency domain resources occupied by the first radio signal belong is greater than 6 GHz (Frequency Range 2), the Q alternative SCSs include 120 kHz and 240 kHz, Q being no less than 2.

In one embodiment, when a carrier frequency of a carrier to which frequency domain resources occupied by the first radio signal belong is no greater than 6 GHz (Frequency Range 1), the Q alternative SCSs include 15 kHz, 30 kHz and 60 kHz, Q being no less than 3; when a carrier frequency of a carrier to which frequency domain resources occupied by the first radio signal belong is greater than 6 GHz (Frequency Range 2), the Q alternative SCSs include 60 kHz, 120 kHz, 240 kHz and 480 kHz, Q being no less than 4.

In one embodiment, an SCS of subcarriers occupied by the first radio signal is one of the Q alternative SCSs.

In one embodiment, determining the target time-frequency resource pool out of the Q alternative time-frequency resource pools comprises that an arrangement sequence of the SCS of subcarriers occupied by the first radio signal is used for determining the target time-frequency resource pool out of the Q alternative time-frequency resource pools.

In one embodiment, determining the target time-frequency resource pool out of the Q alternative time-frequency resource pools comprises that an index of the SCS of subcarriers occupied by the first radio signal is used for determining the target time-frequency resource pool out of the Q alternative time-frequency resource pools.

In one embodiment, determining the target time-frequency resource pool out of the Q alternative time-frequency resource pools comprises that a size order of the SCS of subcarriers occupied by the first radio signal is used for determining the target time-frequency resource pool out of the Q alternative time-frequency resource pools.

In one embodiment, determining the target time-frequency resource pool out of the Q alternative time-frequency resource pools comprises that an alternative time-frequency resource pool corresponding to the SCS of subcarriers occupied by the first radio signal is the target time-frequency resource pool.

In one embodiment, determining the target time-frequency resource pool out of the Q alternative time-frequency resource pools comprises that the SCS of subcarriers occupied by the first radio signal corresponds to q alternative time-frequency resource pools in the Q alternative time-frequency resource pools, the target time-frequency resource pool is one of the q alternative time-frequency resource pools, q being a positive integer greater than 1 and no greater than Q.

Embodiment 10

Figure 10:
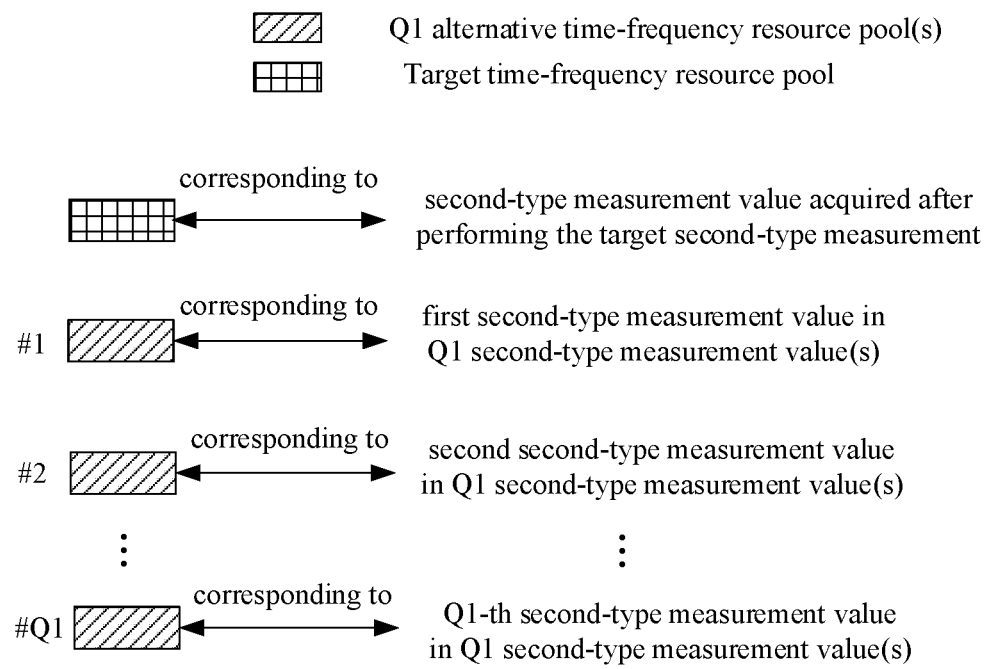
FIG. 10 illustrates a schematic diagram of determining a target time-frequency resource pool according to another embodiment of the present disclosure.

Embodiment 10 illustrates a schematic diagram of determining a target time-frequency resource pool according to another embodiment of the present disclosure, as shown in FIG. 10.

In Embodiment 10, the target time-frequency resource pool corresponds to a second-type measurement value acquired after performing the target second-type measurement, and each of Q1 alternative time-frequency resource pool(s) in the Q alternative time-frequency resource pools in the present disclosure respectively corresponds to the Q1 second-type measurement value(s) in the present disclosure; the Q1 second-type measurement(s) in the present disclosure is(are) used for acquiring the Q1 second-type measurement value(s), and Q1 group(s) of first-type measurement values in the Q0 group(s) of first-type measurement values in the present disclosure is (are respectively) used for the Q1 second-type measurement(s), Q1 being a positive integer no greater than the Q0; each of the Q1 second-type measurement value(s) is no less than the second-type measurement value acquired after performing the target second-type measurement.

In one embodiment, the Q1 is equal to the Q0.

In one embodiment, the Q1 is less than the Q0.

In one embodiment, there exist one second-type measurement value in the Q1 second-type measurement value(s) being greater than a second-type measurement value acquired after the target second-type measurement.

In one embodiment, at least one second-type measurement value in the Q1 second-type measurement value(s) is greater than a second-type measurement value acquired after the target second-type measurement.

In one embodiment, each of the Q1 second-type measurement value(s) is greater than a second-type measurement value acquired after the target second-type measurement.

In one embodiment, there exist one second-type measurement value in the Q1 second-type measurement value(s) being equal to a second-type measurement value acquired after the target second-type measurement.

In one embodiment, at least one second-type measurement value in the Q1 second-type measurement value(s) is equal to a second-type measurement value acquired after the target second-type measurement.

In one embodiment, Q1+1 second-type measurements comprise the Q1 second-type measurement(s) and the target second-type measurement, the target second-type measurement is one of the Q1+1 second-type measurements other than any of the Q1 second-type measurement(s), Q1 being a positive integer no greater than the Q0; Q1+1 second-type measurement values comprise the Q1 second-type measurement value(s) and a second-type measurement value acquired after performing the target second-type measurement, the second-type measurement value acquired after performing the target second-type measurement is one of the Q1+1 second-type measurement values other than any of the Q1 second-type measurement.

In one subembodiment of the above embodiment, the first-type communication node performs each of the Q1+1 second-type measurements.

In one subembodiment of the above embodiment, the first-type communication node stores each of the Q1+1 second-type measurement values.

In one subembodiment of the above embodiment, the first-type communication node performs and completes each of the Q1+1 second-type measurements before transmitting the first radio signal.

In one subembodiment of the above embodiment, the first-type communication node is requested to perform and complete each of the Q1+1 second-type measurements before transmitting the first radio signal.

In one subembodiment of the above embodiment, the first-type communication node stores the Q1+1 second-type measurement values before transmitting the first radio signal.

In one subembodiment of the above embodiment, the first-type communication node is requested to store the Q1+1 second-type measurement values before transmitting the first radio signal.

In one subembodiment of the above embodiment, the target time-frequency resource pool corresponds to a second-type measurement value acquired after performing the target second-type measurement, and a size relation of the Q1+1 second-type measurement values is used for determining the target time-frequency resource pool out of the Q alternative time-frequency resource pools.

In one subembodiment of the above embodiment, the target time-frequency resource pool corresponds to a second-type measurement value acquired after performing the target second-type measurement, and an index of a second-type measurement value acquired after performing the target second-type measurement in the Q1+1 second-type measurement values is used for determining the target time-frequency resource pool out of the Q alternative time-frequency resource pools.

In one subembodiment of the above embodiment, the target time-frequency resource pool corresponds to a second-type measurement value acquired after performing the target second-type measurement, each of Q1+1 alternative time-frequency resource pools in the Q alternative time-frequency resource pools respectively corresponds to the Q1+1 second-type measurement values, and the Q1+1 alternative time-frequency resource pools comprise the Q1 alternative time-frequency resource pool(s) and the target time-frequency resource pool; a size relation of the Q1+1 second-type measurement values is used for determining the target time-frequency resource pool out of the Q1+1 alternative time-frequency resource pools.

In one subembodiment of the above embodiment, the target time-frequency resource pool corresponds to a second-type measurement value acquired after performing the target second-type measurement, each of Q1+1 alternative time-frequency resource pools in the Q alternative time-frequency resource pools respectively corresponds to the Q1+1 second-type measurement values, and the Q1+1 alternative time-frequency resource pools comprise the Q1 alternative time-frequency resource pool(s) and the target time-frequency resource pool; an index of a second-type measurement value acquired after performing the target second-type measurement in the Q1+1 second-type measurement values is used for determining the target time-frequency resource pool out of the Q1+1 alternative time-frequency resource pools.

In one subembodiment of the above embodiment, the target time-frequency resource pool is one of the Q alternative time-frequency resource pools corresponding to a minimum one of the Q1+1 second-type measurement values.

In one subembodiment of the above embodiment, the target time-frequency resource pool corresponds to a second-type measurement value acquired after performing the target second-type measurement, each of Q1+1 alternative time-frequency resource pools in the Q alternative time-frequency resource pools respectively corresponds to the Q1+1 second-type measurement values, and the Q1+1 alternative time-frequency resource pools comprise the Q1 alternative time-frequency resource pool(s) and the target time-frequency resource pool; the target time-frequency resource pool is one of the Q1+1 alternative time-frequency resource pools corresponding to a minimum one of the Q1+1 second-type measurement values.

In one embodiment, the target time-frequency resource pool corresponding to a second-type measurement value acquired after performing the target second-type measurement means that the X first-type measurement(s) in the present disclosure is(are) performed in the target time-frequency resource pool, the X first-type measurement(s) is(are) respectively used for acquiring the first-type measurement value(s) in the present disclosure, X being a positive integer; the first-type measurement value(s) is(are) used for the target second-type measurement, and the target second-type measurement is used for acquiring a second-type measurement value.

In one embodiment, each of the Q1 alternative time-frequency resource pool(s) respectively corresponding to the Q1 second-type measurement value(s) in the present disclosure means that Q1 group(s) of first-type measurements of the Q0 group(s) of first-type measurements in the present disclosure is(are respectively) performed in the Q1 alternative time-frequency resource pool(s), and the Q1 group(s) of first-type measurements is(are) respectively used for acquiring the Q1 group(s) of first-type measurement values; the Q1 group(s) of first-type measurement values is(are) respectively used for the Q1 second-type measurement(s), and the Q1 second-type measurement(s) is(are) respectively used for acquiring the Q1 second-type measurement value(s).

In one embodiment, each of the Q1+1 alternative time-frequency resource pools respectively corresponding to the Q1+1 second-type measurement values in the present disclosure means that Q1+1 groups of first-type measurements of the Q0+1 groups of first-type measurements in the present disclosure are respectively performed in the Q1+1 alternative time-frequency resource pools, and the Q1+1 groups of first-type measurements are respectively used for acquiring the Q1+1 groups of first-type measurement values; the Q1+1 groups of first-type measurement values are respectively used for the Q1+1 second-type measurements, and the Q1+1 second-type measurements are respectively used for acquiring the Q1+1 second-type measurement values.

Embodiment 11

Figure 11:
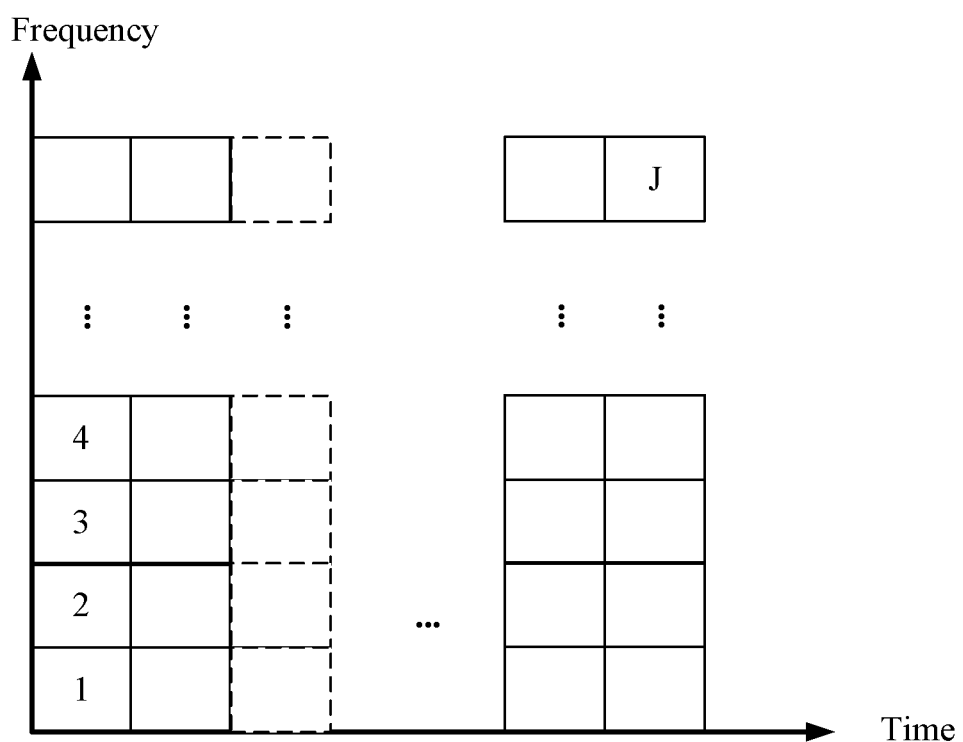
FIG. 11 illustrates a schematic diagram of relations among a given time-frequency resource pool, a time-frequency unit and a first-type measurement according to one embodiment of the present disclosure.

Embodiment 11 illustrates a schematic diagram of relations among a given time-frequency resource pool, a time-frequency unit and a first-type measurement according to one embodiment of the present disclosure, as shown in FIG. 11.

In Embodiment 11, the given time-frequency resource pool comprises J time-frequency unit(s), J first-type measurement(s) is(are) respectively performed in the J time-frequency unit(s), and J first-type measurement(s) is(are) used for respectively for acquiring J first-type measurement value(s), J being a positive integer. The given time-frequency resource pool corresponds to the target time-frequency resource pool in the present disclosure, the J time-frequency unit(s) corresponds(correspond) to the X time-frequency unit(s) in the present disclosure, and the J first-type measurement(s) corresponds(correspond) to the X first-type measurement(s) in the present disclosure; or, the given time-frequency resource pool corresponds to any of the Q0 alternative time-frequency resource pool(s) in the present disclosure, and one group of the Q0 group(s) of first-type measurements performed in the given time-frequency resource pool comprises the J first-type measurement(s).

In one embodiment, the given time-frequency resource pool comprises only the J time-frequency unit(s).

In one embodiment, the given time-frequency resource pool comprises time-frequency unit(s) other than the J time-frequency unit(s).

In one embodiment, the J time-frequency unit(s) is(are) time-frequency unit(s) other than time-frequency unit(s) transmitted by the first-type communication node in the given time-frequency resource pool.

In one embodiment, the J time-frequency unit(s) is(are) time-frequency unit(s) that can be used for acquiring first-type measurement value(s) in the given time-frequency resource pool.

In one embodiment, any of the J first-type measurement(s) comprises frequency-domain filtering of time-frequency unit(s) of the J time-frequency unit(s) within frequency-domain range where the first-type measurement is performed.

In one embodiment, for a given SCS and CP length, any of the J first-type measurement value(s) is an average of a sum of received power values of all multicarrier symbols comprised within the frequency range of a time-frequency unit where the corresponding first-type measurement is performed.

In one embodiment, for a given SCS and CP length, any of the J first-type measurement value(s) is an average of a sum of received energies values of all multicarrier symbols comprised within the frequency range of a time-frequency unit where the corresponding first-type measurement is performed.

In one embodiment, for a given SCS and CP length, any of the J first-type measurement value(s) is an average of a sum of received power values of partial multicarrier symbols comprised within the frequency range of a time-frequency unit where the corresponding first-type measurement is performed.

In one embodiment, for a given SCS and CP length, any of the J first-type measurement value(s) is an average of a sum of received energies values of partial multicarrier symbols comprised within the frequency range of a time-frequency unit where the corresponding first-type measurement is performed.

In one embodiment, a number of time-frequency resources occupied by one of the J time-frequency unit(s) is related to its corresponding SCS.

In one embodiment, all time-frequency resources in the J time-frequency unit(s) are used for at least one of the J first-type measurement(s).

In one embodiment, there exists one time-frequency resource comprised in the J time-frequency unit(s) not being used for any of the J first-type measurement(s).

In one embodiment, there exists one time-frequency resource comprised in the J time-frequency unit(s) being used for measurement(s) other than the J first-type measurement(s).

In one embodiment, numbers of time-frequency resources comprised in any two of the J time-frequency units are the same, J being greater than 1.

In one embodiment, time-frequency resources comprised in any two of the J time-frequency units are the same, J being greater than 1.

In one embodiment, there exist numbers of time-frequency resources comprised in two of the J time-frequency units being unequal, J being greater than 1.

In one embodiment, for a given SCS and CP length, any of the J time-frequency unit(s) occupies one sub-channel in frequency domain and one slot in time domain.

In one embodiment, for a given SCS and CP length, any of the J time-frequency unit(s) occupies a positive integer number of consecutive PRBs in frequency domain and one slot in time domain.

In one embodiment, for a given SCS and CP length, any of the J time-frequency unit(s) occupies one sub-channel in frequency domain and one subframe in time domain.

In one embodiment, for a given SCS and CP length, any of the J time-frequency unit(s) occupies a positive integer number of consecutive PRBs in frequency domain and one subframe in time domain.

In one embodiment, for a given SCS and CP length, any of the J time-frequency unit(s) occupies one sub-channel in frequency domain and a positive integer number of consecutive multicarrier symbols in time domain.

In one embodiment, for a given SCS and CP length, any of the J time-frequency unit(s) occupies a positive integer number of consecutive PRBs in frequency domain and a positive integer number of consecutive multicarrier symbols in time domain.

Embodiment 12

Figure 12:
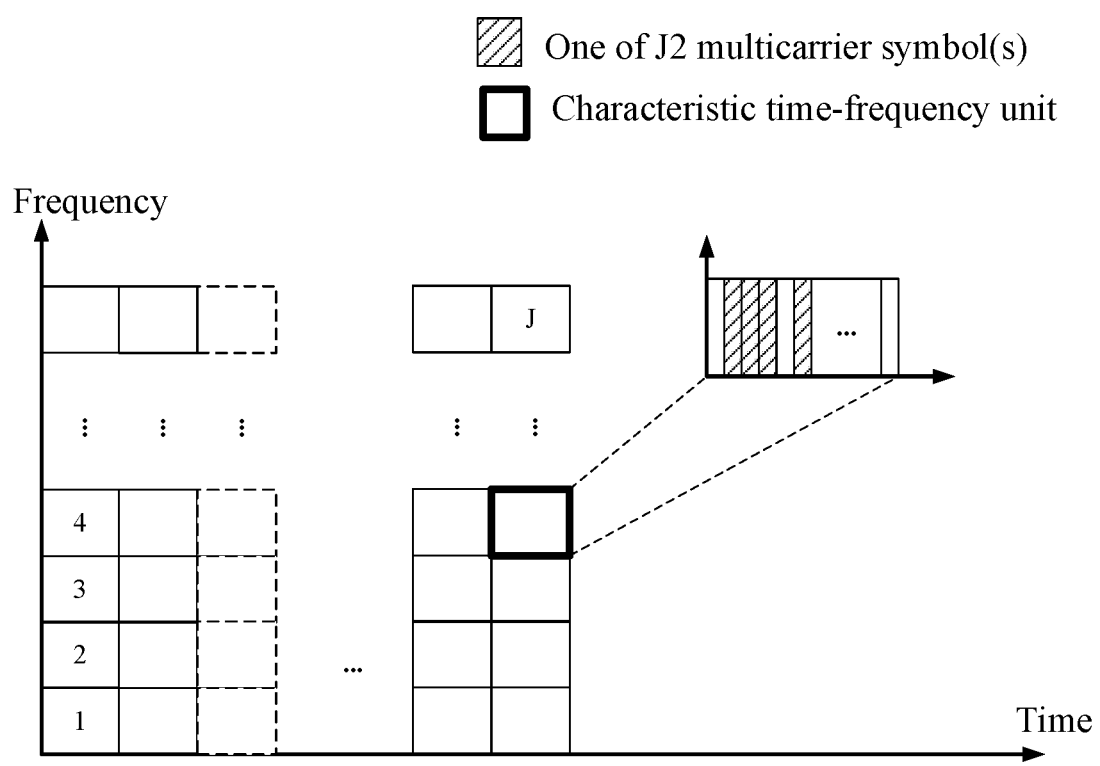
FIG. 12 illustrates a schematic diagram of a relation between a characteristic time-frequency unit and J2 multi-carrier symbol(s) according to one embodiment of the present disclosure.

Embodiment 12 illustrates a schematic diagram of a relation between a characteristic time-frequency unit and J2 multicarrier symbol(s) according to one embodiment of the present disclosure, as shown in FIG. 12.

In Embodiment 12, a given time-frequency resource pool comprises J time-frequency unit(s), J first-type measurement(s) is(are) respectively performed in the J time-frequency unit(s), and J first-type measurement(s) is(are) respectively used for acquiring J first-type measurement value(s), J being a positive integer; a characteristic measurement value is a first-type measurement value of the J first-type measurement value(s), a measurement of the J first-type measurement(s) for acquiring the characteristic measurement value is performed in a characteristic time-frequency unit, the characteristic time-frequency unit is one of the J time-frequency unit(s), the characteristic time-frequency unit comprises J2 multicarrier symbol(s) in time domain, the characteristic measurement value is an average value of a sum of received power in each of the J2 multicarrier symbol(s) within frequency-domain resources occupied by the characteristic time-frequency unit. The given time-frequency resource pool corresponds to the target time-frequency resource pool in the present disclosure, the J time-frequency unit(s) corresponds(correspond) to the X time-frequency unit(s) in the present disclosure, and the J first-type measurement(s) corresponds(correspond) to the X first-type measurement(s) in the present disclosure; the J first-type measurement value(s) corresponds(correspond) to the X first-type measurement(s) in the present disclosure, and the J2 multicarrier symbol(s) corresponds(correspond) to the X2 multicarrier symbol(s) in the present disclosure; or, the given time-frequency resource pool corresponds to any of the Q0 alternative time-frequency resource pool(s) in the present disclosure, and one group of the Q0 group(s) of first-type measurements performed in the given time-frequency resource pool comprises the J first-type measurement(s); one group of the Q0 group(s) of first-type measurement values in the present disclosure corresponds to the given time-frequency resource pool comprises the J first-type measurement value(s).

In one embodiment, the characteristic measurement value can be any of the J first-type measurement value(s).

In one embodiment, each of the J time-frequency unit(s) comprises a positive integer number of multicarrier symbol(s) in time domain.

In one embodiment, each of the J time-frequency unit(s) comprises J2 multicarrier symbol(s) which can be used for one of the J first-type measurement(s) in time domain.

In one embodiment, the characteristic time-frequency unit only comprises the J2 multicarrier symbol(s) in time domain.

In one embodiment, the characteristic time-frequency unit also comprises multicarrier(s) other than the J2 multicarrier symbol(s) in time domain.

In one embodiment, time domain position(s) of the J2 multicarrier symbol(s) in the characteristic time-frequency unit is(are) pre-defined.

In one embodiment, time domain position(s) of the J2 multicarrier symbol(s) in the characteristic time-frequency unit is(are) fixed.

In one embodiment, time domain position(s) of the J2 multicarrier symbol(s) in the characteristic time-frequency unit is(are) configured.

In one embodiment, time domain position(s) of the J2 multicarrier symbol(s) in the characteristic time-frequency unit is(are) related to its corresponding SCS(s).

In one embodiment, any of the J first-type measurement(s) is performed within frequency-domain resources occupied by one of the J time-frequency unit(s) wherein the first-type measurement is performed.

In one embodiment, the characteristic measurement value being an average value of a sum of received power in each of the J2 multicarrier symbol(s) within frequency-domain resources occupied by the characteristic time-frequency unit means that in frequency-domain resources occupied by the characteristic time-frequency unit, first-type measurement(s) of the J first-type measurement(s) targeting the J2 multicarrier symbol(s) is(are) respectively performed to acquire J2 power value(s), the characteristic measurement value is equal to a sum of the J2 power value(s) divided by J2.

Embodiment 13

Figure 13:
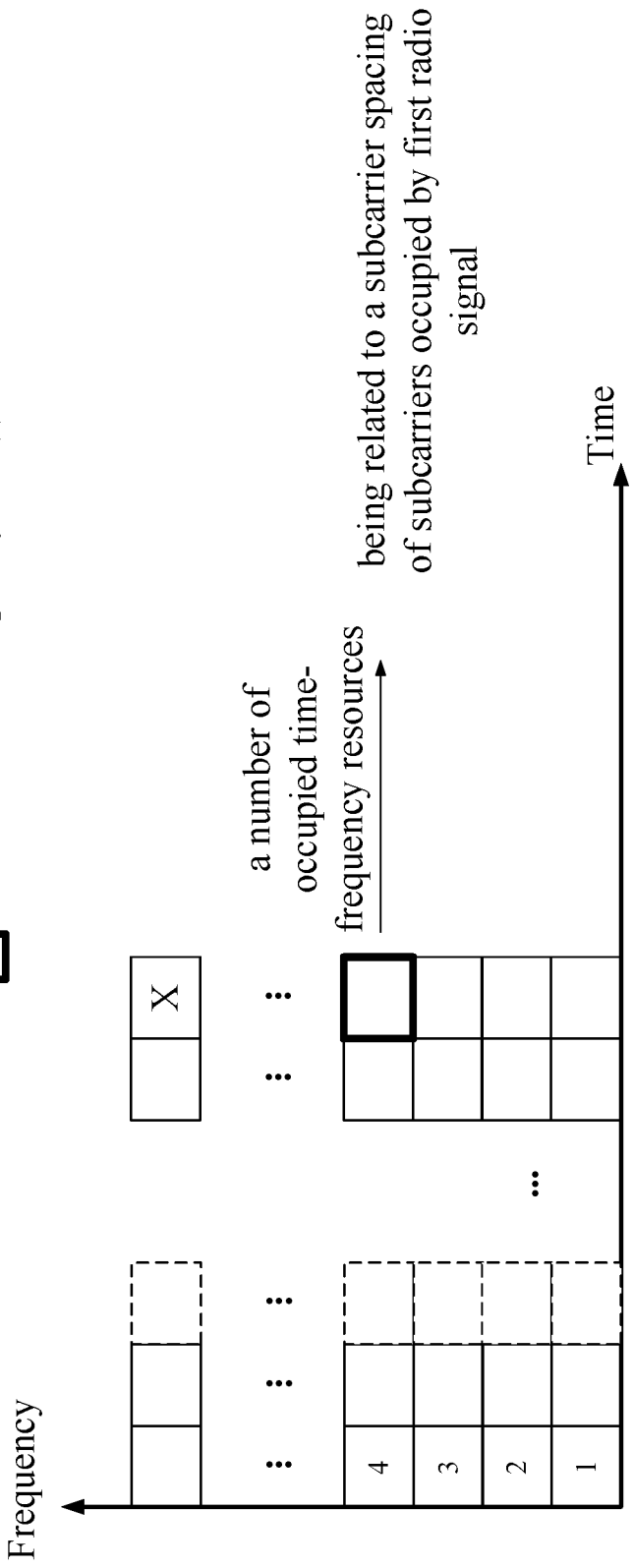
FIG. 13 illustrates a schematic diagram of X time-frequency unit(s) and an SCS of subcarriers occupied by a first radio signal according to one embodiment of the present disclosure.

Embodiment 13 illustrates a schematic diagram of a relation of X time-frequency unit(s) and an SCS of subcarriers occupied by a first radio signal according to one embodiment of the present disclosure, as shown in FIG. 13.

In Embodiment 13, a number of time-frequency resources occupied by one of the X time-frequency unit(s) is related to an SCS of subcarriers occupied by the first radio signal.

In one embodiment, a number of time-frequency resources occupied by one of the X time-frequency resource(s) refers to an absolute number of time-frequency resources comprised in the time-frequency unit.

In one embodiment, a number of time-frequency resources occupied by one of the X time-frequency resource(s) refers to a frequency spacing length of frequency-domain resources comprised in the time-frequency unit.

In one embodiment, for a given SCS and CP length, a number of time-frequency resources occupied by one of the X time-frequency unit(s) refers to a number of PRBs comprised in the time-frequency unit in frequency domain.

In one embodiment, for a given SCS and CP length, a number of time-frequency resources occupied by one of the X time-frequency unit(s) refers to a number of sub-channels comprised in the time-frequency unit in frequency domain.

In one embodiment, a number of time-frequency resources occupied by one of the X time-frequency resource(s) refers to a number of subcarriers corresponding to subcarriers of 15 kHz SCS within frequency domain resources comprised by the time-frequency unit in frequency domain.

In one embodiment, a number of time-frequency resources occupied by one of the X time-frequency resource(s) refers to a number of subcarriers corresponding to subcarriers of 60 kHz SCS within frequency domain resources comprised by the time-frequency unit in frequency domain.

In one embodiment, a number of time-frequency resources occupied by one of the X time-frequency resource(s) refers to an absolute number of time-domain resources comprised in the time-frequency unit.

In one embodiment, a number of time-frequency resources occupied by one of the X time-frequency resource(s) refers to a length of time interval of time-domain resources comprised in the time-frequency unit.

In one embodiment, for a given SCS and CP length, a number of time-frequency resources occupied by one of the X time-frequency unit(s) refers to a number of slots comprised by the time-frequency unit in time domain.

In one embodiment, for a given SCS and CP length, a number of time-frequency resources occupied by one of the X time-frequency unit(s) refers to a number of multicarrier symbols comprised by the time-frequency unit in time domain.

In one embodiment, a number of time-frequency resources occupied by one of the X time-frequency resource(s) refers to a number of multicarrier symbols corresponding to subcarriers of 60 kHz SCS within time domain resources occupied by the time-frequency unit in time domain.

In one embodiment, a number of time-frequency resources occupied by one of the X time-frequency resource(s) refers to a number of multicarrier symbols corresponding to subcarriers of 240 kHz SCS within time domain resources occupied by the time-frequency unit in time domain.

In one embodiment, for a given SCS and CP length, a number of time-frequency resources occupied by one of the X time-frequency unit(s) refers to a number of Resource Elements (REs) comprised in the time-frequency unit, wherein an RE occupies a multicarrier symbol in time domain, and a carrier in frequency domain.

In one embodiment, a number of time-frequency resources occupied by one of the X time-frequency resource(s) refers to a number of basic time-frequency resource elements comprised in the time-frequency unit, wherein a basic time-frequency resource element occupies a fixed length of consecutive time-domain resources in time domain and a fixed length of consecutive frequency-domain resources in frequency domain.

In one embodiment, when a frequency domain resource occupied by the first radio signal belongs to Frequency Range 1 (FR1), a number of time-frequency resources occupied by one of the X time-frequency unit(s) refers to a number of basic time-frequency resource elements comprised in the time-frequency unit, wherein a basic time-frequency resource element occupies a positive integer number of consecutive multicarrier symbols corresponding to subcarriers of 60 kHz SCS in time domain and occupies a positive integer number of consecutive subcarriers of 15 KHz SCS in frequency domain.

In one embodiment, when a frequency domain resource occupied by the first radio signal belongs to Frequency Range 2 (FR2), a number of time-frequency resources occupied by one of the X time-frequency unit(s) refers to a number of basic time-frequency resource elements comprised in the time-frequency unit, wherein a basic time-frequency resource element occupies a positive integer number of consecutive multicarrier symbols corresponding to subcarriers of 240 kHz SCS in time domain and occupies a positive integer number of consecutive subcarriers of 60 kHz SCS in frequency domain.

In one embodiment, when a frequency domain resource occupied by the first radio signal belongs to FR2, a number of time-frequency resources occupied by one of the X time-frequency unit(s) refers to a number of basic time-frequency resource elements comprised in the time-frequency unit, wherein a basic time-frequency resource element occupies a positive integer number of consecutive multicarrier symbols corresponding to subcarriers of 480 kHz SCS in time domain and occupies a positive integer number of consecutive subcarriers of 60 KHz SCS in frequency domain.

In one embodiment, a number of time-frequency resources occupied by one of the X time-frequency unit(s) refers to an absolute number of time-frequency resources comprised in the time-frequency unit.

In one embodiment, the X time-frequency unit(s) belongs (belong) to a fourth time window, the target second-type measurement is performed in a fifth time window, an end time for the fourth time window is no later than a start time for the fifth time window, and an end time for the fifth time window is no later than a start time for transmission of the first radio signal.

In one embodiment, a number of time-frequency resources occupied by one of the X time-frequency unit(s) being related to an SCS of subcarriers occupied by the first radio signal means that a number of time-frequency resources occupied by one of the X time-frequency unit(s) is related to the SCS of subcarriers occupied by the first radio signal.

In one embodiment, a number of time-frequency resources occupied by one of the X time-frequency unit(s) being related to an SCS of subcarriers occupied by the first radio signal means that the SCS of subcarriers occupied by the first radio signal is used for determining a number of time-frequency resources occupied by one of the X time-frequency unit(s).

In one embodiment, a number of time-frequency resources occupied by one of the X time-frequency unit(s) being related to an SCS of subcarriers occupied by the first radio signal means that a number of time-frequency resources occupied by one of the X time-frequency unit(s) is linearly related to the SCS of subcarriers occupied by the first radio signal.

In one embodiment, a number of time-frequency resources occupied by one of the X time-frequency unit(s) being related to an SCS of subcarriers occupied by the first radio signal means that an absolute number of frequency-domain resources occupied by one of the X time-frequency unit(s) is related to the SCS of subcarriers occupied by the first radio signal.

In one embodiment, a number of time-frequency resources occupied by one of the X time-frequency unit(s) being related to an SCS of subcarriers occupied by the first radio signal means that an absolute number of frequency domain resources occupied by one of the X time-frequency unit(s) is related to an absolute number of frequency domain resources occupied by a positive integer number of subcarrier(s) occupied by the first radio signal.

In one embodiment, a number of time-frequency resources occupied by one of the X time-frequency unit(s) being related to an SCS of subcarriers occupied by the first radio signal means that a length of frequency spacing of frequency domain resources occupied by one of the X time-frequency unit(s) is related to the SCS of subcarriers occupied by the first radio signal.

In one embodiment, a number of time-frequency resources occupied by one of the X time-frequency unit(s) being related to an SCS of subcarriers occupied by the first radio signal means that an absolute number of time domain resources occupied by one of the X time-frequency unit(s) is related to the SCS of subcarriers occupied by the first radio signal.

In one embodiment, a number of time-frequency resources occupied by one of the X time-frequency unit(s) being related to an SCS of subcarriers occupied by the first radio signal means that an absolute number of time-domain resources occupied by one of the X time-frequency unit(s) is equal to an absolute number of time domain resources occupied by a positive integer number of multicarrier symbol(s) corresponding to subcarrier(s) occupied by the first radio signal.

In one embodiment, a number of time-frequency resources occupied by one of the X time-frequency unit(s) being related to an SCS of subcarriers occupied by the first radio signal means that a length of time interval of time domain resources occupied by one of the X time-frequency unit(s) is related to the SCS of subcarriers occupied by the first radio signal.

In one embodiment, a number of time-frequency resources occupied by one of the X time-frequency unit(s) being related to an SCS of subcarriers occupied by the first radio signal means that the SCS of subcarriers occupied by the first radio signal belongs to one of M SCS groups, each of the M SCS groups respectively corresponds to M alternative time-frequency resource numbers, and a number of time-frequency resources occupied by one of the X time-frequency unit(s) is one of the M alternative time-frequency resource numbers, an alternative time-frequency resource number corresponding to one of the M SCS groups to which the SCS of subcarriers occupied by the first radio signal belongs to is the number of time-frequency resources occupied by one of the X time-frequency unit(s), M being a positive integer greater than 1.

In one embodiment, a number of time-frequency resources occupied by one of the X time-frequency unit(s) being related to an SCS of subcarriers occupied by the first radio signal means that a frequency range covering a carrier to which the first radio signal belongs to in frequency domain is used for determining the number of time-frequency resources occupied by one of the X time-frequency unit(s), the SCS of subcarriers occupied by the first radio signal belongs to one of M SCS sets, and a frequency range covering a carrier to which the first radio signal belongs to in frequency domain is also used for determining an alternative SCS set to which the SCS of subcarriers occupied by the first radio signal belongs to out of the M SCS groups, M being a positive integer greater than 1, and M SCS groups are pre-defined.

In one embodiment, a number of time-frequency resources occupied by one of the X time-frequency unit(s) being related to an SCS of subcarriers occupied by the first radio signal means that when a frequency range covering a carrier to which the first radio signal belongs to in frequency domain is lower than 6 GHz (FR1), the number of time-frequency resources occupied by one of the X time-frequency unit(s) is equal to a first number, the SCS of subcarriers occupied by the first radio signal belongs to one of 15 kHz, 30 kHz, and 60 kHz; when a frequency range covering a carrier to which the first radio signal belongs to in frequency domain is higher than 6 GHz (FR2), the number of time-frequency resources occupied by one of the X time-frequency unit(s) is equal to a second number, the SCS of subcarriers occupied by the first radio signal belongs to one of 60 kHz, 120 kHz, and 240 kHz; and the first number and the second number are not equal.

In one embodiment, a number of time-frequency resources occupied by one of the X time-frequency unit(s) being related to an SCS of subcarriers occupied by the first radio signal means that when a frequency range covering a carrier to which the first radio signal belongs to in frequency domain is lower than 6 GHz (FR1), the number of time-frequency resources occupied by one of the X time-frequency unit(s) is equal to a first number, the SCS of subcarriers occupied by the first radio signal belongs to one of 15 kHz, 30 kHz, and 60 kHz; when a frequency range covering a carrier to which the first radio signal belongs to in frequency domain is higher than 6 GHz (FR2), the number of time-frequency resources occupied by one of the X time-frequency unit(s) is equal to a second number, the SCS of subcarriers occupied by the first radio signal belongs to one of 60 kHz, 120 kHz, 240 kHz, 480 kHz, and 960 kHz; and the first number and the second number are not equal.

Embodiment 14

Figure 14:
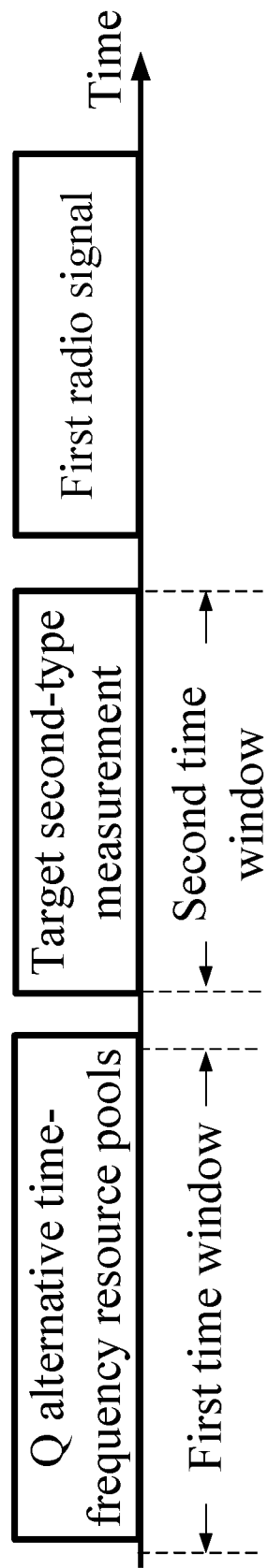
FIG. 14 illustrates a schematic diagram of a relation between a first time window and a second time window according to one embodiment of the present disclosure.

Embodiment 4 illustrates a schematic diagram of a relation between a first time window and a second time window according to one embodiment of the present disclosure, as shown in FIG. 14.

In Embodiment 14, the Q alternative time-frequency resource pools in the present disclosure belong to a first time window in time domain, the target second-type measurement in the present disclosure is performed in a second time window, an end time of the first time window is no later than a start time of the second time window, and an end time of the second time window is no later than a start time for transmission of the first radio signal in the present disclosure.

In one embodiment, the Q1 second-type measurement(s) in the present disclosure is(are) also performed in the second time window.

In one embodiment, the first time window only comprises time-domain resources in the Q alternative time-frequency resource pools.

In one embodiment, the first time window also comprises time-domain resources other than time-domain resources in the Q alternative time-frequency resource pools.

In one embodiment, the first time window is used for determining the Q alternative time-frequency resource pools.

In one embodiment, the Q alternative time-frequency resource pools comprise all time-frequency units that can be used for S-RSSI measurement within the first time window in a carrier to which the frequency domain resources occupied by the first radio signal belong.

In one embodiment, the Q alternative time-frequency resource pools comprise all time-frequency resources that can be used for S-RSSI measurement within the first time window in multiple carriers, wherein one of the multiple carriers comprises frequency-domain resources of the first radio signal.

In one embodiment, the time length of the first time window is fixed.

In one embodiment, the time length of the first time window is 100 ms.

In one embodiment, the time length of the first time window is pre-configured.

In one embodiment, the time length of the first time window is pre-defined.

In one embodiment, the time length of the first time window is configured.

In one embodiment, the time length of the first time window is related to an SCS of subcarriers occupied by the first radio signal.

In one embodiment, the end time for the first time window is the start time for the second time window.

In one embodiment, the end time for the first time window is earlier than the start time for the second time window.

In one embodiment, the time length of the second time window is fixed.

In one embodiment, the time length of the second time window is pre-configured.

In one embodiment, the time length of the second time window is 1 ms.

In one embodiment, the time length of the second time window is pre-defined.

In one embodiment, the time length of the second time window can be configured.

In one embodiment, the time length of the second time window is related to an SCS of subcarriers occupied by the first radio signal.

In one embodiment, the end time for the second time window is the start time for transmission of the first radio signal.

In one embodiment, the end time for the second time window is earlier than the start time for transmission of the first radio signal.

In one embodiment, performing the target second-type measurement occupies all the time within the second time window.

In one embodiment, performing the target second-type measurement occupies part of the time within the second time window.

Embodiment 15

Embodiment 15 illustrates a schematic diagram of relations among P alternative intervals, P alternative MCS sets and P alternative resource numerical value sets according to one embodiment of the present disclosure, as shown in FIG. 15. In FIG. 15, the second column on the left represents P alternative intervals, the third column on the left represents P alternative MCS sets, wherein each numerical value represents an MCS index value, the fourth column on the left represents P alternative resource numerical value sets, the letters and numbers in bold respectively represent the target interval, the first MCS set and the first alternative resource numerical value set, respectively.

In Embodiment 15, the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the MCS employed by the first radio signal is one MCS in the first MCS set, and a number of the time-frequency resources occupied by the first radio signal is equal to a resource numerical value in the first resource numerical value set.

In one embodiment, any two of the P alternative intervals have a same interval length.

In one embodiment, there are two alternative intervals in the P alternative intervals that have different interval lengths.

In one embodiment, any two of the P alternative intervals are orthogonal.

In one embodiment, any two of the P alternative intervals are non-orthogonal.

In one embodiment, any two of the P alternative intervals are non-overlapping.

In one embodiment, there are two alternative intervals in the P alternative intervals that are partially intersected.

In one embodiment, there are two alternative intervals in the P alternative intervals that are partially overlapping.

In one embodiment, any of the P alternative MCS sets comprises a positive integer number of MCSs.

In one embodiment, any two of the P alternative MCS sets comprise different MCSs.

In one embodiment, there are two alternative MCS sets in the P alternative MCS sets that comprise a same MCS.

In one embodiment, any two of the P alternative MCS sets comprise same numbers of MCSs.

In one embodiment, any two of the P alternative MCS sets comprise different numbers of MCSs.

In one embodiment, the P alternative MCS sets are pre-defined.

In one embodiment, the P alternative MCS sets are pre-configured.

In one embodiment, the P alternative MCS sets can be configured.

In one embodiment, the one-to-one correspondence relations between the P alternative intervals and the P alternative MCS sets are pre-defined.

In one embodiment, the one-to-one correspondence relations between the P alternative intervals and the P alternative MCS sets are fixed.

In one embodiment, the one-to-one correspondence relations between the P alternative intervals and the P alternative MCS sets are configured.

In one embodiment, the P alternative resource numerical value sets are pre-defined.

In one embodiment, the P alternative resource numerical value sets are pre-configured.

In one embodiment, the P alternative resource numerical value sets are configured.

In one embodiment, any two resource numerical values respectively comprised by any two of the P alternative resource numerical value sets are unequal.

In one embodiment, there are two alternative resource numerical value sets in the P alternative resource numerical value sets that respectively comprise equal resource numerical value(s).

In one embodiment, any two of the P alternative resource numerical value sets respectively comprise equal numbers of resource numerical values.

In one embodiment, there are two alternative resource numerical value sets in the P alternative resource numerical value sets that comprise unequal numbers of resource numerical values.

In one embodiment, the one-to-one correspondence relations between the P alternative intervals and the P alternative resource numerical value sets are pre-defined.

In one embodiment, the one-to-one correspondence relations between the P alternative intervals and the P alternative resource numerical value sets are pre-configured.

In one embodiment, the one-to-one correspondence relations between the P alternative intervals and the P alternative resource numerical value sets are fixed.

In one embodiment, the one-to-one correspondence relations between the P alternative intervals and the P alternative resource numerical value sets are configured.

Embodiment 16

Figure 16:
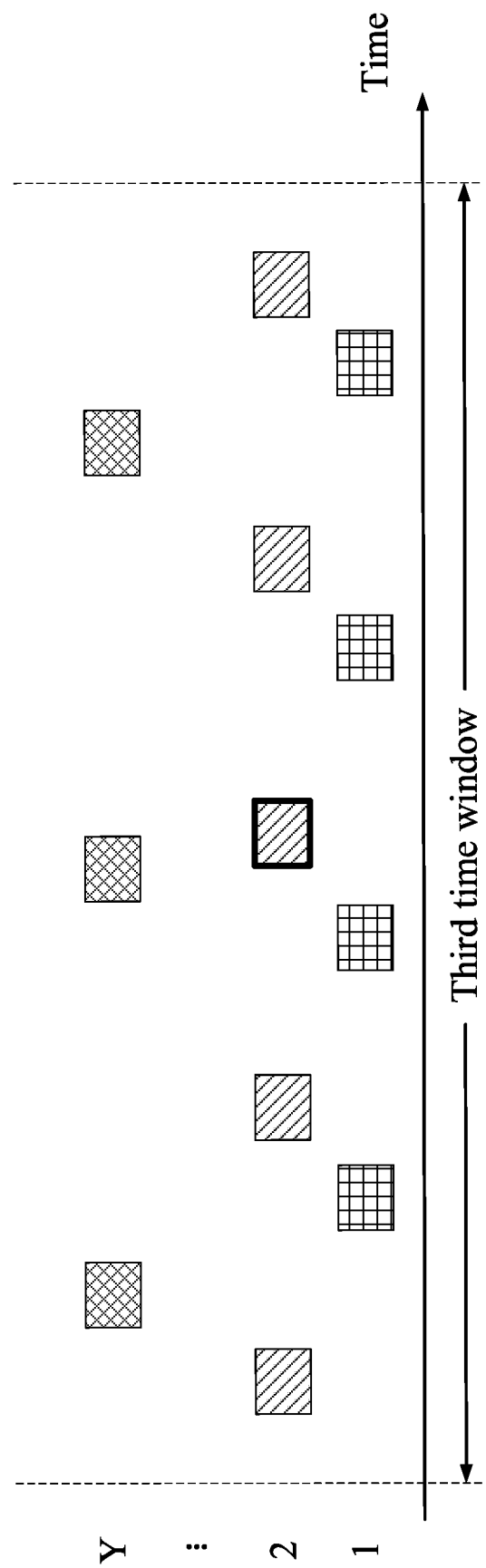
FIG. 16 illustrates a schematic diagram of Y third-type measurement(s) according to one embodiment of the present disclosure.

Embodiment 16 illustrates a schematic diagram of Y third-type measurement(s) according to one embodiment of the present disclosure, as shown in FIG. 16. In FIG. 16, the horizontal axis represents time, each rectangle represents a time-frequency resource occupied by radio signal(s) transmitted by a transmitter of the first radio signal in the third time window, wherein the thick-line framed rectangle represents the time-frequency resources occupied by the first radio signal, and other rectangles with varying fillings respectively represent the time-frequency resources being used for each of the Y third-type measurement(s).

In Embodiment 16, the first-type communication node in the present disclosure performs Y third-type measurement(s) in a third time window, the Y third-type measurement(s) is(are respectively) used for acquiring Y third-type measurement value(s) respectively, Y being a positive integer; a second-type measurement value acquired after performing the target second-type measurement in the present disclosure is used for determining a first upper bound, a sum of the Y third-type measurement value(s) is no greater than the first upper bound, a time domain position of the third time window is related to the time-frequency resources occupied by the first radio signal, the Y third-type measurement value(s) is(are) related to a number of time-frequency resources occupied by radio signal(s) transmitted by a transmitter of the first radio signal in the third time window.

In one embodiment, any of the Y third-type measurement(s) is a measurement on Channel occupancy Ratio (CR).

In one embodiment, any of the Y third-type measurement(s) is a measurement on Channel occupancy Quantity (CQ).

In one embodiment, any of the Y third-type measurement(s) and the target second-type measurement in the present disclosure are two types of measurements.

In one embodiment, any of the Y third-type measurement(s) and any of the X measurement(s) in the present disclosure are two types of measurements.

In one embodiment, any of the Y third-type measurement(s) is used for determining channel occupancy status of a channel measured.

In one embodiment, any of the Y third-type measurement(s) is used for determining the channel occupancy status within a frequency range measured.

In one embodiment, the Y third-type measurement(s) respectively correspond to Y ProSe Per-Packet Priority (Priorities) (PPPP).

In one embodiment, any of the Y third-type measurement(s) is a measurement on CR under one PPPP.

In one embodiment, any of the Y third-type measurement value(s) is a value of CR.

In one embodiment, any of the Y third-type measurement value(s) is a value of CQ.

In one embodiment, the Y third-type measurement value(s) is(are) CR value(s) respectively corresponding to Y PPPP(s).

In one embodiment, the Y third-type measurement value(s) respectively corresponds(correspond) to Y PPPP(s), and a PPPP of a packet carried by the first radio signal is a minimum PPPP of the Y PPPP(s).

In one embodiment, the Y third-type measurement value(s) respectively corresponds(correspond) to Y priority (priorities), and a priority of a packet carried by the first radio signal is a lowest priority of the Y priority(priorities).

In one embodiment, the Y third-type measurement value(s) respectively corresponds(correspond) to Y priority (priorities), and a priority of a packet carried by the first radio signal is a highest priority of the Y priority(priorities).

In one embodiment, the Y third-type measurement value(s) respectively corresponds(correspond) to Y priority index(indices), and a priority index of a priority of a packet carried by the first radio signal is equal to a minimum index value of the Y priority index(indices).

In one embodiment, the Y third-type measurement value(s) respectively corresponds(correspond) to Y priority index(indices), and a priority index of a priority of a packet carried by the first radio signal is equal to a maximum index value of the Y priority index(indices).

In one embodiment, the first signaling in the present disclosure is also used for determining the first upper bound.

In one embodiment, the second-type measurement value acquired after performing the target second-type measurement being used for determining a first upper bound means that the second-type measurement value acquired after performing the target second-type measurement is used by the first-type communication node for determining the first upper bound In one embodiment, the second-type measurement value acquired after performing the target second-type measurement being used for determining a first upper bound means that the second-type measurement value acquired after performing the target second-type measurement determines the first upper bound based on a given mapping relation.

In one embodiment, the second-type measurement value acquired after performing the target second-type measurement being used for determining a first upper bound means that the second-type measurement value acquired after performing the target second-type measurement determines the first upper bound based on a given function relation.

In one embodiment, the second-type measurement value acquired after performing the target second-type measurement being used for determining a first upper bound means that the second-type measurement value acquired after performing the target second-type measurement determines the first upper bound based on a correspondence relation, wherein the correspondence relation is pre-defined.

In one embodiment, the second-type measurement value acquired after performing the target second-type measurement being used for determining a first upper bound means that the second-type measurement value acquired after performing the target second-type measurement determines the first upper bound based on a correspondence relation, wherein the correspondence relation is configurable.

In one embodiment, the second-type measurement value acquired after performing the target second-type measurement being used for determining a first upper bound means that each of the P alternative intervals in the present disclosure corresponds to P alternative upper bounds, the first upper bound is an alternative upper bound in the P alternative upper bounds corresponding to the target interval in the present disclosure, the one-to-one correspondence relations between the P alternative intervals and P alternative upper bounds are fixed.

In one embodiment, the second-type measurement value acquired after performing the target second-type measurement being used for determining a first upper bound means that each of the P alternative intervals in the present disclosure corresponds to P alternative upper bounds, the first upper bound is an alternative upper bound in the P alternative upper bounds corresponding to the target interval in the present disclosure, the one-to-one correspondence relations between the P alternative intervals and P alternative upper bounds are configured.

In one embodiment, the time length of the third time window is pre-configured.

In one embodiment, the time length of the third time window is fixed.

In one embodiment, the time length of the third time window is equal to 1 s.

In one embodiment, the time length of the third time window is pre-defined.

In one embodiment, the time length of the third time window is configured.

In one embodiment, the time length of the third time window is determined by the first-type communication node itself.

In one embodiment, a time domain position of the third time window being related to time-frequency resources occupied by the first radio signal means that an end time for the third time window is no later than a start time for transmission of the first radio signal.

In one embodiment, a time domain position of the third time window being related to time-frequency resources occupied by the first radio signal means that given that an end time for the third time window is no later than a start time for transmission of the first radio signal, a time-domain position of the third time window is determined by the first-type communication node itself.

In one embodiment, a time domain position of the third time window being related to time-frequency resources occupied by the first radio signal means that time-frequency resources occupied by the first radio signal are used for determining a time domain position of the third time window.

In one embodiment, a time domain position of the third time window being related to time-frequency resources occupied by the first radio signal means that the third time window comprises both time domain resources occupied by the first radio signal and reserved time domain resources configured in the grant of the first radio signal.

In one embodiment, a time domain position of the third time window being related to time-frequency resources occupied by the first radio signal means that the third time window comprises both time domain resources occupied by the first radio signal and part of reserved time domain resources configured in the grant of the first radio signal.

In one embodiment, a time domain position of the third time window being related to time-frequency resources occupied by the first radio signal means that the third time window does not comprise any of reserved time-domain resources configured in the grant of the first radio signal.

In one embodiment, a time domain position of the third time window being related to time-frequency resources occupied by the first radio signal means that the third time window is divided into a first time sub-window and a second time sub-window by time sequence, a time length of the first time sub-window is self-determined by the first-type communication node, and the second time sub-window comprises both time domain resources occupied by the first radio signal and reserved time domain resources configured in the grant of the first radio signal.

In one embodiment, a time domain position of the third time window being related to time-frequency resources occupied by the first radio signal means that given that an end time for the third time window is no later than a latest end time for reserved time domain resources configured in the grant of the first radio signal, the time domain position of the third time window is self-determined by the first-type communication node.

In one embodiment, a time domain position of the third time window being related to time-frequency resources occupied by the first radio signal means that the third time window is divided into a first time sub-window and a second time sub-window by time sequence, a time length of the first time sub-window, when not less than a length threshold, is self-determined by the first-type communication node, an end time for the second time sub-window is no later than a latest end time for reserved time domain resources configured in the grant of the first radio signal.

In one embodiment, the Y third-type measurement value(s) being related to a number of time-frequency resources occupied by radio signal(s) transmitted by a transmitter of the first radio signal in the third time window means that the Y third-type measurement value(s) respectively corresponds(correspond) to Y priority(priorities), the Y third-type measurement value(s) is(are) respectively number(s) of time-frequency resources occupied by radio signals with corresponding priorities transmitted by the transmitter of the first radio signal in the third time window.

In one embodiment, the Y third-type measurement value(s) being related to a number of time-frequency resources occupied by radio signal(s) transmitted by a transmitter of the first radio signal in the third time window means that the Y third-type measurement value(s) respectively corresponds(correspond) to Y priority(priorities), each of the Y third-type measurement value(s) is a ratio of a number of time-frequency resources occupied by a radio signal with a corresponding priority transmitted by the transmitter of the first radio signal in the third time window to a total number of time-frequency resources with a corresponding priority within the third time window.

Embodiment 17

Figure 17:
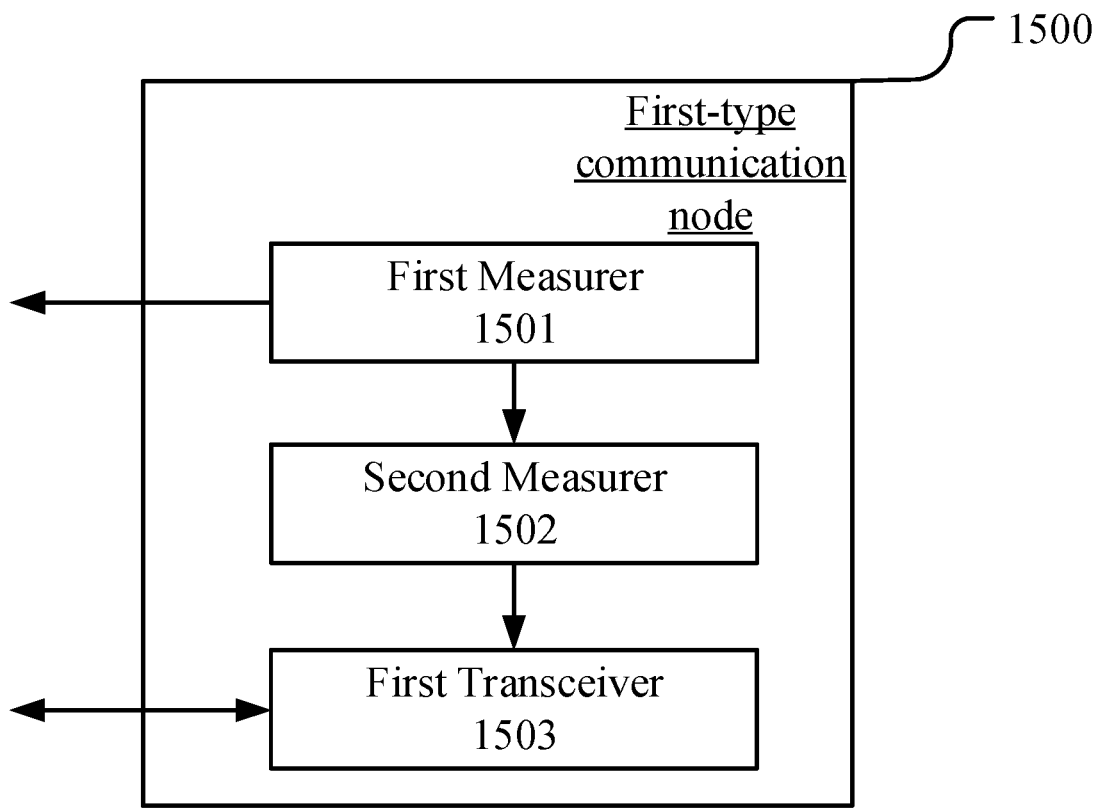
FIG. 17 illustrates a structure block diagram of a processing device in a first-type communication node according to one embodiment of the present disclosure.

Embodiment 17 illustrates a structure block diagram of a processing device of a first-type communication node according to one embodiment, as shown in FIG. 17. In FIG. 17, a first-type communication node processing device 1500 comprises a first measurer 1501, a second measurer 1502 and a first transceiver 1503.

In one embodiment, the first measurer 1501 comprises a receiver 456 (including an antenna 460), a receiving processor 452 and a controller/processor 490 in FIG. 4 of the present disclosure.

In one embodiment, the first measurer 1501 comprises at least first two of a receiver 456 (including an antenna 460), a receiving processor 452 and a controller/processor 490 in FIG. 4 of the present disclosure.

In one embodiment, the first measurer 1501 comprises a receiver 456 (including an antenna 460), a receiving processor 452 and a controller/processor 490 in FIG. 5 of the present disclosure.

In one embodiment, the first measurer 1501 comprises at least first two of a receiver 516 (including an antenna 520), a receiving processor 512 and a controller/processor 540 in FIG. 5 of the present disclosure.

In one embodiment, the second measurer 1502 comprises a controller/processor 490 in FIG. 4 of the present disclosure.

In one embodiment, the second measurer 1502 comprises a controller/processor 540 in FIG. 5 of the present disclosure.

In one embodiment, the first transceiver 1503 comprises a receiver/transmitter 456 (including an antenna 460), a receiving processor 452, a transmitting processor 455 and a controller/processor 490 in FIG. 4 of the present disclosure, In one embodiment, the second measurer 1502 comprises a controller/processor 540 in FIG. 5 of the present disclosure.

In one embodiment, the first transceiver 1503 comprises at least first two of a receiver/transmitter 456 (including an antenna 460), a receiving processor 452, a transmitting processor 455 and a controller/processor 490 in FIG. 4 of the present disclosure, In one embodiment, the first transceiver 1503 comprises a receiver/transmitter 516 (including an antenna 460), a receiving processor 512, a transmitting processor 515 and a controller/processor 540 in FIG. 5 of the present disclosure.

In one embodiment, the first transceiver 1503 comprises at least first two of a receiver/transmitter 516 (including an antenna 460), a receiving processor 512, a transmitting processor 515 and a controller/processor 540 in FIG. 5 of the present disclosure.

The first measurer 1501, performs X first-type measurement(s) in a target time-frequency resource pool.

The second measurer 1502, performs a target second-type measurement.

The first transceiver 1503, transmits a first radio signal.

In Embodiment 17, the X first-type measurement(s) is(are) respectively used for acquiring X first-type measurement value(s), X being a positive integer; the target second-type measurement is used for acquiring a second-type measurement value; the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal.

In one embodiment, the Q alternative time-frequency resource pools respectively correspond to Q alternative SCSs, one of the Q alternative SCSs corresponding to the target time-frequency resource pool is the same as the SCS of subcarriers occupied by the first radio signal.

In one embodiment, any of the Q alternative time-frequency resource pools consists of a group of time-frequency resource subpools that periodically appear in time domain; a number of multicarrier symbols occupied by each time-frequency resource subpool of the Q alternative time-frequency resource pools is the same, or, a number of multicarrier symbols occupied by any time-frequency resource subpool of the Q alternative time-frequency resource pools is related to its corresponding SCS.

In one embodiment, the first measurer 1501 performs Q0 group(s) of first-type measurements respectively in Q0 alternative time-frequency resource pool(s) of the Q alternative time-frequency resource pools, and the Q0 group(s) of first-type measurements is(are respectively) used for acquiring Q0 group(s) of first-type measurement values; herein, each of the Q0 alternative time-frequency resource pool(s) is different from the target time-frequency resource pool, Q0 being a positive integer less than Q.

In one embodiment, the second measurer 1502 performs Q1 second-type measurement(s), and the Q1 second-type measurement(s) is(are respectively) used for acquiring Q1 second-type measurement value(s); herein, Q1 group(s) of first-type measurement values in the Q0 group(s) of first-type measurement values is(are respectively) used for the Q1 second-type measurement(s), Q1 being a positive integer no greater than the Q0; each of the Q1 second-type measurement value(s) is no less than the second-type measurement value acquired after performing the target second-type measurement.

In one embodiment, the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, and the characteristic measurement value is an average value of a sum of received power in each of the X2 multicarrier symbol(s) within frequency-domain resources occupied by the characteristic time-frequency unit.

In one embodiment, the first transceiver 1503 also receives first information; herein, each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; and the first information is used for determining the target threshold.

In one embodiment, the first transceiver 1503 also transmits a first signaling; herein, the first signaling is used for indicating at least one of an MCS employed by the first radio signal or time-frequency resources occupied by the first radio signal, and the first signaling is transmitted via an air interface; each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal.

In one embodiment, the first transceiver 1503 also receives second information; herein, the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set.

In one embodiment, the first transceiver 1503 also receives third information; herein, the third information is used for determining the SCS of subcarriers occupied by the first radio signal.

In one embodiment, the second measurer 1502 performs Y third-type measurement(s) in a third time window, the Y third-type measurement(s) is(are respectively) used for acquiring Y third-type measurement value(s), Y being a positive integer; herein, the second-type measurement value acquired after performing the target second-type measurement is used for determining a first upper bound, a sum of the Y third-type measurement value(s) is no greater than the first upper bound, a time-domain position of the third time window is related to time-frequency resources occupied by the first radio signal, and the Y third-type measurement value(s) is related to a number of time-frequency resources occupied by a radio signal transmitted by a transmitter of the first radio signal in the third time window.

Embodiment 18

Figure 18:
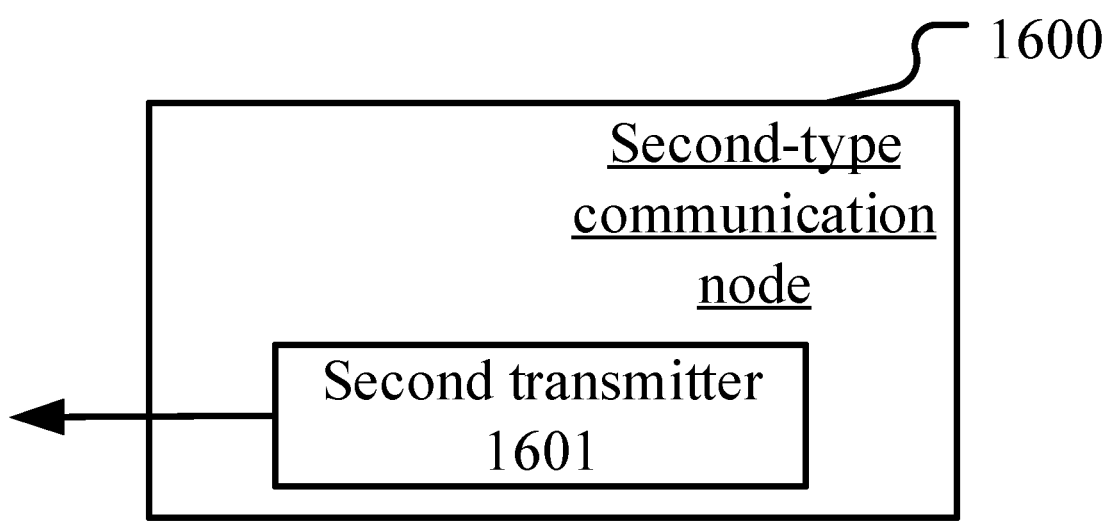
FIG. 18 illustrates a structure block diagram of a processing device in a second-type communication node according to one embodiment of the present disclosure.

Embodiment 18 illustrates a structure block diagram of a processing device of a second-type communication node according to one embodiment, as shown in FIG. 18. In FIG. 18, a second-type communication node processing device 1600 mainly consists of a second transmitter 1601.

In one embodiment, the second transmitter 1601 comprises the transmitter/receiver 416 (including the antenna 420), the transmitting processor 415 and the controller/processor 440 in FIG. 4 of the present disclosure.

In one embodiment, the second transmitter 1601 comprises at least first two of the transmitter/receiver 416 (including the antenna 420), the transmitting processor 415 and the controller/processor 440 in FIG. 4 of the present disclosure.

A second transmitter 1601, transmits first information.

in Embodiment 18, X first-type measurement(s) performed in a target time-frequency resource pool is(are) used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, and the target second-type measurement is used for acquiring a second-type measurement value; the second-type measurement value acquired after performing the target second-type measurement is used for determining at least one of an MCS employed by the first radio signal or time-frequency resources occupied by the first radio signal; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold.

In one embodiment, the Q alternative time-frequency resource pools respectively correspond to Q alternative SCSs, one of the Q alternative SCSs corresponding to the target time-frequency resource pool is the same as the SCS of subcarriers occupied by the first radio signal.

In one embodiment, any of the Q alternative time-frequency resource pools consists of a group of time-frequency resource subpools that occur periodically in time domain; all time-frequency resource subpools of the Q alternative time-frequency resource pools occupy equal numbers of multi-carrier symbols, or, a number of multicarrier symbols occupied by any time-frequency resource subpool of the Q alternative time-frequency resource pools is related to its corresponding SCS.

In one embodiment, the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, and the characteristic measurement value is an average value of a sum of received power in each of the X2 multicarrier symbol(s) within frequency-domain resources occupied by the characteristic time-frequency unit.

In one embodiment, each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal.

In one embodiment, the second transmitter 1601 also transmits second information; herein, the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set.

In one embodiment, the second transmitter 1601 also transmits third information; herein, the third information is used for determining the SCS of subcarriers occupied by the first radio signal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, eMTC devices, NB-IoT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
receiving second information;
performing X first-type measurement(s) in a target time-frequency resource pool, the X first-type measurement(s) being respectively used for acquiring X first-type measurement value(s), X being a positive integer;
performing a target second-type measurement, the target second-type measurement being used for acquiring a second-type measurement value;
transmitting a first signaling; and
transmitting a first radio signal;
wherein the first signaling is transmitted through a Physical Sidelink Control Channel (PSCCH), and the first radio signal is transmitted through a Physical Sidelink Shared Channel (PSSCH); the first signaling is used for indicating at least one of an MCS employed by the first radio signal or time-frequency resources occupied by the first radio signal; the X first-type measurement value(s) is(are) used for the target second-type measurement, and the target time-frequency resource pool is one of Q alternative time-frequency resource pools related to a Subcarrier Spacing(SCS) of subcarriers occupied by the first radio signal, Q being a positive integer greater than 1; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; there exist two of the Q alternative time-frequency resource pools that comprise different time-frequency resources; the second-type measurement value acquired after performing the target second-type measurement is used for determining at least one of a Modulation Coding Scheme (MCS) employed by the first radio signal or time-frequency resources occupied by the first radio signal; the Q alternative time-frequency resource pools respectively correspond to Q alternative SCSs, one of the Q alternative SCSs corresponding to the target time-frequency resource pool is the same as the SCS of subcarriers occupied by the first radio signal; any of the Q alternative time-frequency resource pools consists of a group of time-frequency resource subpools that occur periodically in time domain, and periods of time-frequency resource subpools respectively comprised in at least two alternative time-frequency resource pools in the Q alternative time-frequency resource pools are different; and the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set; the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set; the second information being used for determining at least one of the MCS employed by the first radio signal or the time-frequency resources occupied by the first radio signal means that the second information is used for indicating the P alternative intervals and the P alternative MCS sets, a second-type measurement value acquired after performing the target second-type measurement and correspondence relations between the P alternative intervals and the P alternative MCS sets are used for determining at least one of the MCS employed by the first radio signal or the time-frequency resources occupied by the first radio signal.

2. The method according to claim 1, wherein any of the Q alternative time-frequency resource pools consists of a group of time-frequency resource subpools that occur periodically in time domain;

all time-frequency resource subpools of the Q alternative time-frequency resource pools occupy equal numbers of multicarrier symbols, and a time interval length of time-domain resources comprised in each time-frequency resource subpool of the Q alternative time-frequency resource pools is related to its corresponding SCS, or, a number of multicarrier symbols occupied by any time-frequency resource subpool of the Q alternative time-frequency resource pools is related to its corresponding SCS.

3. The method according to claim 1, wherein at least two of the Q alternative time-frequency resource pools are overlapping in time domain; each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal.

4. A method in a second-type communication node for wireless communications, comprising:
transmitting first information;
transmitting second information;
wherein X first-type measurement(s) performed in a target time-frequency resource pool is(are) used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, the target second-type measurement is used for acquiring a second-type measurement value, and the second-type measurement value acquired after performing the target second-type measurement is used for determining at least one of an MCS employed by the first radio signal or time-frequency resources occupied by the first radio signal; the first radio signal is transmitted through a Physical Sidelink Shared Channel (PSSCH); each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold; the Q alternative time-frequency resource pools respectively correspond to Q alternative SCSs, one of the Q alternative SCSs corresponding to the target time-frequency resource pool is the same as the SCS of subcarriers occupied by the first radio signal; any of the Q alternative time-frequency resource pools consists of a group of time-frequency resource subpools that occur periodically in time domain, and periods of time-frequency resource subpools respectively comprised in at least two alternative time-frequency resource pools in the Q alternative time-frequency resource pools are different; and the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set the second information being used for determining at least one of the MCS employed by the first radio signal or the time-frequency resources occupied by the first radio signal means that the second information is used for indicating the P alternative intervals and the P alternative MCS sets, a second-type measurement value acquired after performing the target second-type measurement and correspondence relations between the P alternative intervals and the P alternative MCS sets are used for determining at least one of the MCS employed by the first radio signal or the time-frequency resources occupied by the first radio signal.

5. The method according to claim 4, wherein any of the Q alternative time-frequency resource pools consists of a group of time-frequency resource subpools that occur periodically in time domain;
   all time-frequency resource subpools of the Q alternative time-frequency resource pools occupy equal numbers of multicarrier symbols, and a time interval length of time-domain resources comprised in each time-frequency resource subpool of the Q alternative time-frequency resource pools is related to its corresponding SCS, or, a number of multicarrier symbols occupied by any time-frequency resource subpool of the Q alternative time-frequency resource pools is related to its corresponding SCS.

6. A first-type communication node for wireless communications, comprising:
   a first transceiver, receiving second information;
   a first measurer, performing X first-type measurement(s) in a target time-frequency resource pool, the X first-type measurement(s) respectively being used for acquiring X first-type measurement value(s), X being a positive integer;
   a second measurer, performing a target second-type measurement, the target second-type measurement being used for acquiring a second-type measurement value; and
   the first transceiver, transmitting a first signaling; transmitting a first radio signal;
   wherein the first signaling is transmitted through a Physical Sidelink Control Channel (PSCCH), and the first radio signal is transmitted through a Physical Sidelink Shared Channel (PSSCH); the first signaling is used for indicating at least one of an MCS employed by the first radio signal or time-frequency resources occupied by the first radio signal; the X first-type measurement value(s) is(are) used for the target second-type measurement, and the target time-frequency resource pool is one of Q alternative time-frequency resource pools related to an SCS of subcarriers occupied by the first radio signal, Q being a positive integer greater than 1; each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X; there exist two of the Q alternative time-frequency resource pools that comprise different time-frequency resources; the second-type measurement value acquired after performing the target second-type measurement is used for determining at least one of an MCS employed by the first radio signal or time-frequency resources occupied by the first radio signal; the Q alternative time-frequency resource pools respectively correspond to Q alternative SCSs, one of the Q alternative SCSs corresponding to the target time-frequency resource pool is the same as the SCS of subcarriers occupied by the first radio signal; any of the Q alternative time-frequency resource pools consists of a group of time-frequency resource subpools that occur periodically in time domain, and periods of time-frequency resource subpools respectively comprised in at least two alternative time-frequency resource pools in the Q alternative time-frequency resource pools are different; and
   the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set the second information being used for determining at least one of the MCS employed by the first radio signal or the time-frequency resources occupied by the first radio signal means that the second information is used for indicating the P alternative intervals and the P alternative MCS sets, a second-type measurement value acquired after performing the target second-type measurement and correspondence relations between the P alternative intervals and the P alternative MCS sets are used for determining at least one of the MCS employed by the first radio signal or the time-frequency resources occupied by the first radio signal.

7. The first-type communication node according to claim 6, wherein any of the Q alternative time-frequency resource pools consists of a group of time-frequency resource subpools that occur periodically in time domain; all time-frequency resource subpools of the Q alternative time-frequency resource pools occupy equal numbers of multicarrier symbols, and a time interval length of time-domain resources comprised in each time-frequency resource subpool of the Q alternative time-frequency resource pools is related to its corresponding SCS.

8. The first-type communication node according to claim 6, wherein any of the Q alternative time-frequency resource pools consists of a group of time-frequency resource subpools that occur periodically in time domain; a number of multicarrier symbols occupied by any time-frequency resource subpool of the Q alternative time-frequency resource pools is related to its corresponding SCS.

9. The first-type communication node according to claim 6, wherein the first measurer performs Q0 group(s) of first-type measurements respectively in Q0 alternative time-frequency resource pool(s) of the Q alternative time-frequency resource pools, and the Q0 group(s) of first-type measurements is(are respectively) used for acquiring Q0 group(s) of first-type measurement values; wherein each of the Q0 alternative time-frequency resource pool(s) is different from the target time-frequency resource pool, Q0 being a positive integer less than the Q.

10. The first-type communication node according to claim 9, wherein the second measurer performs Q1 second-type measurement(s), and the Q1 second-type measurement(s) is(are respectively) used for acquiring Q1 second-type measurement value(s); wherein Q1 group(s) of first-type measurement values in the Q0 group(s) of first-type measurement values is(are respectively) used for the Q1 second-type measurement(s), Q1 being a positive integer no greater than the Q0; each of the Q1 second-type measurement value(s) is no less than the second-type measurement value acquired after performing the target second-type measurement.

11. The first-type communication node according to claim 6, wherein the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s).

12. The first-type communication node according to claim 6, wherein at least two of the Q alternative time-frequency resource pools are overlapping in time domain; each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal.

13. The first-type communication node according to claim 6, wherein the second measurer performs Y third-type measurement(s) in a third time window, the Y third-type measurement(s) is(are respectively) used for acquiring Y third-type measurement value(s), Y being a positive integer; wherein the second-type measurement value acquired after performing the target second-type measurement is used for determining a first upper bound, a sum of the Y third-type measurement value(s) is no greater than the first upper bound, a time-domain position of the third time window is related to time-frequency resources occupied by the first radio signal, and the Y third-type measurement value(s) is related to a number of time-frequency resources occupied by a radio signal transmitted by a transmitter of the first radio signal in the third time window.

14. A second-type communication node for wireless communications, comprising:
a second transmitter, transmitting first information; transmitting second information;
wherein X first-type measurement(s) performed in a target time-frequency resource pool is(are) used for acquiring X first-type measurement value(s), X being a positive integer; the target time-frequency resource pool is one of Q alternative time-frequency resource pools related to an SCS of subcarriers occupied by a first radio signal, and there exist two of the Q alternative time-frequency resource pools that comprise different time-frequency resources, Q being a positive integer greater than 1; the X first-type measurement value(s) is(are) used for a target second-type measurement, the target second-type measurement is used for acquiring a second-type measurement value, and the second-type measurement value acquired after performing the target second-type measurement is used for determining at least one of an MCS employed by the first radio signal or time-frequency resources occupied by the first radio signal; the first radio signal is transmitted through a Physical Sidelink Shared Channel (PSSCH); each of X1 first-type measurement value(s) of the X first-type measurement value(s) is greater than a target threshold, the second-type measurement value acquired after performing the target second-type measurement is equal to a ratio of X1 to the X, X1 being a non-negative integer no greater than the X, and the first information is used for determining the target threshold the Q alternative time-frequency resource pools respectively correspond to Q alternative SCSs, one of the Q alternative SCSs corresponding to the target time-frequency resource pool is the same as the SCS of subcarriers occupied by the first radio signal; any of the Q alternative time-frequency resource pools consists of a group of time-frequency resource subpools that occur periodically in time domain, and periods of time-frequency resource subpools respectively comprised in at least two alternative time-frequency resource pools in the Q alternative time-frequency resource pools are different; and
the second-type measurement value acquired after performing the target second-type measurement belongs to a target interval, the target interval is one of P alternative intervals, any of the P alternative intervals is an interval of non-negative real numbers, the P alternative intervals respectively correspond to P alternative MCS sets, the P alternative intervals respectively correspond to P alternative resource numerical value sets, P being a positive integer greater than 1; an alternative MCS set of the P alternative MCS sets that corresponds to the target interval is a first MCS set, and an alternative resource numerical value set of the P alternative resource numerical value sets that corresponds to the target interval is a first resource numerical value set the second information is used for determining at least one of the MCS employed by the first radio signal or the time-frequency resources occupied by the first radio signal, the MCS employed by the first radio signal is one MCS in the first MCS set, and a number of the time-frequency resources occupied by the first radio signal is equal to a resource numerical value in the first resource numerical value set the second information being used for determining at least one of the MCS employed by the first radio signal or the time-frequency resources occupied by the first radio signal means that the second information is used for indicating the P alternative intervals and the P alternative MCS sets, a second-type measurement value acquired after performing the target second-type measurement and correspondence relations between the P alternative intervals and the P alternative MCS sets are used for determining at least one of the MCS employed by the first radio signal or the time-frequency resources occupied by the first radio signal.

15. The second-type communication node according to claim 14, wherein any of the Q alternative time-frequency resource pools consists of a group of time-frequency resource subpools that occur periodically in time domain; all time-frequency resource subpools of the Q alternative time-frequency resource pools occupy equal numbers of multi-carrier symbols, and a time interval length of time-domain resources comprised in each time-frequency resource subpool of the Q alternative time-frequency resource pools is related to its corresponding SCS.

16. The second-type communication node according to claim 14, wherein any of the Q alternative time-frequency resource pools consists of a group of time-frequency resource subpools that occur periodically in time domain; a number of multicarrier symbols occupied by any time-frequency resource subpool of the Q alternative time-frequency resource pools is related to its corresponding SCS.

17. The second-type communication node according to claim 14, wherein the target time-frequency resource pool comprises X time-frequency unit(s), the X first-type measurement(s) is(are respectively) performed in the X time-frequency unit(s); a characteristic measurement value is one of the X first-type measurement value(s), one of the X first-type measurement(s) used for acquiring the characteristic measurement value is performed in a characteristic time-frequency unit, the characteristic time-frequency unit is one of the X time-frequency unit(s).

18. The second-type communication node according to claim 14, wherein at least two of the Q alternative time-frequency resource pools are overlapping in time domain; each of the Q alternative time-frequency resource pools belongs to a first time window in time domain, the target second-type measurement is performed in a second time window, an end time of the first time window is no later than a start time of the second time window, and an end time of the second time window is no later than a start time for transmission of the first radio signal.

* * * * *